(12) United States Patent
Takamizawa et al.

(10) Patent No.: US 9,739,949 B2
(45) Date of Patent: Aug. 22, 2017

(54) FERRULE WITH OPTICAL FIBER AND OPTICAL CONNECTOR SYSTEM

(71) Applicant: FUJIKURA LTD., Tokyo (JP)

(72) Inventors: Hiroyuki Takamizawa, Sakura (JP); Terutake Kobayashi, Sakura (JP); Hiroshi Furukawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/080,814

(22) Filed: Mar. 25, 2016

(65) Prior Publication Data

US 2016/0282562 A1 Sep. 29, 2016

(30) Foreign Application Priority Data

Mar. 26, 2015 (JP) .................. 2015-064667
Mar. 26, 2015 (JP) .................. 2015-064668
Mar. 26, 2015 (JP) .................. 2015-064670
Mar. 26, 2015 (JP) .................. 2015-064671

(51) Int. Cl.
  *G02B 6/32* (2006.01)
  *G02B 6/02* (2006.01)
  *G02B 6/38* (2006.01)

(52) U.S. Cl.
  CPC ......... *G02B 6/325* (2013.01); *G02B 6/02052* (2013.01); *G02B 6/382* (2013.01); *G02B 6/3845* (2013.01); *G02B 6/3846* (2013.01); *G02B 6/3882* (2013.01); *G02B 6/3885* (2013.01)

(58) Field of Classification Search
  CPC .... G02B 6/325; G02B 6/02052; G02B 6/382; G02B 6/3845; G02B 6/3846; G02B 6/3882; G02B 6/3885
  See application file for complete search history.

(56) References Cited

U.S. PATENT DOCUMENTS

2015/0378108 A1* 12/2015 Kuznia ................ G02B 6/3849
                                                          385/60

FOREIGN PATENT DOCUMENTS

| JP | 2002-006177 A | 1/2002 |
| JP | 2005-181832 A | 7/2005 |
| JP | 2011-059486 A | 3/2011 |

* cited by examiner

*Primary Examiner* — John M Bedtelyon
(74) *Attorney, Agent, or Firm* — Osha Liang LLP

(57) ABSTRACT

A ferrule with a fiber of this disclosure includes: a ferrule including a positioning hole, a plurality of fiber holes, and an endface perpendicular to an axial direction of the fiber holes; a lensed fiber with a GRIN lens that has been fusion spliced to a tip of an optical fiber; and a plate that can transmit light propagating through the optical fiber, the plate being attached to the endface of the ferrule, the plate being contacted against with an endface of the lensed fiber that has been inserted into each of the fiber holes, wherein the ferrule is formed with a recess that is depressed from the endface of the ferrule, a refractive index matching material is filled in a space surrounded with the plate and the recess.

19 Claims, 46 Drawing Sheets

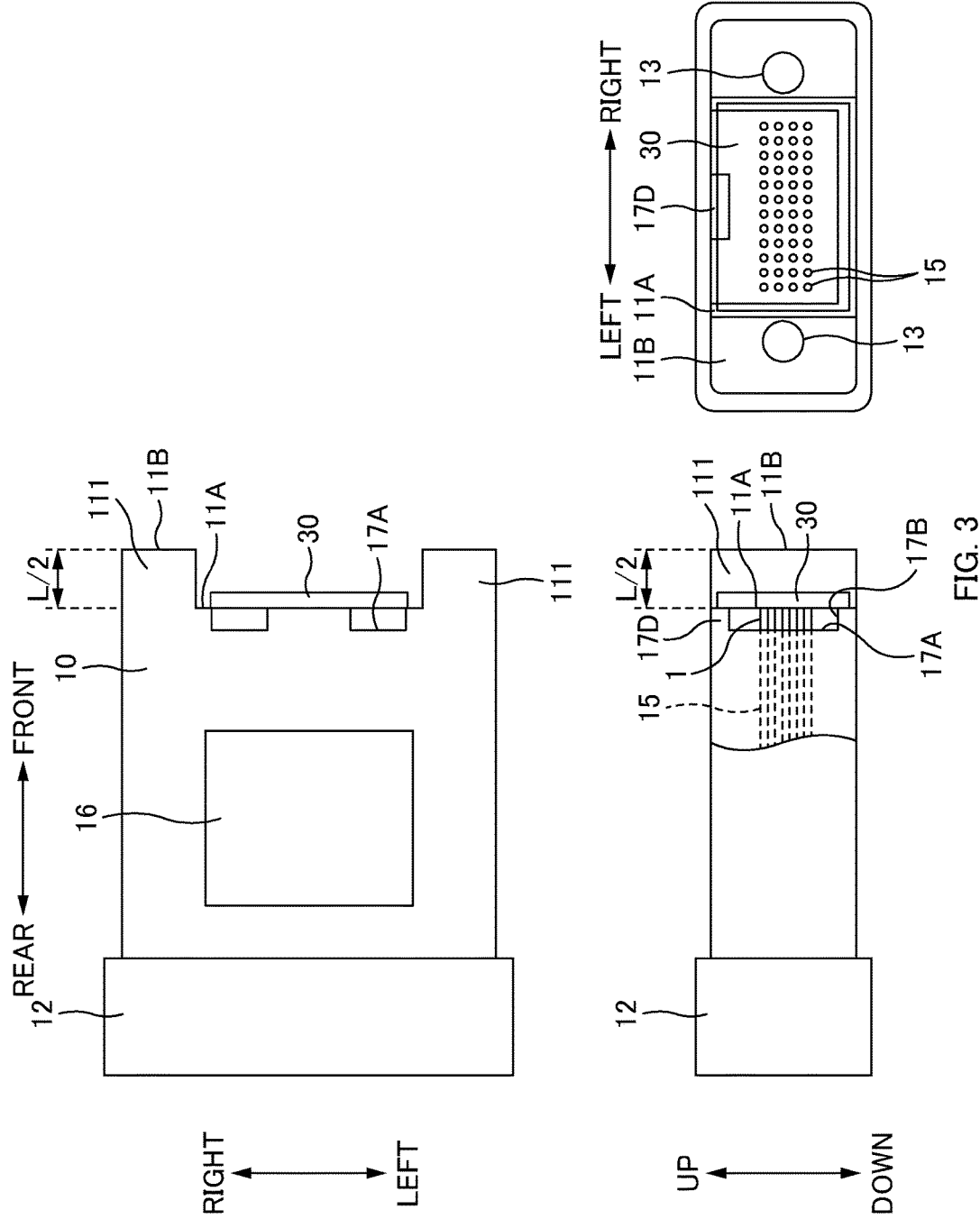

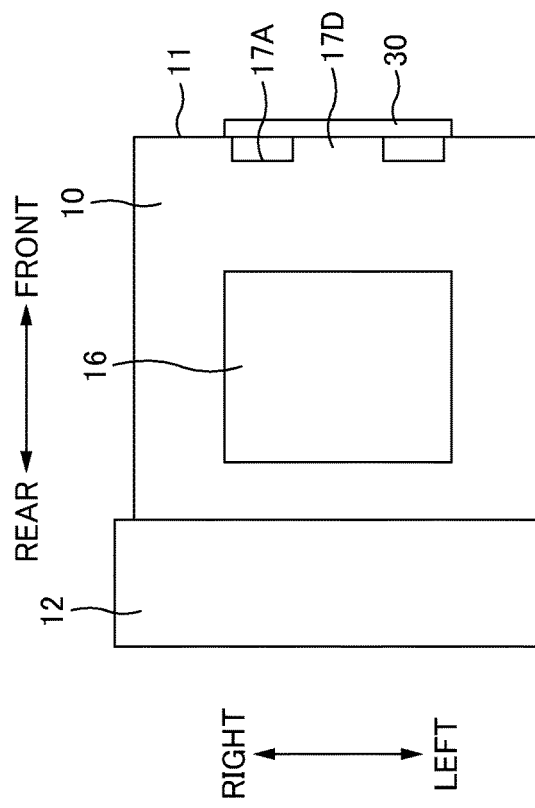
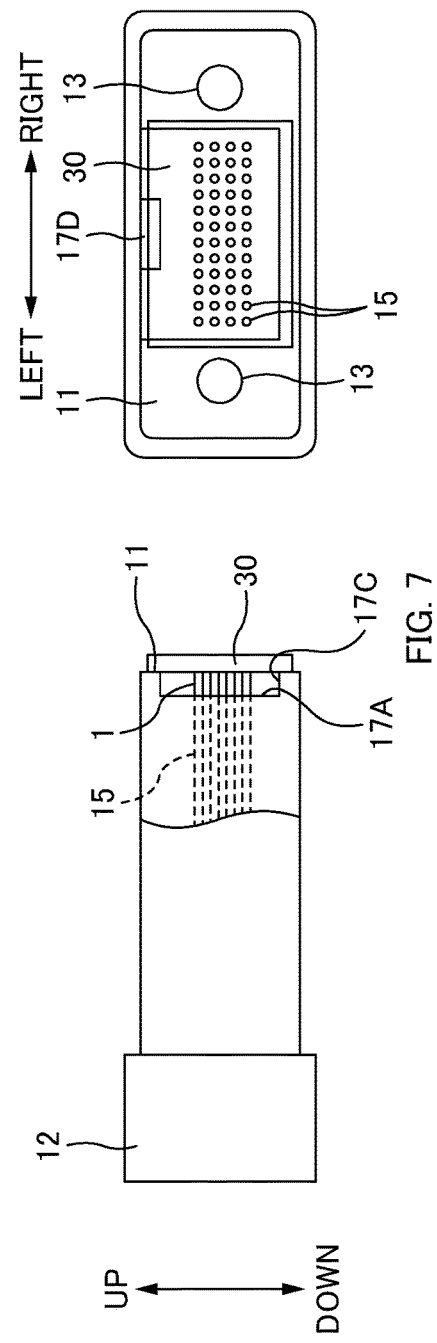
FIG. 7

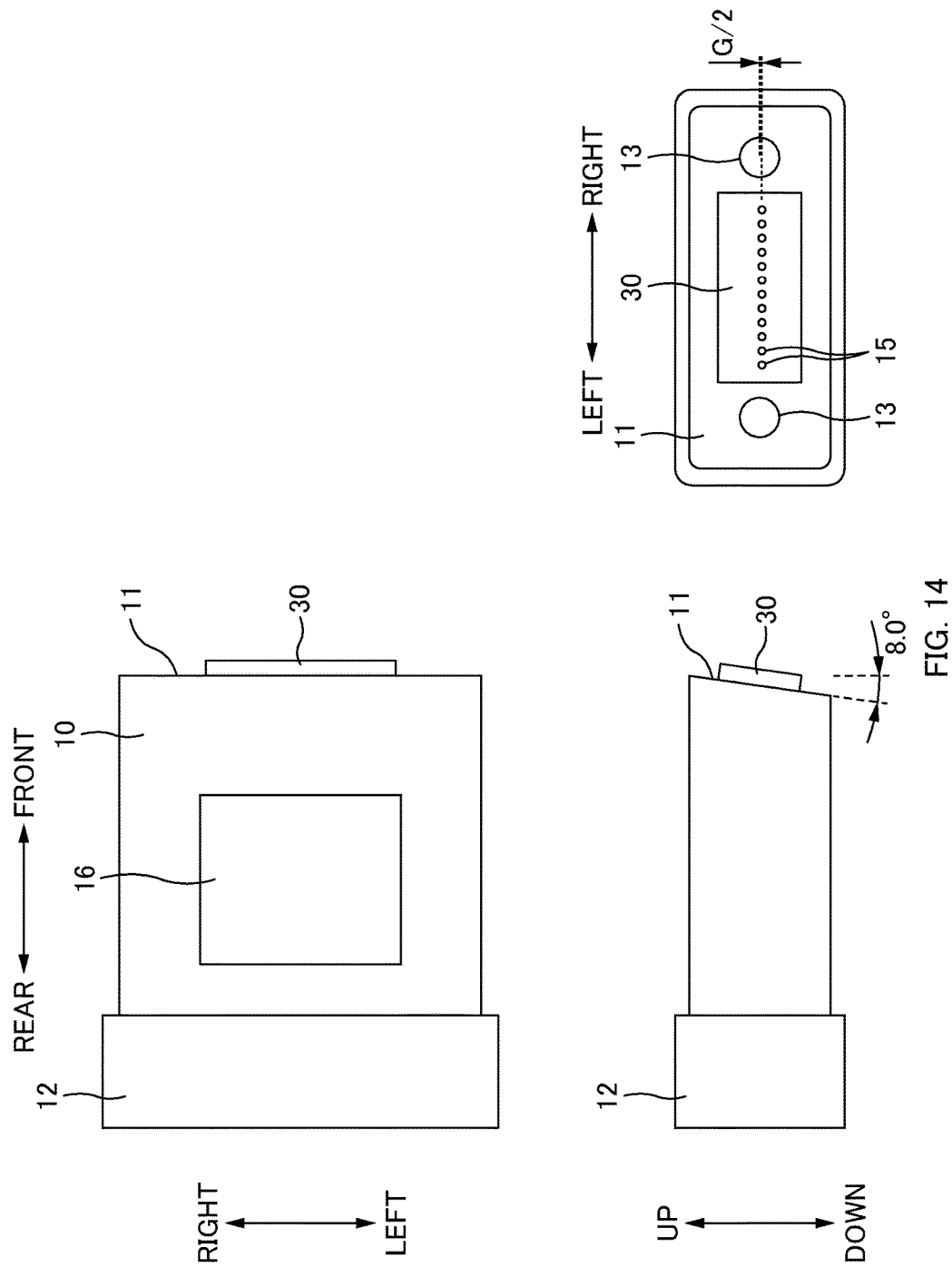

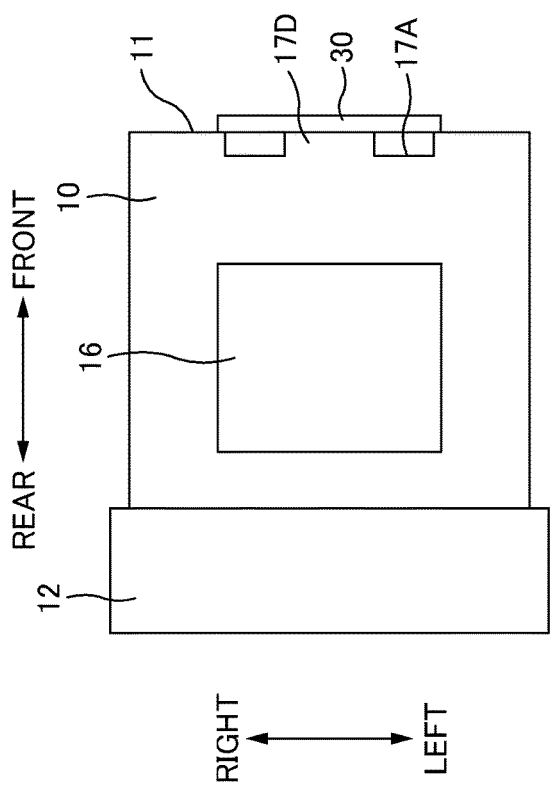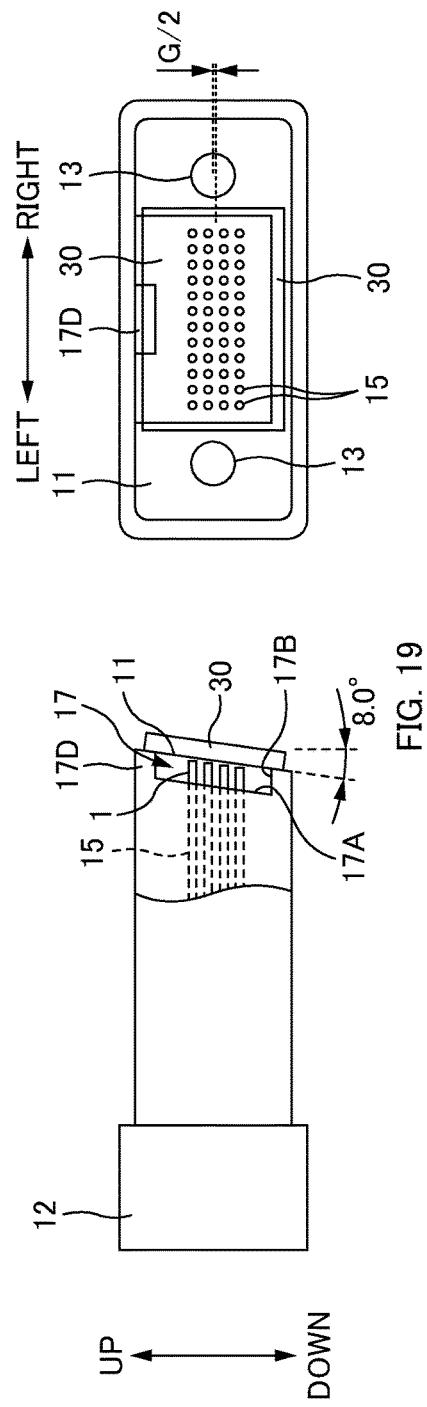

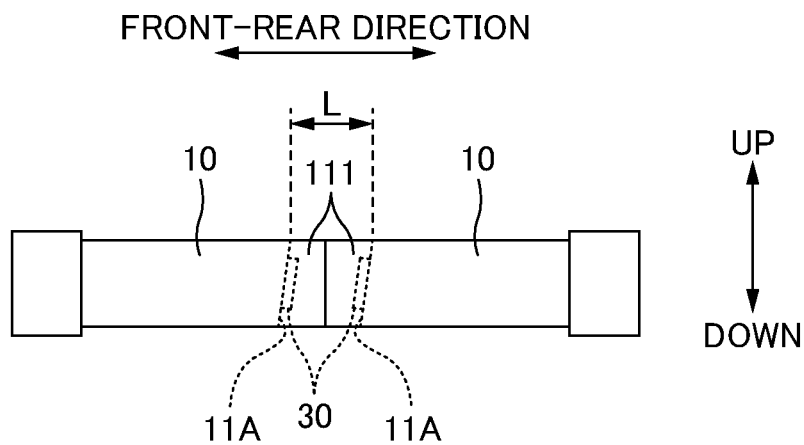
FIG. 31A
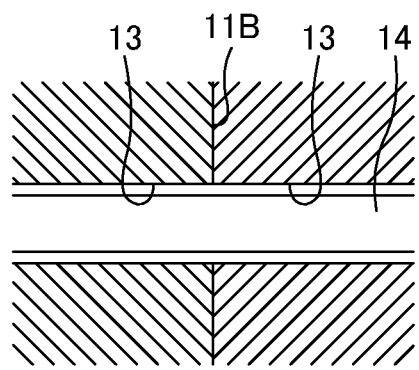
FIG. 31B
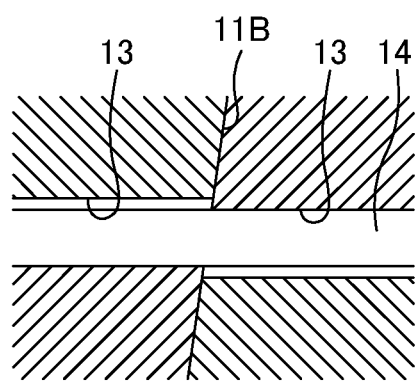
FIG. 31C (REFERENCE)

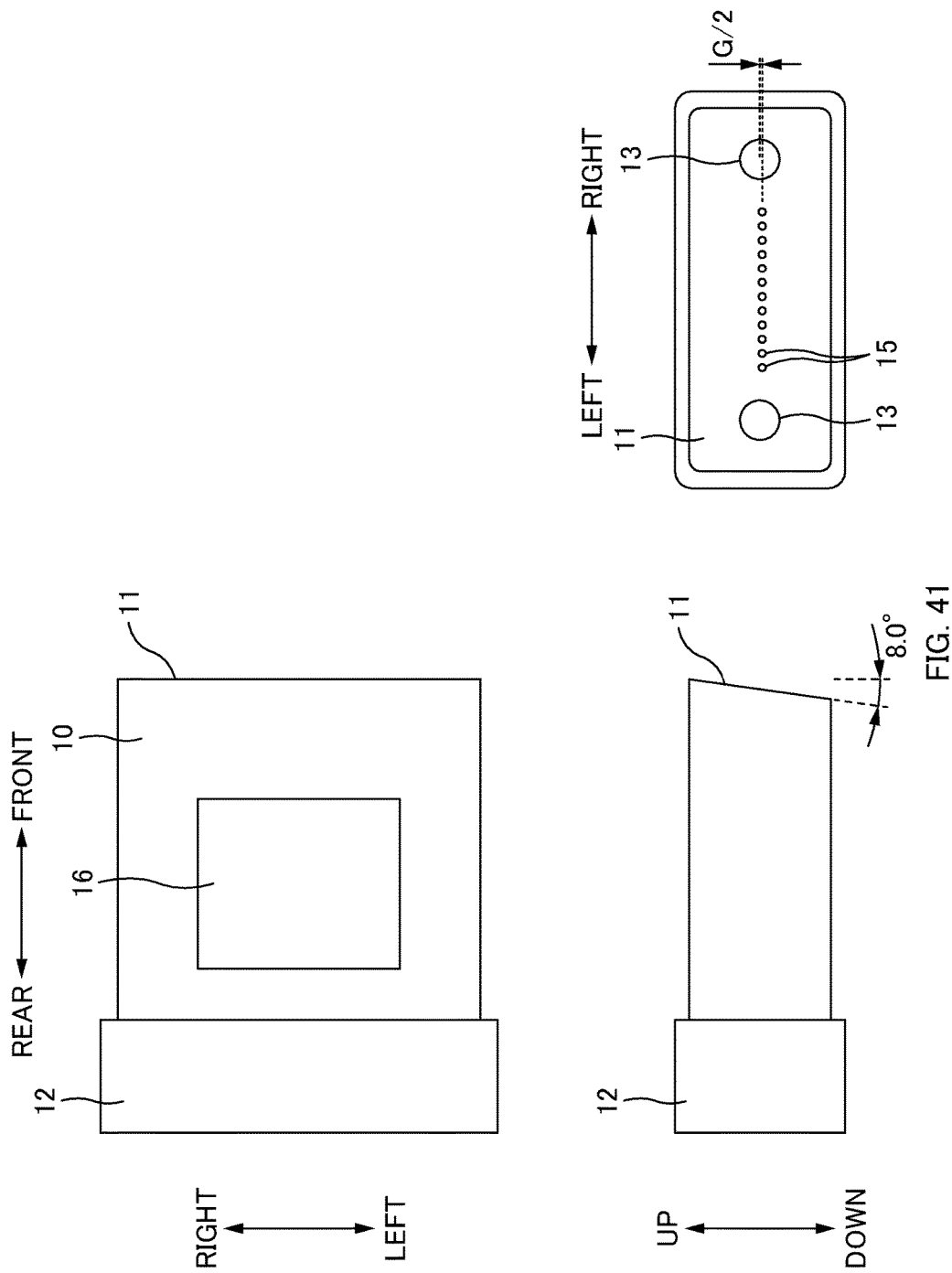

FERRULE WITH OPTICAL FIBER AND OPTICAL CONNECTOR SYSTEM

TECHNICAL FIELD

The present invention relates to ferrules with an optical fiber and optical connector systems.

BACKGROUND

A ferrule defined by Japanese Industrial Standard (hereafter, JIS) C 5981 (F12 type multicore optical fiber connector: MT connector) is known as a ferrule made of resin that is a pin engaging positioning method having guide pins on both side of a plurality of horizontally aligned optical fiber holes. With this type of ferrule, opposing contact endfaces of the ferrules are contacted against each other, to make the optical fiber endfaces of the contact endfaces be physically connected (physically contacted) to each other. With JIS C 5982 (F13 type multicore optical fiber connector: MPO connector), contact endfaces of ferrules are polished obliquely. For example, in PTL 1, FIG. 6, there is disclosed a ferrule with a contact endface that has been polished obliquely. When the contact endface of the ferrule is polished obliquely, an endface of an optical fiber is also polished obliquely, and the characteristic of a reflecting attenuation amount increases.

In PTL 2, there is disclosed that an axial displacement of optical fibers occurs when contact endfaces polished obliquely are contacted against each other. To suppress increase of optical loss due to such displacement in optical axis, forming a collimate lens in a ferrule is disclosed in PTL 3.

CITATION LIST

Patent Literature

PTL 1 Japanese Patent Application Laid-open Publication No. 2002-006177

PTL 2 Japanese Patent Application Laid-open Publication No. 2005-181832

PTL 3 Japanese Patent Application Laid-open Publication No. 2011-059686

SUMMARY

Technical Problem

The ferrule disclosed in PTL 3 is difficult to shape with resin since the ferrule needs a lens, and manufacturing cost is high. On the other hand, in the case where a lens is not formed in a ferrule and a MFD (Mode Field Diameter) is small, optical loss increases when an axis displacement of optical fibers occurs, and also optical loss easily occurs due to dust attached to the optical fiber endfaces. It should be noted that, in the case where contact endfaces of ferrules and optical fiber endfaces are not polished obliquely, and a lens is not formed in the ferrule and MFD is small, a problem that optical loss tends to increase may occur.

This invention has an objective to suppress optical loss without providing a lens to a ferrule.

Solution to Problem

An invention to achieve the above objective is a ferrule with a fiber including:

a ferrule including a positioning hole, a plurality of fiber holes, and an endface perpendicular to an axial direction of the fiber holes;

a lensed fiber with a GRIN lens that has been fusion spliced to a tip of an optical fiber; and a plate that can transmit light propagating through the optical fiber, the plate being attached to the endface of the ferrule, the plate being contacted against with an endface of the lensed fiber that has been inserted into each of the fiber holes, wherein the ferrule is formed with a recess that is depressed from the endface of the ferrule, a refractive index matching material is filled in a space surrounded with the plate and the recess.

Other features of this invention will become clear from the description and the drawings to be described later.

Advantageous Effects of Invention

According to this invention, optical loss can be suppressed, without providing a lens to a ferrule.

BRIEF DESCRIPTION OF DRAWINGS

FIG. 2B is a perspective view of a ferrule with a plate in FIG. 2A removed.

FIG. 3 is an explanatory view of a ferrule of a first embodiment.

FIG. 7 is an explanatory view of a ferrule 10 of a second embodiment.

FIG. 8A is an explanatory view of an optical connector system 20 where an optical connector 21 having a ferrule 10 with an optical fiber is inserted from both sides of an adapter 22. FIG. 8B is an explanatory view showing a positional relationship of ferrules 10 within the adapter 22.

FIG. 14 is an explanatory view of a ferrule 10 of a fifth embodiment.

FIG. 15A is an explanatory view of an optical connector system 20 where an optical connector 21 having a ferrule 10 with an optical fiber is inserted from both sides of an adapter 22. FIG. 15B and FIG. 15C are explanatory views showing a positional relationship of ferrules 10 in an adapter 22.

FIG. 19 is an explanatory view of a ferrule 10 of a modified example of a sixth embodiment.

FIG. 28A is an explanatory view of an optical connector system 20 in which an optical connector 21 having a ferrule 10 with an optical fiber is inserted from both sides of an adapter 22. FIG. 28B is an explanatory view of a positional relationship of ferrules 10 within an adapter 22.

FIG. 31A is an explanatory view showing a state during optical connection in a modified example of an eleventh embodiment. FIG. 31B is a sectional view near openings of positioning holes 13 in a modified example of an eleventh embodiment. FIG. 31C shows the position of the positioning holes 13 of the ferrule 10 in the up-down direction slightly displaced.

FIG. 33B is a perspective view showing a state with a plate 30 in FIG. 33A removed.

FIG. 41 is an explanatory view of a ferrule 10.

FIG. 42A is an explanatory view of an optical connector system 20 in which an optical connector 21 having a ferrule 10 with an optical fiber is inserted from both sides of an adapter 22. FIG. 42B and FIG. 42C are explanatory views of a positional relationship of ferrules 10 within an adapter 22.

Figure 1:
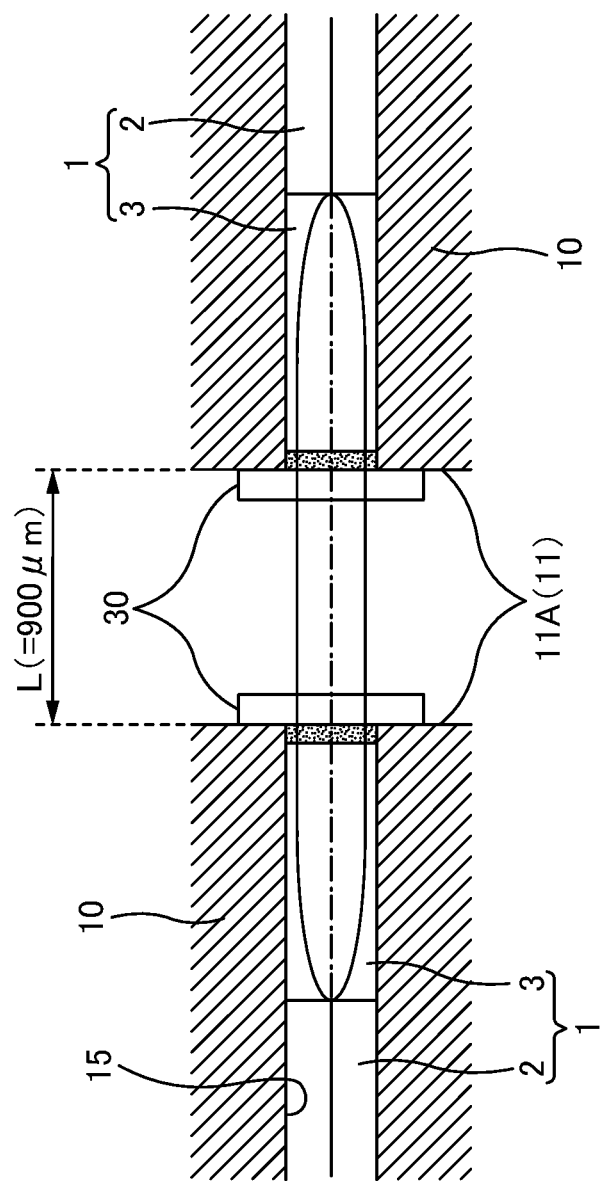
FIG. 1 is an explanatory view of lensed fibers 1 and endfaces (first endfaces 11A) of a ferrule 10.

DESCRIPTION OF EMBODIMENTS (1) At least the following matters will become clear from the description of the specification and the drawings to be described later.

A ferrule with a fiber will become clear, including:

a ferrule including a positioning hole, a plurality of fiber holes, and an endface perpendicular to an axial direction of the fiber holes;

a lensed fiber with a GRIN lens that has been fusion spliced to a tip of an optical fiber; and a plate that can transmit light propagating through the optical fiber, the plate being attached to the endface of the ferrule, the plate being contacted against with an endface of the lensed fiber that has been inserted into each of the fiber holes, wherein the ferrule is formed with a recess that is depressed from the endface of the ferrule, a refractive index matching material is filled in a space surrounded with the plate and the recess. With such a ferrule with a fiber, the configuration will be such that optical loss can be suppressed without providing a lens in the ferrule, and the filling operation of refractive index matching material can be easily performed with such a configuration.

Preferably, an antireflection film is formed to a surface of an outer side of the plate. In this way, a return loss can be suppressed.

Preferably, the ferrule includes a contact endface that contacts a ferrule to another side, the contact endface protruding to a side of the ferrule to the other side than the endface to be attached with the plate and the plate. In this way, a separate member such as a spacer does not have to be arranged in between the ferrule and the ferrule to the other side.

Preferably, the recess is formed with a fiber hole opening surface in which the plurality of the fiber holes is open, the fiber hole opening surface being opposed to a surface to an inner side of the plate, a protruding part that protrudes from the fiber hole opening surface to a side of the plate and that contacts an edge of the plate is formed. In this way, a deformation of the plate can be suppressed.

Preferably, a solid refractive index matching material is arranged to a surface to an inner side of the plate, a surface of an endface of the lensed fiber deforming when contacting against the solid refractive index matching material. In this way, bubbles are not easily formed in the endface of the lensed fiber.

Preferably, both surfaces of the solid refractive index matching material have adhesiveness. In this way, the solid refractive index matching material does not easily come off from the plate and the endface of the lensed fiber.

Preferably, a Shore A hardness and a thickness of the solid refractive index matching material is in a range surrounded by four points of a point where a Shore A hardness is 0, a thickness is 30 μm,
a point where a Shore A hardness is 70, a thickness is 30 μm,
a point where a Shore A hardness is 70, a thickness is 50 μm, and
a point where a Shore A hardness is 0, a thickness is 150 μm. In this way, bubbles are not easily formed in the endface of the lensed fiber that has been contacted against the solid refractive index matching material.

An optical connector system that optically connects two optical connectors will become clear, wherein each optical connector includes
a ferrule including a positioning hole, a plurality of fiber holes, and an endface perpendicular to an axial direction of the fiber holes,
a lensed fiber with a GRIN lens that has been fusion spliced to a tip of an optical fiber, and
a plate that can transmit light propagating through the optical fiber, the plate being attached to the endface of the ferrule, the plate being contacted against with an endface of the lensed fiber that has been inserted into each of the fiber holes,
the ferrule is formed with a recess depressed from the endface of the ferrule,
a refractive index matching material is filled in a space surrounded with the plate and the recess, and
the plates of the optical connectors are arranged opposed to each other with a predetermined interval in between. According to such an optical connector system, the configuration will be such that optical loss can be suppressed without providing a lens in the ferrule, and the filling operation of the refractive index matching material in this configuration can be easily performed.

Preferably, the ferrule includes a contact endface that contacts a ferrule to another side, the contact endface protruding to a side of the ferrule to the other side than the endface that has been attached with the plate and the plate, and the plates are arranged opposed to each other with a predetermined interval in between, by the contact endface of the ferrule contacting the contact endface of the ferrule to the other side. In this way, a separate member such as a spacer does not have to be arranged between the ferrule and the ferrule to the other side.

Preferably, the ferrule contacts a spacer, to arrange the plates to be opposed with a predetermined interval in between. In this way, the ferrules can be opposed with a predetermined interval in between.

A ferrule with a fiber will become clear, including:
a ferrule including a positioning hole, a plurality of fiber holes, and an endface perpendicular to an axial direction of the fiber holes,
a lensed fiber with a GRIN lens that has been fusion spliced to a tip of an optical fiber; and
a plate that can transmit light propagating through the optical fiber, the plate being formed with an antireflection film to a surface to an outer side, the plate being attached to the endface of the ferrule such that a surface to an inner side opposes an endface of the lensed fiber that has been inserted into each of the fiber holes. According to such a ferrule with a fiber, optical loss can be suppressed, without providing a lens to the ferrule.

Preferably, a coreless fiber has been fusion spliced to a tip of the GRIN lens, and the plate is attached to the endface after an end part of the lensed fiber protruding from each of the fiber holes has been polished. In this way, a space between the endface of the lensed fiber and the plate can be made small, so that when the refractive index matching material is filled between the endface of the lensed fiber and the plate, bubbles are not easily formed in the endface of the lensed fiber.

(2) Further, at least the following matters will become clear from the description of the specification and the drawings to be described later.

A ferrule with a fiber will become clear, comprising:
a ferrule including a plurality of fiber holes;
a lensed fiber with a GRIN lens that has been fusion spliced to a tip of an optical fiber; and
a plate that can transmit light propagating through the optical fiber, the plate being attached to an endface of the ferrule, the plate being contacted against with an endface of the lensed fiber that has been inserted into each of the fiber holes,
wherein the endface of the ferrule and the plate are inclined with respect to a surface perpendicular to an optical axis of the lensed fiber that has been inserted into each of the fiber holes, and
a refractive index matching material is filled in a space between the endface of the lensed fiber and the plate. With such a ferrule with a fiber, optical loss can be suppressed, without providing a lens to the ferrule.

Preferably, an antireflection film is formed to a surface to an outer side of the plate. In this way, a return loss can be suppressed.

Preferably, the ferrule is formed with a recess depressed from the endface of the ferrule, and the refractive index matching material is filled in a space surrounded with the plate and the recess. In this way, filling of the refractive index matching material will be easy.

Preferably, a fiber groove to support the lensed fiber is formed in a bottom surface of the recess. In this way, an end part of the lensed fiber does not easily bend.

Preferably, the recess is formed with a fiber hole opening surface including a plurality of the fiber holes that is open, the fiber opening surface opposing a surface to an inner side of the plate, a protruding part that protrudes from the fiber hole opening surface to a side of the plate and that contacts an edge of the plate is formed. In this way, distortion of the plate can be suppressed.

Preferably, a groove formed to penetrate through upper parts of openings of the plurality of the fiber holes is formed in the endface of the ferrule, and at least a part of an inner wall surface configuring the groove is positioned to an upper side than the fiber holes. In this way, bubbles are not easily formed in the endface of the lensed fiber.

Preferably, a solid refractive index matching material is arranged to a surface to an inner side of the plate, a surface of an endface of the lensed fiber deforming when contacting against the solid refractive index matching material. In this way, bubbles are not easily formed in the endface of the lensed fiber.

Preferably, both surfaces of the solid refractive index matching material have adhesiveness. In this way, the solid refractive index matching material does not easily come off from the plate and the endface of the lensed fiber.

Preferably, a Shore A hardness and a thickness of the solid refractive index matching material is in a range surrounded by four points of a point where a Shore A hardness is 0, a thickness is 30 μm, a point where a Shore A hardness is 70, a thickness is 30 μm, a point where a Shore A hardness is 70, a thickness is 50 μm, and a point where a Shore A hardness is 0, a thickness is 150 μm. In this way, bubbles are not easily formed in the endface of the lensed fiber that has been contacted against the solid refractive index matching material.

An optical connector system including an adapter and two optical connectors to be inserted into both sides of the adapter will become clear, wherein each optical connector includes a ferrule including a plurality of fiber holes, a lensed fiber with a GRIN lens that has been fusion spliced to a tip of an optical fiber, and a plate that can transmit light propagating through the optical fiber, the plate being attached to an endface of the ferrule, the plate being contacted against with an endface of the lensed fiber that has been inserted into the fiber holes, wherein the endface of the ferrule and the plate is inclined with respect to a surface perpendicular to an optical axis of the lensed fiber that has been inserted into each of the fiber holes, a refractive index matching material is filled into a space between the endface of the lensed fiber and the plate, the adapter includes a spacer protruding to an inner side, with the ferrule contacting the spacer inside the adapter, endfaces of the ferrules are arranged opposed to each other with a predetermined interval in between. According to such an optical connector system, optical loss can be suppressed without providing a lens in the ferrule.

(3) Furthermore, at least the following matters will become clear from the description of the specification and the drawings to be described later.

A ferrule with a fiber becomes clear, the ferrule with a fiber including:

a ferrule including a plurality of fiber holes, and a first endface inclined with respect to a surface perpendicular to an axial direction of the fiber holes, a lensed fiber with a GRIN lens that has been fusion spliced to a tip of an optical fiber; and a plate that can transmit light propagating through the optical fiber, the plate being attached to the first endface of the ferrule, the plate being contacted against with an endface of the lensed fiber that has been inserted into each of the fiber holes, wherein the ferrule includes a second endface that contacts a ferrule to another side, the second endface protruding to a side to the ferrule to the other side than the first endface and the plate. According to such a ferrule with a fiber, optical loss can be suppressed without providing a lens in the ferrule.

Preferably, the second endface is parallel to the first endface. In this way, manufacturing of the ferrule will be easy.

Preferably, the ferrule includes a positioning hole to which a positioning pin is to be inserted, the second endface is a surface perpendicular to an axial direction of the positioning hole. In this way, position displacement of the positioning holes 13 in the up-down direction can be suppressed.

Preferably, the first endface is inclined toward the other side ferrule the nearer to a side of an adhesive filling window, a center position of the plurality of the fiber holes is in a position displaced to an opposite side to the side to the adhesive filling window, with respect to a positioning hole in which a positioning pin is to be inserted. In this way, optical connection is possible even when light is refracted with an inclined surface.

Preferably, the ferrule is formed with a recess that is depressed from the endface of the ferrule, a refractive index matching material is filled in a space surrounded with the plate and the recess. In this way, filling of the refractive index matching material will be easy.

Preferably, a fiber groove to support the lensed fiber is formed in a bottom surface of the recess. In this way, an end part of the lensed fiber does not easily bend.

Preferably, the recess is formed with a fiber hole opening surface in which the plurality of the fiber holes is open, the fiber hole opening surface being opposed to a surface to an inner side of the plate, a protruding part that protrudes from the fiber hole opening surface to a side of the plate and that contacts an edge of the plate is formed. In this way, distortion of the plate can be suppressed.

Preferably, a groove formed to penetrate through upper parts of openings of the plurality of the fiber holes is formed in the endface of the ferrule, and at least a part of an inner wall surface configuring the groove is positioned to an upper side than the fiber holes. In this way, bubbles are not easily formed in the endface of the lensed fiber.

Preferably, a solid refractive index matching material is arranged to a surface to an inner side of the plate, a surface of an endface of the lensed fiber deforming when contacting against the solid refractive index matching material. In this way, bubbles are not easily formed in the endface of the lensed fiber.

Preferably, both surfaces of the solid refractive index matching material have adhesiveness. In this way, the solid refractive index matching material does not easily come off from the plate and the endface of the lensed fiber.

Preferably, a Shore A hardness and a thickness of the solid refractive index matching material is in a range surrounded by four points of a point where a Shore A hardness is 0, a thickness is 30 μm, a point where a Shore A hardness is 70, a thickness is 30 µm, a point where a Shore A hardness is 70, a thickness is 50 µm, and a point where a Shore A hardness is 0, a thickness is 150 µm. In this way, bubbles are not easily formed in the endface of the lensed fiber that has been contacted against the solid refractive index matching material.

An optical connector system that optically connects two optical connectors will become clear, wherein each optical connector includes a ferrule including a plurality of fiber holes, and a first endface inclined with respect to a surface perpendicular to an axial direction of the fiber holes, a lensed fiber with a GRIN lens that has been fusion spliced to a tip of an optical fiber, and a plate that can transmit light propagating through the optical fiber, the plate being attached to the first endface of the ferrule, the plate being contacted against with an endface of the lensed fiber that has been inserted into the fiber holes, wherein the ferrule includes a second endface that contacts a ferrule to another side, the second endface protruding to the side of the ferrule to the other side than the first endface and the plate, with the second endfaces of the optical connector being made to contact each other, the first endfaces of the ferrules are arranged opposed to each other with a predetermined interval in between. With such an optical connector system, optical loss can be suppressed without providing a lens in the ferrule.

(4) At least the following matters will become clear from the description of the specification and the drawings to be described later.

A ferrule with a fiber will become clear, including:

a ferrule including a plurality of fiber holes, and having the fiber holes open in an endface of the ferrule; and a lensed fiber including an optical fiber, a GRIN lens, and a coreless fiber, the GRIN lens being fusion spliced to a tip of an optical fiber, the coreless fiber being fusion spliced to a tip of the GRIN lens;

wherein in the endface of the ferrule, an endface of the coreless fiber of the lensed fiber that has been inserted into each of the fiber holes is inclined with respect to a surface perpendicular to an optical axis of the lensed fiber. With such a ferrule with a fiber, optical loss can be suppressed, without providing a lens to the ferrule.

Preferably, the ferrule includes two positioning holes arranged to sandwich the plurality of the fiber holes, wherein the endface of the ferrule is inclined when viewed from a direction in which the two positioning holes are aligned. In this way, by polishing along the endface of the ferrule, the endface of the coreless fiber can be inclined with respect to a surface perpendicular to an optical axis.

Preferably, the ferrule includes two positioning holes arranged to sandwich the plurality of the fiber holes, wherein the endface of the ferrule is inclined when viewed from a direction in which the two positioning holes are aligned and from a direction perpendicular to an axial direction of the positioning holes. In this way, by polishing along the endface of the ferrule, the endface of the coreless fiber can be inclined with respect to a surface perpendicular to an optical axis.

Preferably, the ferrule includes two positioning holes arranged to sandwich the plurality of the fiber holes, wherein the endface of the ferrule is a surface perpendicular to an axial direction of the positioning holes, and an axial direction of the fiber holes is inclined with respect to the axial direction of the positioning holes. In this way, even when the endface of the ferrule is not inclined, by polishing along the endface of the ferrule, the endface of the coreless fiber can be inclined with respect to a surface perpendicular to an optical axis.

An optical connector system that includes an adapter, and optical connectors to be inserted to both side of the adapter will become clear, wherein (A) each optical connector includes a ferrule including a plurality of fiber holes, the fiber holes being open in an endface, and a lensed fiber including an optical fiber, a GRIN lens, and a coreless fiber, the GRIN lens being fusion spliced to a tip of an optical fiber, the coreless fiber being fusion spliced to a tip of the GRIN lens, and in the endface of the ferrule, an endface of the coreless fiber of the lensed fiber that has been inserted into each of the fiber holes is inclined with respect to a surface perpendicular to an optical axis of the lensed fiber, (B) the adapter includes a spacer protruding to an inner side, (C) with the ferrule contacting the spacer inside the adapter, the endfaces of the ferrules are arranged opposed to each other with a predetermined interval in between. With such an optical connector system, optical loss can be suppressed, without providing a lens to the ferrule.

A manufacturing method of a ferrule with a fiber will become clear, the manufacturing method including:

preparing a lensed fiber including an optical fiber, a GRIN lens, and a coreless fiber, the GRIN lens being fusion spliced to a tip of an optical fiber, the coreless fiber being fusion spliced to a tip of the GRIN lens;

preparing a ferrule including a plurality of fiber holes, the fiber holes being open in an endface;

fixing the lensed fiber in each of the fiber holes by inserting the lensed fiber in each of the fiber holes; and inclining an endface of the coreless fiber of the lensed fiber that has been inserted into each of the fiber holes with respect to a surface perpendicular to an optical axis of the lensed fiber, by polishing along the endface of the ferrule. With such a manufacturing method, optical loss can be suppressed, without providing a lens in the ferrule.

First Embodiment

<Regarding Endfaces of Lensed Fiber 1 and Ferrule 10>

FIG. 1 is an explanatory view of endfaces (first endfaces 11A) of lensed fibers 1 and ferrules 10. To make the description easy to understand, sizes and angles have been shown in an exaggerated manner.

The lensed fiber 1 includes a single-mode optical fiber 2 and a GRIN lens 3, and the lensed fiber 1 is an optical fiber with the GRIN lens 3 fusion spliced to a tip of the single-mode optical fiber 2.

The GRIN lens 3 is a gradient index lens in which a refractive index gradually decreases from a center axis toward an outer periphery. A graded index optical fiber also has a refractive index that gradually decreases from a center axis toward an outer periphery, and thus the graded index optical fiber can also be used as the GRIN lens 3. Further, the GRIN lens 3 is made into a predetermined length such that the GRIN lens functions as a collimator lens. Specifically, the GRIN lens 3 has a length of $(2n+1)/4$ times that of a pitch length which is a length of a standing wave for one period (note that, n is an integer of 0 or greater), and here the length of the GRIN lens 3 is, for example, 590 µm. In this way, a light that enters the GRIN lens 3 from the single-mode optical fiber 2 is changed to a parallel light within the GRIN lens 3, and exits from the GRIN lens 3. Conversely, the parallel light that enters the GRIN lens 3 is converged within the GRIN lens 3, and enters from the GRIN lens 3 to the single-mode optical fiber 2.

A plate 30 that can transmit optical signals is arranged to the tip of the GRIN lens. The plate 30, to which the endface of the lensed fiber 1 is contacted against, is arranged perpendicular to an optical axis of the lensed fiber 1. Since the endface (first endface 11A) of the ferrule 10 is perpendicular to the optical axis of the lensed fiber 1, when the plate 30 is arranged to the first endface 11A of the ferrule 10, the plate 30 is arranged perpendicular to the optical axis of the lensed fiber 1.

A refractive index matching material is filled between the plate 30 and the endface of the lensed fiber 1. This is because a space is sometimes formed between the endface of the lensed fiber 1 and the plate 30. The refractive index of the refractive index matching material is adjusted to a same degree as the refractive index (refractive index of glass) of the lensed fiber 1 and the plate 30. In other words, the refractive index of the refractive index matching material is adjusted to be nearer to the refractive index of the lensed fiber 10 and the plate 30 than the refractive index of air. Thus, by filling with the refractive index matching material can suppress Fresnel reflection.

Next, paths of optical signals that propagate through two lensed fibers 1 are described. Here, the optical signals are described to propagate from the left side lensed fiber 1 to the right side lensed fiber 1.

The optical signals that have propagated through the left side lensed fiber 1 are emitted from the outer side surface of the plate 30 toward the right side, through the refractive index matching material and the plate 30. The optical signals that have propagated through the air enter the right side plate 30. The optical signals that enter the right side plate 30 propagate through the right side lensed fiber 1 via the plate 30 and the refractive index matching material.

The optical signals that propagate through the air are not completely parallel light, and a beam waist is formed in a center part of the optical path so that the diameter becomes smaller in the optical path. In such a case, an interval between endfaces of the lensed fibers 1 is preferably made into a predetermined interval. In the below description, an interval between the first endfaces 11A of the ferrules 10 to optically connect the left and the right lensed fibers (an interval in an optical axis direction of the lensed fibers 1) is L.

In this embodiment, because a lens does not have to be formed in the ferrule 10, manufacturing of the ferrule 10 is easy. Further, since MFD (Mode Field Diameter) of the optical signals that propagate between the ferrules 10 is large, optical loss can be suppressed even when the optical axes of the lensed fibers 1 are slightly displaced, and optical loss due to dust attached on the endfaces of the lensed fibers 1 can also be suppressed. The first endfaces 11A of the ferrules 10 do not have to be contacted with each other, and the endfaces of the lensed fibers 1 also do not directly contact each other, thus compared to PC connection of normal MT ferrules to each other, there is an advantage that the first endfaces 11A of the ferrules 10 and the endfaces of the lensed fibers 1 are not easily damaged. Further, the plates 30 do not directly contact each other, and thus there is also an advantage that coating of the plates 30 that have been made antireflective are not easily damaged.

<Regarding Ferrule 10>

Figure 2A:
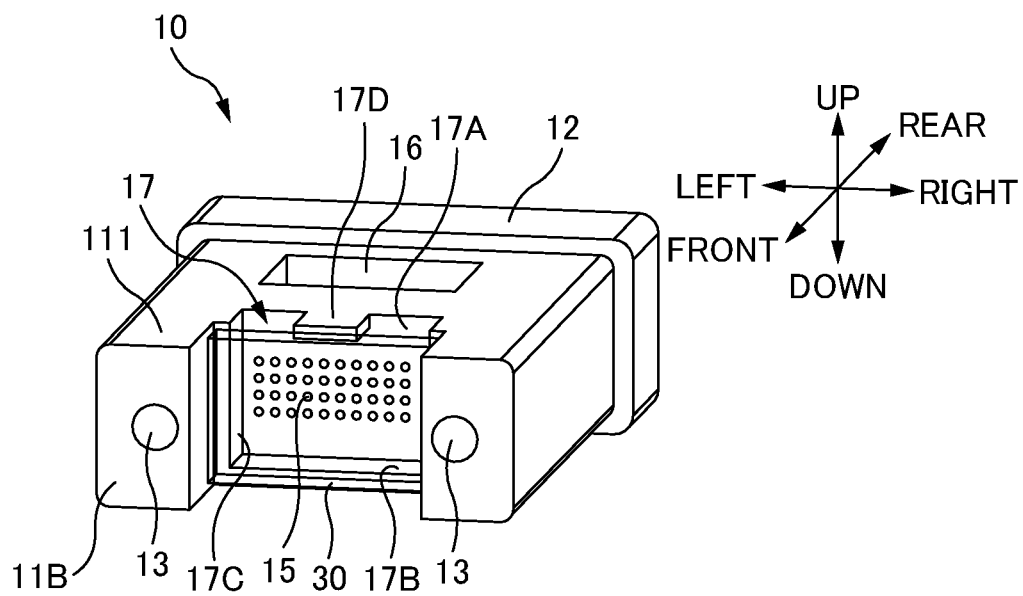
FIG. 2A and FIG. 2B are perspective views of a ferrule 10 of a first embodiment.
Figure 2B:
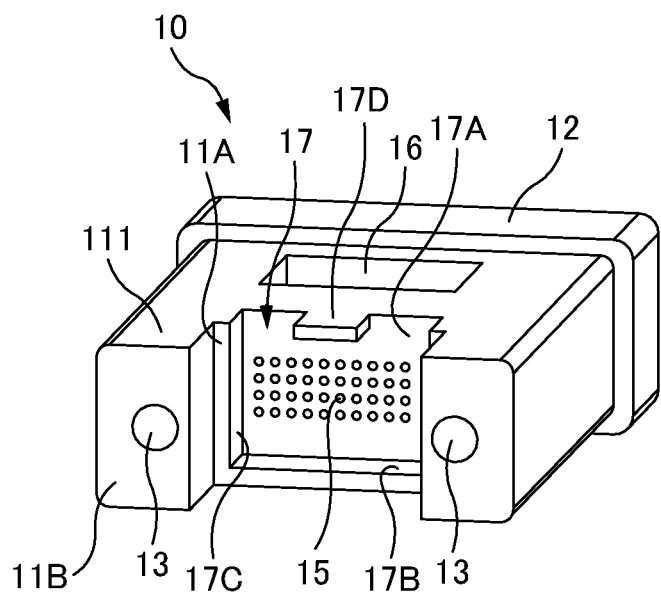

FIG. 2A and FIG. 2B are perspective views of the ferrule 10 of a first embodiment. FIG. 2B is a perspective view showing a state where a plate in FIG. 2A has been removed. FIG. 3 is an explanatory view of the ferrule of the first embodiment. In FIG. 3, for the sake of explanation, the ferrule 10 in a side view is a partial section, and is shown in a state with the lensed fibers 1 inserted in fiber holes 15.

In the below description, an aligning direction of two positioning holes 13 is referred to as a "left-right direction". An axial direction of the positioning holes 13 is referred to as a "front-rear direction", and a side that opposes with a ferrule 10 to the other side is referred to as "front" and an opposite side is referred to as "rear". A direction perpendicular to the left-right direction and the front-rear direction is referred to as an "up-down direction", and a side that has been provided with an adhesive filling window 16 is referred to as "up" and an opposite side is referred to as "down".

The ferrule 10 is a member that holds an end part of the lensed fiber 1. A brim part 12 is formed to a rear side of the ferrule 10. The brim part 12 is a section that protrudes to the outer side from an outer peripheral surface. The ferrule 10 that includes the brim part 12 is integrally formed with resin. End parts of a plurality of lensed fibers 1 are to be held inside the ferrule 10. The ferrule 10 of this embodiment is configured to be approximately the same as a ferrule defined by JIS C 5982 (F13 type multicore optical fiber connector: MPO connector), and sizes and positional relationships of the positioning holes 13 and the fiber holes 15 and the like are as defined by the Standard. Note that, the ferrule 10 is formed with spacer parts 111 and a recess 17 to be described later.

The ferrule 10 includes two positioning holes 13, a plurality of fiber holes 15, and an adhesive filling window 16. The ferrule 10 includes a plate 30 attached to the first endface 11A. The ferrule 10 has a second endface 11B (an endface of a spacer part 111) that protrudes to a front side than the first endface 11A and the plate 30 (to the side of the ferrule to the other side). A recess is formed in the first endface 11A of the ferrule 10. Hereinafter, each of the configuring elements is described.

Figure 4:
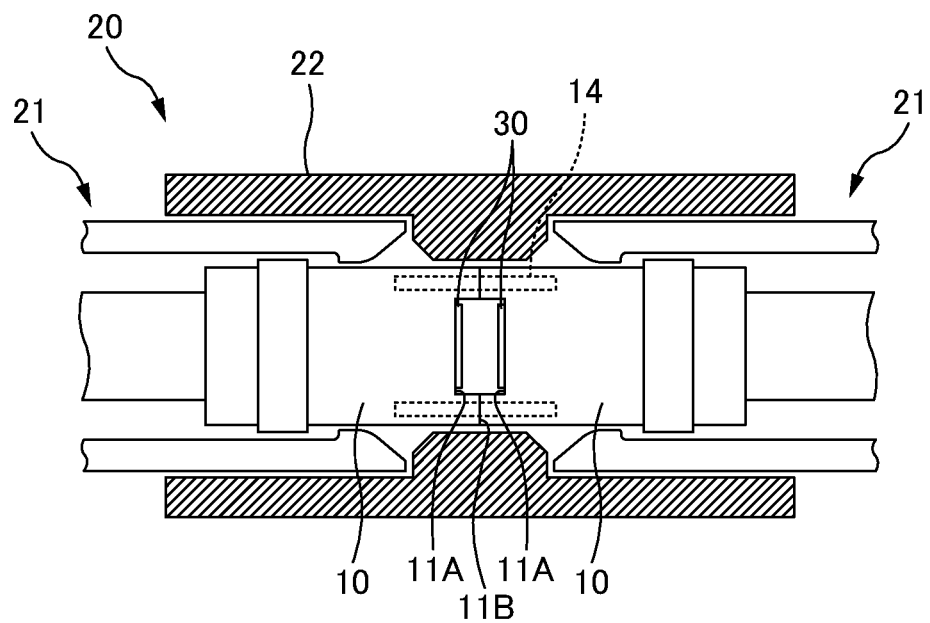
FIG. 4 is an explanatory view during optical connection.

The positioning holes 13 are holes in which positioning pins 14 are to be inserted (refer to FIG. 4). The positioning holes 13 and the positioning pins 14 are positioning parts to position the ferrules 10. By inserting the positioning pins 14 into the positioning holes 13, the ferrules 10 are positioned with respect to each other. The positioning holes 13 penetrate through the ferrule 10 in the front-rear direction, and the positioning holes 13 are formed with an interval in between in the left-right direction, such as to sandwich the plurality of the fiber holes 15 from the left and the right.

The fiber holes 15 are holes into which end parts of the lensed fibers 1 are to be inserted. As shown in FIG. 1, the lensed fiber 1 is inserted into the fiber hole 15. The fiber holes 15 penetrate through between the front side endface of the ferrule 10 (here, fiber hole opening surface 17A) and the adhesive filling window 16. The fiber holes 15 are formed in parallel in the front-rear direction. Here, the plurality of the fiber holes 15 is arranged two-dimensionally. Specifically, four rows of a row of twelve fiber holes 15 aligned in the left-right direction are arranged in the up-down direction. The plurality of the fiber holes 15 may be arranged aligned in one line in the left-right direction, however. The fiber holes 15 are sections forming the optical paths inside the ferrule 10 and are holes parallel to the optical axes of the lensed fibers 1.

The adhesive filling window 16 is a hollow part used to fill adhesive. The rear side endface of the ferrule 10 is formed with a fiber insertion opening (not shown) in which the lensed fiber 1 is to be inserted. The lensed fiber 1 inserted from this fiber insertion opening crosses the adhesive filling window 16, and is inserted in the fiber hole 15. By filling the adhesives from the adhesive filling window 16, the lensed fiber 1 is to be fixed to the ferrule 10.

The plate 30 is attached to the first endface 11A to the front side of the ferrule 10. The openings of the fiber holes 15 are to be opposed to the plate 30.

The front side first endface 11A of the ferrule 10 is perpendicular with respect to the axial direction of the fiber holes 15. Thus, the front side first endface 11A of the ferrule 10 is perpendicular with respect to the optical axes of the lensed fibers 1 that have been inserted into the fiber holes 15. In this way, the plate 30 can be easily arranged perpendicular with respect to the optical axes of the lensed fibers 1. The endfaces of the lensed fibers 1 are perpendicular to the optical axes, and thus the front side first endface 11A of the ferrule 10 is parallel to the endfaces of the lensed fibers 1 that have been inserted into the fiber holes 15.

The plate 30 is, for example, a glass plate that can transmit light propagating through the optical fiber 2. A surface to an inner side (rear side) of the plate 30 faces a side of the endface of the lensed fiber 1, and a surface to an outer side (front side) of the plate 30 opposes a plate 30 attached to a first endface 11A of the ferrule 10 to the other side.

The plate 30 is shaped as a plate-shape that is long in the left-right direction. The shape of the plate 30 is not limited to this shape, however, and may be, for example, other shapes such as a trapezoid, or a rhombus when seen from the front-rear direction. The size of the plate 30 in the left-right direction is a length in which the plate can oppose openings of the plurality of the fiber holes 15 aligned in the left-right direction.

The surface to the outer side (front side) of the plate 30 is coated with an antireflection film. For example, the antireflection film is an AR coating film laminated with two types of thin film that have a different refractive index from each other. By forming the antireflection film on the plate 30, transmission loss and return loss can be reduced. Although there is a restriction in the capacity that can be processed at once with a coating device, since the target of the coating process is only the plate 30, multiple plates 30 can be set in the coating device, and the plate 30 can be formed with an antireflection film at low cost. Supposing that AR coating process is performed on the endface of the lensed fiber 1, or supposing that AR coating process is performed on the lensed fiber 1 in the state attached to the ferrule, throughput of the coating device decreases, thus cost is high in coating the antireflection film.

Spacer parts 111 are formed to the front side of the ferrule 10. The spacer parts 111 are sections that protrude to the front side (the side of the ferrule to the other side) than the first endface 11A and the plate 30. The spacer parts 111 are sections that contact the ferrule 10 to the other side, to make the first endfaces 11A of the ferrules 10 be opposed to each other with a predetermined interval L, and to make the plates 30 be opposed to each other with a predetermined interval.

A pair of the spacer parts 111 is formed protruding to the front side from the left and the right of the ferrule 10. The pair of the spacer parts 111 is arranged so as to sandwich the first endface 11A and the plate 30 from the left and the right.

The endfaces (second endfaces 11B) to the front side of the spacer part 111 are contact endfaces that contact the ferrule to the other side. The second endfaces 11B protrude to the front side than the first endface 11A and the plate 30 (the side of the ferrule to the other side). Thus, when the second endfaces 11B of the two ferrules 10 are made to contact and oppose each other, the plates 30 can be made non-contacting with each other.

In the second endfaces 11B, the positioning holes 13 are open. Thus, the second endfaces 11B that are to be contact endfaces contacting the ferrule to the other side are to be provided near to the positioning parts (the positioning holes 13 and the positioning pins 14). Note that, the second endfaces 11B are perpendicular to an axial direction of the positioning holes 13.

A recess 17 is formed in the first endface 11A of the ferrule 10. The recess 17 is a section depressed from the front side first endface 11A, and is a section that forms a space to be filled with an adhesive to be a refractive index matching material. The recess 17 is formed with a fiber hole opening surface 17A, a bottom surface 17B, and side surfaces 17C. The fiber hole opening surface 17A is a rear side inner wall in the recess 17 and the fiber hole opening surface 17A is positioned to the rear side from the first endface 11A of the ferrule 10. The fiber hole opening surface 17A is a surface opposing an inner side surface of the plate 30, and the plurality of the fiber holes 15 is open in the fiber opening surface.

The recess 17 is further formed with a protruding part 17D. The protruding part 17D is a section that protrudes to the front side (the side to the plate 30) from an upper edge of the fiber hole opening surface 17A, and the protruding part 17D is a section that contacts an upper edge of the plate 30. A left edge, a right edge, and a lower edge of the plate 30 contact the first endface 11A of the ferrule 10, and also the upper edge of the plate 30 contacts the protruding part 17D. In this way, distortion of the plate 30 due to shrinkage of the adhesive filled in the recess 17 can be suppressed. In particular, when the plurality of the fiber holes 15 is two-dimensionally arranged as in this embodiment, the recess 17 is deeply formed, and the effect of shrinkage of the adhesive to the plate 30 becomes large, and thus forming the protruding part 17D to the ferrule 10 is particularly effective. The protruding part 17D does not have to be provided to the recess 17, however.

FIG. 4 is an explanatory view showing a state during optical connection. An optical connector system 20 has two optical connectors 21 each including a ferrule 10 with an optical fiber, and an adapter 22 that can be inserted from both sides with the two optical connectors 21.

When the optical connector 21 is each inserted from both sides of the adapter 22, the first endfaces 11A of the ferrules 10 of the optical connectors 21 are arranged opposed to each other, and the plates 30 attached to the first endfaces 11A are arranged opposed to each other. The positioning pins 14 protrude from the ferrule 10 of a male optical connector 21, and these positioning pins 14 are inserted into the positioning holes 13 of the ferrule 10 of the female optical connector 21, to position the ferrules 10 within the adapter 22 to a direction perpendicular to the positioning pins 14 (the left-right direction and the up-down direction).

When the second endfaces 11B of the ferrules 10 of the optical connectors 21 contact each other, the first endfaces 11A of the ferrules 10 are arranged opposed to each other with a predetermined interval L in between, and the plates 30 attached to the first endfaces 11A are arranged opposed to each other with a predetermined interval in between. In other words, when the second endfaces 11B of the ferrules 10 contact each other in the adapter 22, the ferrules 10 are positioned in the front-rear direction with respect to each other, and the plates 30 are positioned in the front-rear direction with respect to each other. In order to perform positioning in the front-rear direction in this way, with respect to the first endface 11A, the second endface 11B is positioned to the front side by half the interval L between the first endfaces 11A of the ferrules 10 described above (refer to FIG. 3).

<Manufacturing Method of Ferrule 10 with Optical Fiber>

Figure 5:
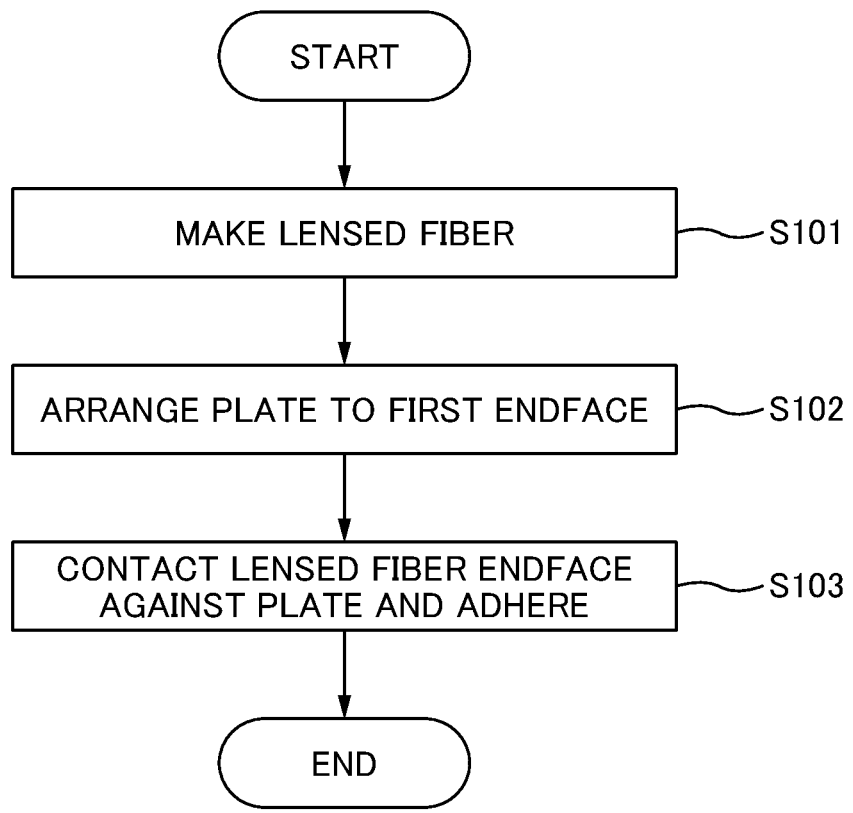
FIG. 5 is a flowchart of a manufacturing method of a ferrule 10 with an optical fiber.

FIG. 5 is a flowchart of a manufacturing method of a ferrule 10 with an optical fiber.

First, a lensed fiber 1 is made (S101). Specifically, first a grated index optical fiber is fusion spliced to a single-mode optical fiber 2, and the fusion spliced grated index optical fiber is cut into a predetermined length, and a GRIN lens 3 is formed to a tip of the single-mode optical fiber 2. An endface (a cut surface) of the GRIN lens 3 at this time is perpendicular to an optical axis of the lensed fiber 1. Note that, fusion splicing is performed so that an outer diameter of a section that has been fusion spliced can pass through the fiber holes 15 (fiber holes 15 with an inner diameter defined by the Standard). A plurality of such lensed fibers 1 is prepared.

Next, an operator prepares the above described ferrule 10, and arranges the plate 30 to the first endface 11A of the ferrule 10 (S102). When the plate 30 is pressed against and contacted to the first endface 11A of the ferrule 10, the plate 30 is arranged perpendicular to the axial direction of the fiber holes 15 of the ferrule 10.

Next, with the endfaces of the lensed fiber 1 contacted against the plate 30, the operator makes the lensed fiber 1 and the plate 30 adhere to the ferrule 10 (S103). At this time, the operator fills the adhesive to be the refractive index matching material in the space surrounded with the plate 30 and the recess 17. In other words, the adhesive to be the refractive index matching material is filled in the space surrounded with the plate 30, the fiber hole opening surface 17A, the bottom surface 17B, and the side surfaces 17C. In this way, the refractive index matching material (the adhesive) is filled between the plate 30 and the endfaces of the lensed fibers 1. When the adhesive sets, the endfaces of the lensed fibers 1 are adhered to the plate 30. When the adhesive fills the recess 17, the adhesive penetrates between the first endface 11A of the ferrule 10 and the plate 30, thus the plate 30 is adhered to the first endface 11A. Here an ultraviolet cure adhesive is used as the refractive index matching material, and after filling the adhesive, when an ultraviolet ray is irradiated through the plate 30, the adhesive hardens, and the endface of the lensed fiber 1 is adhered to the plate 30. Further, since the ultraviolet cure adhesive has permeated between the first endface 11A of the ferrule 10 and the plate 30, when the ultraviolet ray is irradiated through the plate 30, the plate 30 is adhered to the first endface 11A of the ferrule 10. Instead of the ultraviolet cure adhesive, a thermosetting adhesive may be used. The operator fills the adhesive from the adhesive filling window 16 into the ferrule 10, to fix the lensed fiber 1 to the ferrule 10.

From the above operations, the ferrule 10 with an optical fiber is manufactured. Note that, when the ferrules 10 with an optical fiber manufactured as described above are arranged opposed as shown in FIG. 1 and optically connected, optical loss can be made to approximately 0.7 dB, and return loss can be made to approximately 60 dB.

With the optical connector system 20 of the first embodiment (refer to FIG. 4), two ferrules 10 are arranged opposed, and the second endfaces 11B of the ferrules 10 contact each other, to make the plates 30 be arranged opposed to each other with a predetermined interval. In this way, even without arranging separate members such as spacers between the ferrules, as shown in FIG. 1, the plates 30 are positioned with respect to each other in the front-rear direction, and the lensed fibers 1 of the two ferrules 10 can be optically connected. Because the MFD (Mode Field Diameter) of optical signals is large with the GRIN lens 3, optical loss can be suppressed, and since a lens does not have to be formed in the ferrule 10, manufacturing of the ferrule 10 is easy. Further, since a recess is formed in the ferrule 10, when an adhesive to be a refractive index matching material is filled in the recess 17, the refractive index matching material (adhesive) can be filled between the plate 30 and the endfaces of the lensed fibers 1.

Second Embodiment

In the first embodiment, the spacer parts 111 have been formed in the front side of the ferrule 10. The ferrule 10, however, does not have to have the spacer parts 111.

Figure 6:
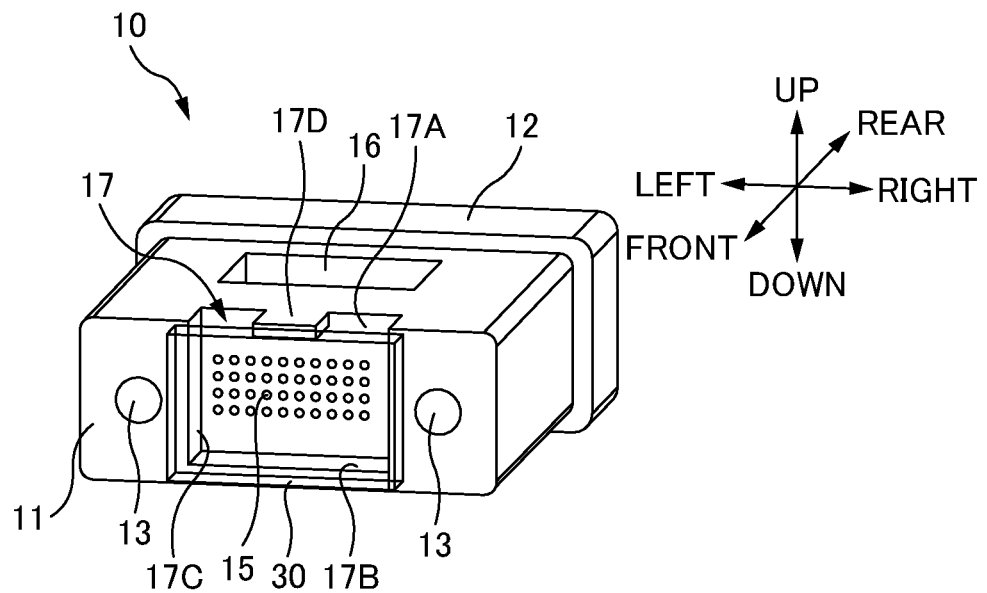
FIG. 6 is a perspective view of a ferrule 10 of a second embodiment.

FIG. 6 is a perspective view of a ferrule 10 of a second embodiment. FIG. 7 is an explanatory view of the ferrule 10 of the second embodiment. In FIG. 7, for the sake of explanation, the ferrule 10 in the side view is shown in a partial section, and lensed fibers 1 are shown inserted in fiber holes 15.

In also the Second Embodiment, the ferrule 10 has two positioning pins 13, a plurality of fiber holes 15, and an adhesive filling window 16. In the second embodiment, the spacer part 111 has not been formed, and a plate 30 has been attached to a front side endface 11 (corresponds to the first endface 11A described above) of the ferrule 10. The positioning holes 13 are open in the endface 11 to the front side of the ferrule 10. Because the positioning holes 13 are not closed with the plate 30, positioning pins 14 can be inserted in the positioning holes 13 after the plate 30 has been attached. On the contrary, the openings of the fiber holes 15 are arranged opposing the plate 30. The size of the plate 30 in the left-right direction is of a length that opposes the openings of the plurality of the fiber holes 15 aligned in the left-right direction, and that does not close the positioning holes 13. In other words, when viewing the ferrule 10 from the front, edges of the plate 30 in the left-right direction are positioned between the fiber holes 15 and the positioning holes 13 positioned to the end (refer to FIG. 7).

In also the Second Embodiment, a recess 17 is formed in an endface 11 of the ferrule 10. In also the Second Embodiment, by filling the space surrounded with the plate 30 and the recess 17 with an adhesive that is to be the refractive index matching material, the refractive index matching material (adhesive) is to be filled between the plate 30 and the endfaces of the lensed fibers 1. Further, when the adhesive hardens, the endfaces of the lensed fibers 1 will adhere to the plate 30. When the adhesive is filled in the recess 17, the adhesive permeates between the first endface 11A of the ferrule 10 and the plate 30, and the plate 30 is adhered to the first endface 11A.

Further, in also the second embodiment, a protruding part 17D is formed in the recess 17. When an upper edge of the plate 30 contacts the protruding part 17D, the deformation of the plate 30 due to the shrinkage of the adhesive filled in the recess 17 can be suppressed.

Figure 8A:
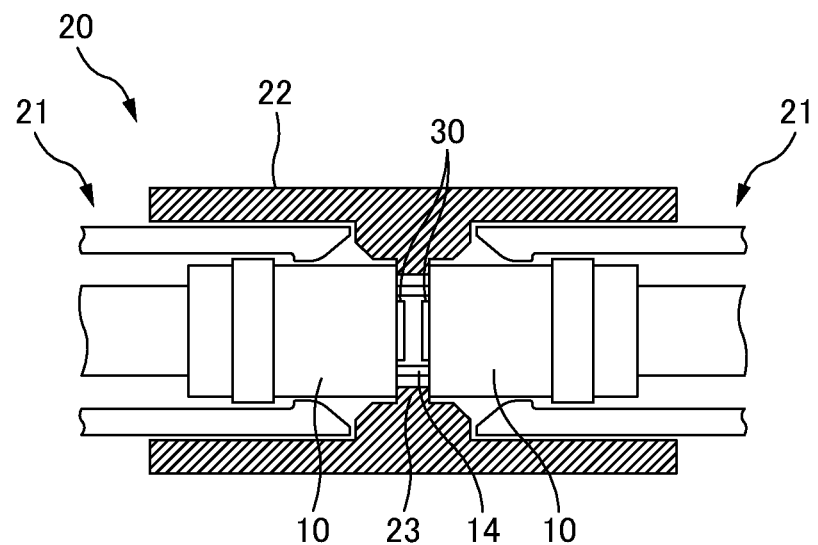
FIG. 8A and FIG. 8B are explanatory views showing a state during optical connection of a second embodiment.
Figure 8B:
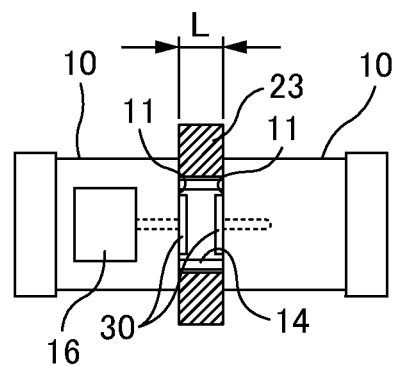

FIG. 8A and FIG. 8B are explanatory views showing a state during optical connection of the second embodiment. FIG. 8A is an explanatory view of an optical connector system 20 in which an optical connector 21 including a ferrule 10 with an optical fiber 10 has been inserted from both side of an adapter 22. FIG. 8B is an explanatory view of positional relationships of ferrules 10 in the adapter 22.

As shown in FIG. 8A, the optical connector 21 is inserted from both sides of the adapter 22, and the endfaces 11 of the ferrules 10 of the optical connectors 21 are arranged opposed to each other, and the plates 30 attached to the endfaces 11 are arranged opposed to each other. The positioning pins 14 protrude from the ferrule 10 of the male optical connector 21, and these positioning pins 14 are inserted in the positioning holes 13 of the ferrule 10 of the female optical connector 21, such that the ferrules 10 are positioned in a direction perpendicular (left-right direction and up-down direction) to the positioning pins 14 within the adapter 22.

Spacers 23 that protrude to the inner side are formed inside the adapter 22. The size of the spacer 23 in the front-rear direction corresponds to an interval L between the endfaces 11 of the ferrules 10 shown in FIG. 1. When the ferrules 10 contact the spacers 23, as shown in FIG. 8B, the endfaces 11 of the ferrules 10 are arranged opposed to each other with a predetermined interval L in between, and the plates 30 attached to the endfaces 11 are arranged opposed to each other with a predetermined interval in between. In other words, when the ferrules 10 contact with the spacers 23 inside the adapter 22, the ferrules 10 are positioned with respect to each other in the front-rear direction, and the plates 30 are positioned with respect to each other in the front-rear direction. Here the endfaces 11 to the front sides of the ferrules 10 are contacting the spacers 23, but brim parts 12 of the ferrules 10 may contact the spacers 23, to make the endfaces 11 of the ferrules 10 be opposed with a predetermined interval L in between.

In the second embodiment, the plates 30 can be positioned with respect to each other in the front-rear direction, and the lensed fibers 1 of the two ferrules 10 can be optically connected. Because the MFD (Mode Field Diameter) of the optical signals is large with the GRIN lens 3, optical loss can be suppressed, and since a lens does not have to be formed in the ferrules 10, manufacturing of the ferrules 10 is easy. Further, since a recess is formed in the ferrule 10, when the adhesive that is the refractive index matching material is filled in the recess 17, the refractive index matching material (adhesive) can be filled between the plate 30 and the endfaces of the lensed fibers 1.

Third Embodiment

By merely filling the recess 17 with a fluid-state refractive index matching material (adhesive), there is a possibility that bubbles may form in the endface of the lensed fiber 1. On the contrary, in a third embodiment, by arranging a soft solid-state refractive index matching material (solid refractive index matching material) to the plate 30, and contacting the lensed fiber 1 against the soft solid refractive index matching material, formation of bubbles in the endface of the lensed fiber 1 is suppressed.

Figure 9:
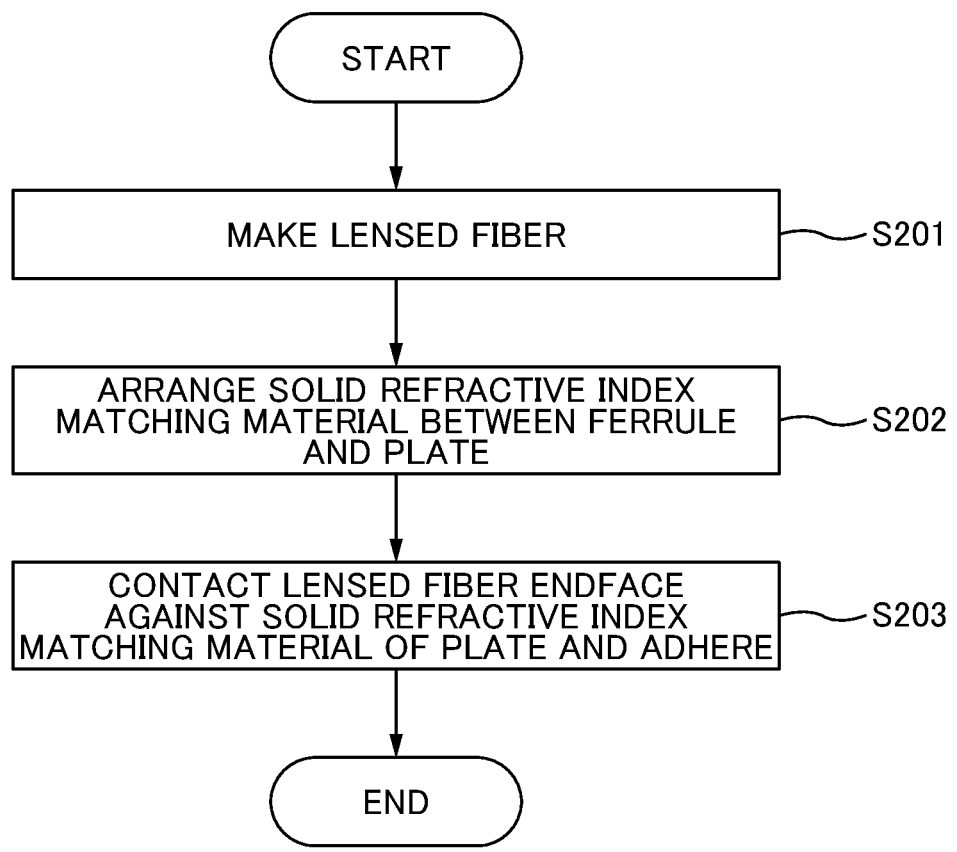
FIG. 9 is a flowchart of a manufacturing method of a ferrule 10 with an optical fiber of a third embodiment.

FIG. 9 is a flowchart of a manufacturing method of a ferrule 10 with an optical fiber in the third embodiment.

First, a lensed fiber is made (S201). The process of S201 is the same as the process of S101 in FIG. 5.

Next, an operator arranges the solid refractive index matching material between the ferrule 10 and the plate 30 (S202). The solid refractive index matching material is a light transmitting sheet member, and is a solid refractive index matching material. A refractive index of the solid refractive index matching material is approximately the same as the above-described adhesive (refractive index matching material). The material of the solid refractive index matching material can be, for example, such as acrylic, epoxy, vinyl, silicone, rubber, urethane, methacrylic, nylon, bisphenol, diol, polyimide, fluorinated epoxy, or fluorinated acrylic high-polymer material.

The solid refractive index matching material is arranged to a surface to the rear side of the plate 30. In other words, the solid refractive index matching material is arranged to the surface to which the lensed fibers 1 are contacted against. Specifically, a sheet-like (film) solid refractive index matching material is attached to a region opposing the fiber holes 15 of the surface to the recess 17 side of the plate 30 in FIG. 2A (or FIG. 6). Note that, the sheet-like solid refractive index matching material does not have to be attached to the plate 30, but a liquid refractive index matching material may be applied to the plate 30 and then solidified, to arrange the solid refractive index matching material to the plate 30.

The solid refractive index matching material has a hardness of a degree that the surface deforms when the endfaces of the lensed fibers 1 are contacted against the solid refractive index matching material. In this way, formation of bubbles in the endfaces of the lensed fibers 1 can be suppressed.

Figure 10:
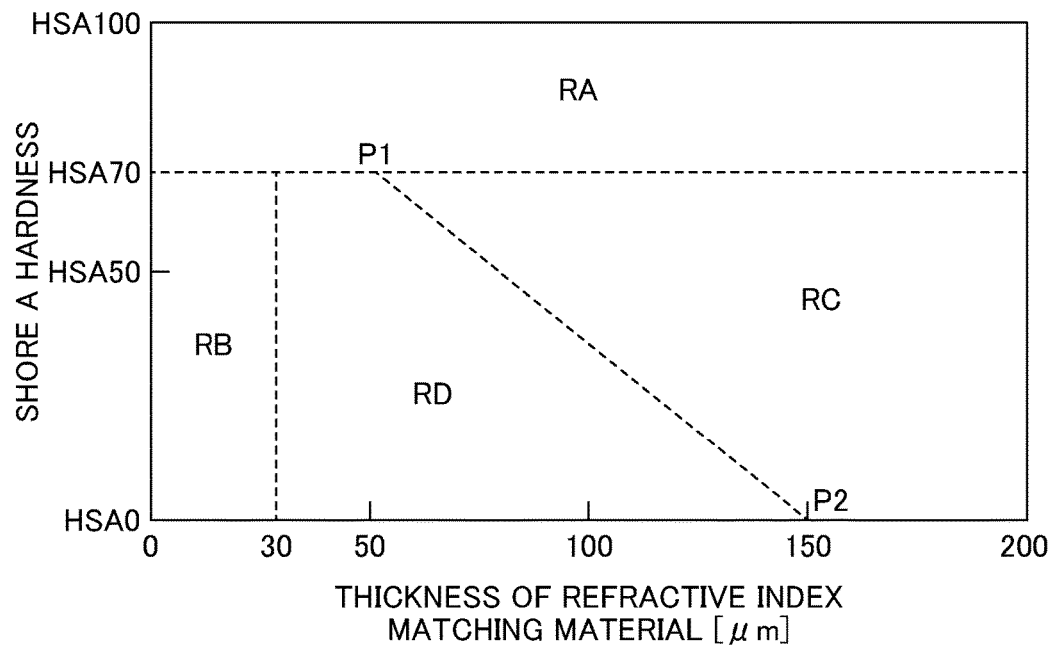
FIG. 10 is an explanatory view of a relationship of hardness and thickness of a sheet of a solid refractive index matching material.

FIG. 10 is an explanatory view of a relationship between a hardness and a thickness of a sheet of the solid refractive index matching material. A horizontal axis shows a thickness of the solid refractive index matching material, and a vertical axis shows Shore A hardness (HSA). A solid refractive index matching material in a region RD in the drawing is preferably used. Note that, a region RC and the region RD in the figure are divided by a line that connects a point P1 (HSA 70, thickness 50 μm) and a point P2 (HSA 0, thickness 150 μm).

In a region RA (a region where Shore A hardness is greater than 70) the hardness is too high, thus a surface of the solid refractive index matching material when contacted against with the lensed fibers 1 has low compliance. Thus, spaces (bubbles) are easily formed in the endfaces of the lensed fibers 1. In the case that a solid refractive index matching material in the region RA is used, however, compared to the case with no solid refractive index matching material, bubbles in the endfaces of the lensed fibers 1 can be suppressed.

In a region RB (a region where Shore A hardness is equal to smaller than 70, and a thickness is smaller than 30 μm), the solid refractive index matching material is too thin, so that in the case where endfaces of lensed fibers 1 are rough, or the endfaces of the plurality of the lensed fibers 1 are not aligned, and the like, spaces (bubbles) are easily formed in the endfaces of the lensed fibers 1. In the case that a solid refractive index matching material in the region RB is used, however, compared to the case with no solid refractive index matching material, bubbles in the endfaces of the lensed fibers 1 can be suppressed.

In the region RC (the region where Shore A hardness is equal to or less than 70, and the thickness is greater than the line connecting the point P1 and the point P2), a distance between the endfaces of the lensed fibers 1 and the surface of the plate 30 becomes too large, and is not appropriate. In the case of using the solid refractive index matching material in the region RC, however, compared to the case with no solid refractive index matching material, bubbles in the endfaces of the lensed fibers 1 can be suppressed.

As described above, the region RD (of the region where Shore A hardness is equal to or smaller than 70, and a thickness is equal to or greater than 30 μm, the region with a smaller thickness than the line, including the line connecting the point P1 and the point P2) is an appropriate region. In other words, a solid refractive index matching material in a range surrounded by four points of (HSA 0, thickness 30 µm), (HSA 70, thickness 30 µm), (HSA 70, thickness 50 µm), (HSA 0, thickness 150 µm), in the drawing is preferably used.

Both surfaces of the solid refractive index matching material preferably have adhesiveness. In this way, the solid refractive index matching material becomes difficult to come off from the plate 30, and after the endfaces of the lensed fibers 1 are contacted against the solid refractive index matching material, the solid refractive index matching material and the endfaces of the lensed fibers become difficult to part. As such a solid refractive index matching material, an adhesive made of high-polymer material that is made film-like can be used, and from the perspective of environmental resistance and adhesiveness, generally a silicone or an acrylic material can be used.

Next, the operator causes the lensed fibers 1 and the plate 30 to adhere to the ferrule 10 with the endfaces of the lensed fibers 1 contacting against the plate 30 (S203). In also the second embodiment, the operator fills the adhesive that is to be the refractive index matching material in the space surrounded with the plate 30 and the recess 17. In this way, supposing that there is a space between the endfaces of the lensed fibers 1 and the solid refractive index matching material, the adhesive that is to be the refractive index matching material is filled in this space. Further, at this time, the adhesive permeates between the first endface 11A of the ferrule 10 and the plate 30, and the plate 30 is adhered to the first endface 11A of the ferrule 10. Further, the operator fixes the lensed fibers 1 to the ferrule 10 by filling the adhesive from the adhesive filling window 16 to inside the ferrule 10. In this way, the ferrule 10 with the optical fiber is manufactured.

With the above third embodiment, by contacting the lensed fibers 1 against the soft solid refractive index matching material arranged to the plate 30, formation of bubbles in the endfaces of the lensed fibers 1 can be suppressed.

Fourth Embodiment

Figure 11:
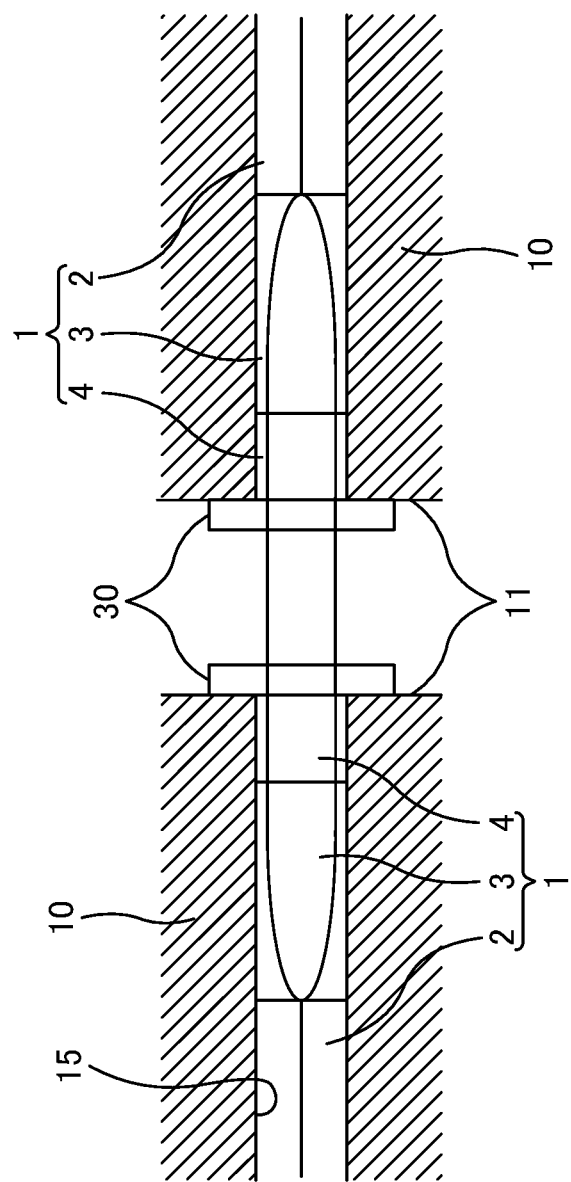
FIG. 11 is an explanatory view of endfaces 11 of lensed fibers 1 and ferrules 10 of a fourth embodiment.

FIG. 11 is an explanatory view of endfaces 11 of lensed fibers 1 and ferrules 10 of a fourth embodiment. Note that, to make description easy to understand, sizes and angles are shown in an exaggerated manner.

The lensed fiber 1 of the fourth embodiment is an optical fiber that includes a single-mode optical fiber 2, a GRIN lens 3, and a coreless fiber 4, and the GRIN lens 3 is fusion spliced to the tip of the single-mode optical fiber 2, and the coreless fiber 4 is fusion spliced to the tip of the GRIN lens 3. In other words, the lensed fiber 1 in the fourth embodiment is provided with the coreless fiber 4 at the tip of the GRIN lens 3. Parallel light that has entered the coreless fiber 4 from the GRIN lens 3, propagates as parallel light within the coreless fiber 4, and is emitted outside from an endface of the coreless fiber 4. On the contrary, parallel light that enters the coreless fiber 4 from the outside propagates through the coreless fiber 4, and enters the GRIN lens 3.

Figure 12A:
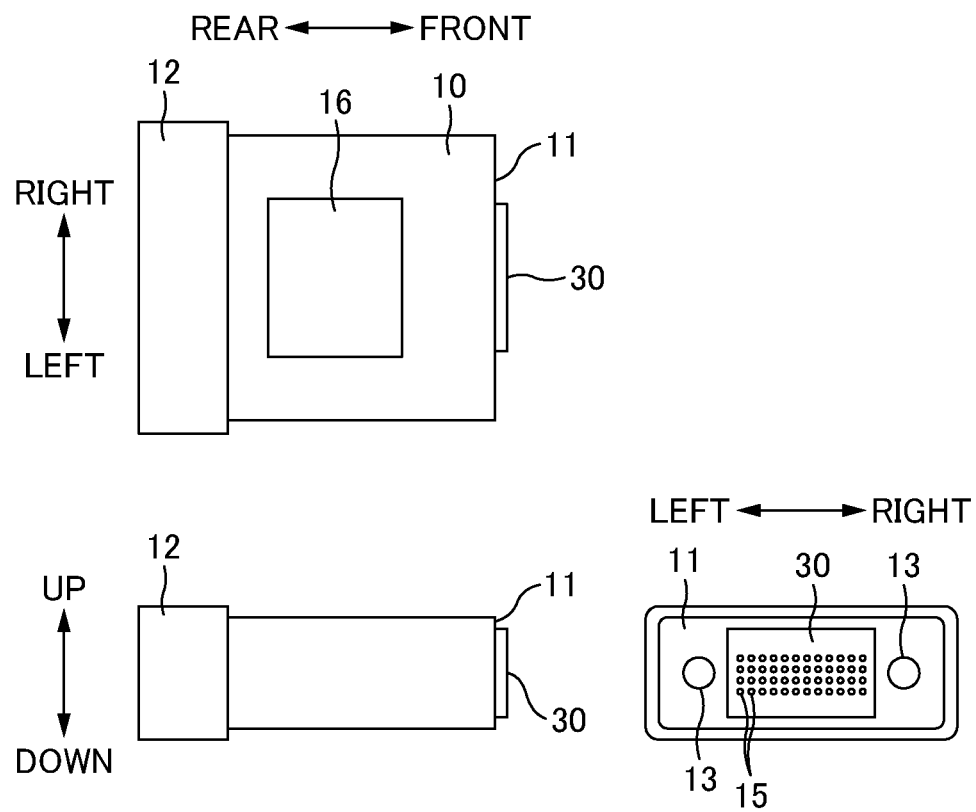
FIG. 12A is an explanatory view of a ferrule 10 of a fourth embodiment.
Figure 12B:
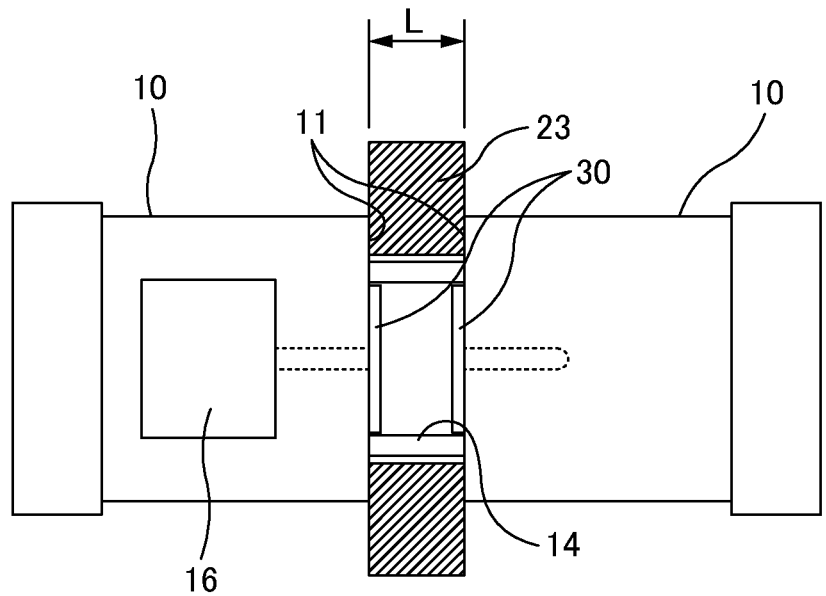
FIG. 12B is an explanatory view showing a state during optical connection of ferrules 10 of a fourth embodiment.

FIG. 12A is an explanatory view of the ferrule 10 of the fourth embodiment. FIG. 12B is an explanatory view showing a state during optical connection of the ferrules 10 of the fourth embodiment.

A surface to an outer side (front side) of the plate 30 is coated with an antireflection film. For example, the antireflection film is an AR coat film laminated with two kinds of thin film that have different refractive indexes. A surface to an inner side (rear side) of the plate 30 is opposed to the endfaces of the lensed fibers 1 inserted in the fiber holes 15.

Also in the fourth embodiment, the endfaces 11 of the ferrules 10 are arranged opposed to each other. When the positioning pins 14 are inserted into the positioning holes 13, then the ferrules 10 are positioned in a direction perpendicular to the positioning pins 14 (left-right direction and up-down direction) within an adapter that is not shown. Further, also in the fourth embodiment, with the ferrules 10 contacting the spacers 23, the ferrules 10 are positioned with respect to each other in the front-rear direction, and the plates 30 are positioned with respect to each other in the front-rear direction.

When making the lensed fiber 1 of the fourth embodiment (refer to FIG. 11), first a graded index optical fiber is fusion spliced to the single-mode optical fiber 2, the fusion spliced graded index optical fiber is cut into a predetermined length, and the GRIN lens 3 is formed to a tip of the single-mode optical fiber 2. Next, the coreless fiber 4 is fusion spliced to an end part of the GRIN lens 3, and the fusion spliced coreless fiber 4 is cut into a predetermined length. The endface (cut face) of the coreless fiber 4 at this time is perpendicular with respect to an optical axis of the lensed fiber 1. Note that, fusion splicing is performed such that an outer diameter of a section that has been fusion spliced can be inserted through the fiber hole 15 (fiber hole 15 with an inner diameter defined by the Standard). Also in the fourth embodiment, since the MFD (Mode Field Diameter) of optical signals is large with the GRIN lens 3, optical loss can be suppressed, and also since a lens does not have to be formed in the ferrule, manufacturing of the ferrule 10 is easy.

In the above-described embodiments, the endface of the lensed fiber 1 is contacted against the plate 30, whereas in the fourth embodiment, before the plate 30 is arranged to the endface of the ferrule 10, the lensed fibers 1 are inserted in the fiber holes 15 and adhered. At this time, a slight non-uniformity occurs in the length of the end parts of the lensed fibers 1 protruding from the endfaces 11 of the ferrule 10. To solve this non-uniformity, in the fourth embodiment, the endface 11 of the ferrule 10 is polished, and the end parts of the plurality of the lensed fibers 1 protruding from the endface 11 of the ferrule 10 are polished, to align the positions of the endfaces of the lensed fibers 1 (endfaces of coreless fibers 4) with respect to the endface 11 of the ferrule 10. Note that, in the fourth embodiment, since the coreless fiber 4 is at the tip of the GRIN lens 3, even when the endfaces of the lensed fibers 1 are polished, the length of the GRIN lens 3 is not changed. When polishing along the endface 11 of the ferrule 10, the endfaces of the lensed fibers 1 (endfaces of the coreless fibers 4) become surfaces perpendicular to the optical axis. After polishing the endface of the ferrule 10, the plate 30 is adhered to the endface 11 of the ferrule 10.

In the fourth embodiment, since the recess 17 is not formed in the ferrule 10, an adhesive that is to be the refractive index matching material is applied to a boundary between the endface 11 of the ferrule 10 and the plate 30, to permeate the refractive index matching material between the endface 11 of the ferrule 10 and the plate 30 using capillary action, and to fill the refractive index matching material between the endface of the lensed fiber 1 and the plate 30. As in the above-described embodiment, when compared to the case of filling the refractive index matching material (adhesive) in the recess 17, the adhesive is permeated using the capillary action in the fourth embodiment, thus it takes time to fill the refractive index matching material between the plate 30 and the endfaces of the lensed fibers 1.

On the other hand, in the fourth embodiment, the plate 30 is arranged to the endface 11 of the ferrule 10 after the end parts of the lensed fibers 1 are polished, thus a space between the endfaces of the lensed fibers 1 and the plate 30 can be kept small. Thus, there is an advantage that when permeating the refractive index matching material between the endface 11 of the ferrule 10 and the plate 30 using the capillary action, and filling the refractive index matching material between the endfaces of the lensed fibers 1 and the plate 30, bubbles are not easily formed in the endfaces of the lensed fibers 1.

Fifth Embodiment

<Regarding Endfaces of Lensed Fiber 1 and Ferrule 10>

Figure 13:
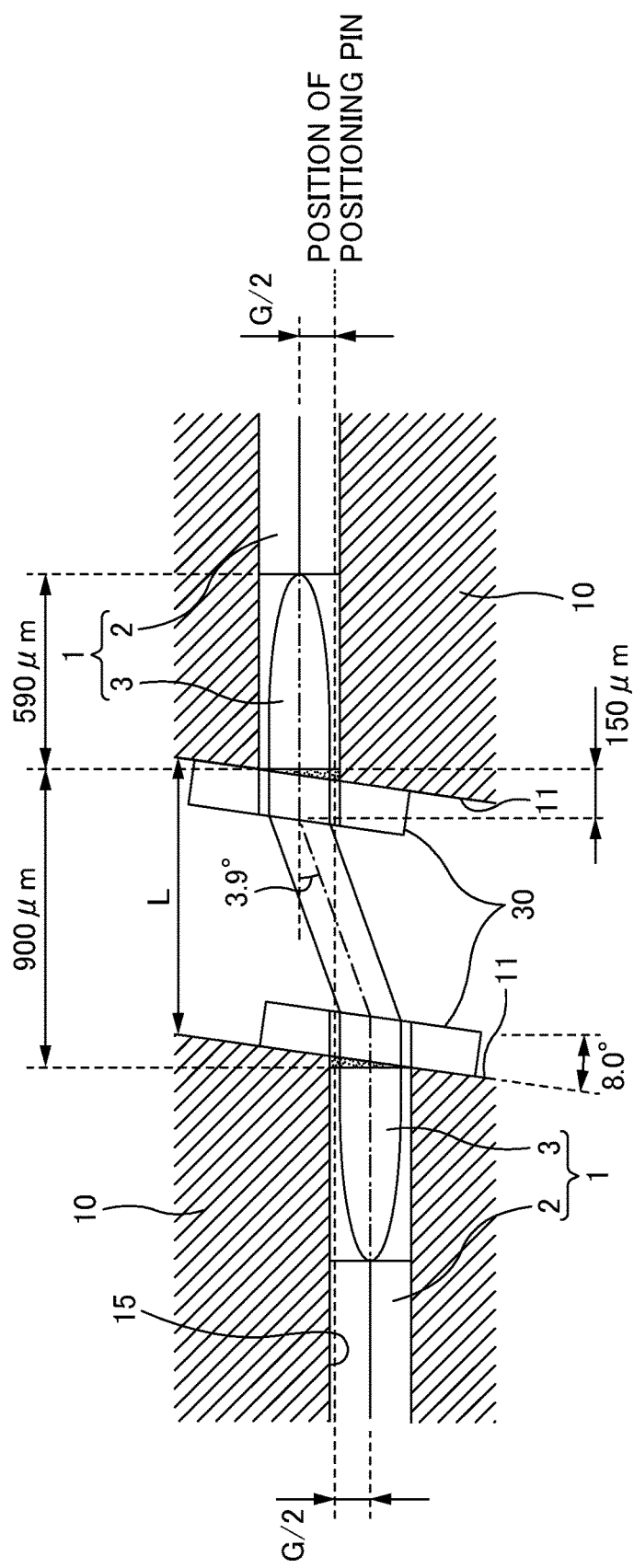
FIG. 13 is an explanatory view of endfaces 11 of lensed fibers 1 and ferrules 10 of a fifth embodiment.

FIG. 13 is an explanatory view of endfaces 11 of lensed fibers 1 and ferrules 10 of a fifth embodiment. To make the description easy to understand, sizes and angles have been shown in an exaggerated manner.

The lensed fiber 1 includes a single-mode optical fiber 2 and a GRIN lens 3, and the lensed fiber 1 is an optical fiber with the GRIN lens 3 fusion spliced to a tip of the single-mode optical fiber 2. The configuration of the lensed fiber 1 is as already described above.

A plate 30 that can transmit optical signals is arranged to the tip of the GRIN lens. The plate 30, to which the endface of the lensed fiber 1 is contacted against, is arranged inclined with respect to a surface perpendicular to an optical axis of the lensed fiber 1. Here, the plate 30 is inclined 8 degrees with respect to the surface perpendicular to the optical axis. Since the endface 11 of the ferrule 10 is inclined with respect to the surface that is perpendicular to the optical axis of the lensed fiber 1, when the plate 30 is arranged to the endface 11 of the ferrule 10, the plate 30 is arranged inclined with respect to the surface that is perpendicular to the optical axis of the lensed fiber 1. By making the endface of the plate 30 incline, a return loss can be reduced. Note that, when the endface of the GRIN lens 3 is inclined, the length of the GRIN lens 3 changes, and thus the function as a collimator lens is impaired.

A refractive index matching material is filled between the plate 30 and the endface of the lensed fiber 1. This is because a space is formed between the endface of the lensed fiber 1 and the plate 30, since the endface of the lensed fiber 1 is perpendicular to the optical axis and the plate 30 is inclined with respect to the surface that is perpendicular to the optical axis.

Next, paths of optical signals that propagate through two lensed fibers 1 are described. Here, the optical signals are described to propagate from the left side lensed fiber 1 to the right side lensed fiber 1.

The optical signals that have propagated through the left side lensed fiber 1 are emitted from the inclined surface of the outer side of the plate 30 toward the right side, through the refractive index matching material and the plate 30. Since the exterior of the inclined surface of the plate 30 is air, the optical signals are refracted according to Snell law of refraction (the refractive index of the plate 30 is for example, 1.46). As a result, the optical signals that have emitted from the left side plate 30 are refracted upward (here, refracted upward by merely approximately 3.9 degrees) to an opposite side to the side that the inclined surface of the plate 30 is facing (lower side).

The optical signals (parallel light) that have propagated through the air inclined upward with respect to the optical axis enter an inclined surface of the right side plate 30. The inclined surface of the right side plate 30 is inclined 8 degrees with respect to a surface that is perpendicular to an optical axis of the lensed fiber 1, and is arranged parallel to the left side plate 30. As a result, the optical signals that have entered the inclined surface of the right side plate 30, after being refracted, propagate through the lensed fiber 1 via the plate 30 and the refractive index matching material.

To optically connect the left and right lensed fibers 1, in expectation that the refracted optical signals will propagating through air, the lensed fibers 1 need to be arranged with the optical axes of the lensed fibers 1 displaced. Specifically, when an interval between endfaces of the GRIN lenses 3 is 900 µm, a displaced amount G of the optical axes of the lensed fibers 1 is approximately 30 µm. A displaced amount between the positioning parts (the positioning holes 13 or the positioning pins 14) and the fiber holes 15 of the ferrule 10 (=G/2: offset amount) is approximately 15 µm. In the below description, an interval between the endfaces 11 of the ferrules 10 to optically connect the left and the right lensed fibers 1 (an interval in an optical axis direction of the lensed fibers 1) is L.

In this embodiment, because a lens does not have to be formed in the ferrule 10, manufacturing of the ferrule 10 is easy. Further, since MFD (Mode Field Diameter) of the optical signals that propagate between the ferrules 10 is large, optical loss can be suppressed even when the optical axes of the lensed fibers 1 are slightly displaced, and optical loss due to dust attached on the endfaces of the lensed fibers 1 can also be suppressed. The endfaces 11 of the ferrules 10 do not have to be contacted with each other, and the endfaces of the lensed fibers 1 also do not directly contact each other, thus compared to PC connection of normal MT ferrules to each other, there is an advantage that the endfaces 11 of the ferrules 10 and the endfaces of the lensed fibers 1 are not easily damaged. Further, the inclined surfaces of the plates 30 do not directly contact each other, and thus there is also an advantage that coating of the inclined surfaces of the plates 30 that have been made antireflective are not easily damaged.

<Regarding Ferrule 10>

FIG. 14 is an explanatory view of the ferrule 10 of the fifth embodiment.

The ferrule 10 of this embodiment is configured to be approximately the same as a ferrule including an inclined endface as defined by JIS C 5982 (F13 type multicore optical fiber connector: MPO connector), and sizes and positional relationships of the positioning holes 13 and the fiber holes 15 and the like are as defined by the Standard. Note that, when viewing the endface 11 of the ferrule 10 from the front side, the position of the fiber holes 15 are displaced to the lower side by an amount corresponding to G/2 in FIG. 13 from the positioning holes 13.

The ferrule 10 includes two positioning holes 13, a plurality of fiber holes 15, and an adhesive filling window 16. The ferrule 10 includes a plate 30 attached to the endface 11.

As shown in FIG. 13, the lensed fiber 1 is inserted into the fiber hole 15. The fiber hole 15 penetrates through between the front side endface 11 of the ferrule 10 and the adhesive filling window 16. The fiber holes 15 are formed in parallel in the front-rear direction, and the plurality of the fiber holes 15 is arranged aligned in the left-right direction. Here, twelve fiber holes 15 are arranged aligned in one line in the left-right direction. The fiber holes 15 are sections forming the optical paths inside the ferrule 10 and are holes parallel to the optical axes of the lensed fibers 1.

The positioning holes 13 as well as the plurality of the fiber holes 15 are open in the endface 11 to the front side of the ferrule 10. The plate 30 is attached to the front side endface 11 of the ferrule 10. Since the positioning holes 13 are not closed with the plate 30, the positioning pins 14 can be inserted into the positioning holes 13 even after the plate 30 has been attached. On the contrary, the openings of the fiber holes 15 are closed with the plate 30.

The front side endface 11 of the ferrule 10 is inclined with respect to a surface perpendicular to the axial direction of the fiber holes 15. Thus, the front side endface 11 of the ferrule 10 is inclined with respect to the surface that is perpendicular to the optical axes of the lensed fibers 1 that have been inserted into the fiber holes 15. The endfaces of the lensed fibers 1 are perpendicular to the optical axes, and thus the front side endface 11 of the ferrule 10 is inclined with respect to the endfaces of the lensed fibers 1 that have been inserted into the fiber holes 15.

The front side endface 11 of the ferrule 10 is inclined with respect to the up-down direction when seen from the left-right direction. More specifically, the front side endface 11 of the ferrule 10 is inclined 8 degrees with respect to the up-down direction, so that an upper side of the ferrule 10 (the side of the adhesive filling window 16) is more nearer to the front side. In other words, the front side endface 11 of the ferrule 10 is inclined to face the lower side. By inclining the front side endface 11 of the ferrule 10, the plate 30 can be easily arranged inclined with respect to the surface perpendicular to the optical axes of the lensed fibers 1.

With the endface 11 being more inclined toward the ferrule to the other side the nearer to the upper side (the side of the adhesive filling window 16), a central position of the plurality of the fiber holes 15 is in a position displaced to the lower side (an opposite side to the side of the adhesive filling window 16) from the positioning holes 13. In other words, the central position (barycentric position) of the plurality of the fiber holes 15 is displaced to the lower side by an amount corresponding to G/2 in FIG. 13 from the positioning holes 13, when viewing the endface 11 of the ferrule 10 from the front side. Thus, even when the optical signals are refracted at the inclined surface as shown in FIG. 13, optical connection is possible.

The plate 30 is, for example, a glass plate that can transmit light propagating through the optical fiber 2. A surface to an inner side (rear side) of the plate 30 faces a side of the endface of the lensed fiber 1, and a surface to an outer side (front side) of the plate 30 opposes a plate 30 attached to an endface 11 of the ferrule 10 to the other side.

The plate 30 is shaped as a plate-shape that is long in the left-right direction. The shape of the plate 30 is not limited to this shape, however, and may be, for example, other shapes such as a trapezoid, or a rhombus when seen from the front-rear direction. The size of the plate 30 in the left-right direction is a length in which the plate closes the openings of the plurality of the fiber holes 15 aligned in the left-right direction and the plate does not close the positioning holes 13. In other words, the edges of the plate 30 in the left-right direction are positioned between the fiber holes 15 positioned at the end and the positioning holes 13.

The surface to the outer side (front side) of the plate 30 is coated with an antireflection film. The antireflection film is as already described above.

Figure 15A:
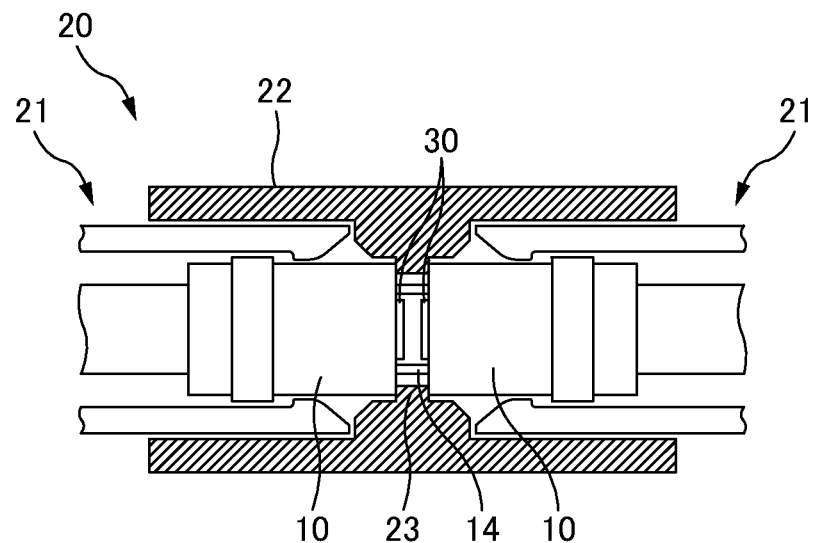
FIG. 15A to FIG. 15C are explanatory views showing a state during optical connection of a fifth embodiment.
Figure 15B:
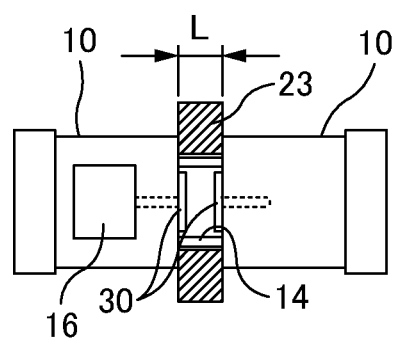
Figure 15C:
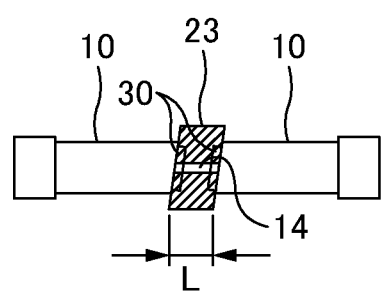

FIG. 15A to FIG. 15C are explanatory views showing a state during optical connection in the fifth embodiment. FIG. 15A is an explanatory view of an optical connector system 20 in which an optical connector 21 including a ferrule 10 with an optical fiber is inserted from both sides of an adapter 22. FIG. 15B and FIG. 15C are explanatory views of positional relationships of the ferrules 10 within the adapter 22. The optical connector system 20 has two optical connectors 21 each including a ferrule 10 with an optical fiber, and an adapter 22 that can be inserted from both sides with the two optical connectors 21.

As shown in FIG. 15A, when the optical connector 21 is each inserted from both sides of the adapter 22, the endfaces 11 of the ferrules 10 of the optical connectors 21 are arranged opposed to each other, and the plates 30 attached to the endfaces 11 are arranged opposed to each other. The positioning pins 14 protrude from the ferrule 10 of a male optical connector 21, and these positioning pins 14 are inserted into the positioning holes 13 of the ferrule 10 of the female optical connector 21, to position the ferrules 10 within the adapter 22 to a direction perpendicular to the positioning pins 14 (the left-right direction and the up-down direction). To make the plates 30 parallel to each other, the up-down orientation of the ferrule 10 is reversed (the adhesive filling window 16 is faced in an opposite direction), and the ferrules 10 are opposed.

Spacers 23 protruding to the inner side are formed inside the adapter 22. The size of the spacer 23 in the front-rear direction corresponds to an interval L between the endfaces 11 of the above described ferrules 10. As shown in FIG. 15B and FIG. 15C, when the ferrules 10 contact the spacers 23, the endfaces 11 of the ferrules 10 are arranged opposed to each other with a predetermined interval L in between, and the plates 30 attached to the endfaces 11 are arranged opposed to each other with a predetermined interval in between. In other words, when the ferrules 10 contact the spacers 23 in the adapter 22, the ferrules 10 are positioned in the front-rear direction, and the plates 30 are positioned in the front-rear direction with respect to each other. Here the endfaces 11 (inclined endfaces) to the front side of the ferrules 10 are contacting the spacers 23, but the brim parts 12 of the ferrules 10 may contact the spacers 23, to oppose the endfaces 11 of the ferrules 10 with a predetermined interval L in between.

<Manufacturing Method of Ferrule 10 with Optical Fiber>

Figure 16:
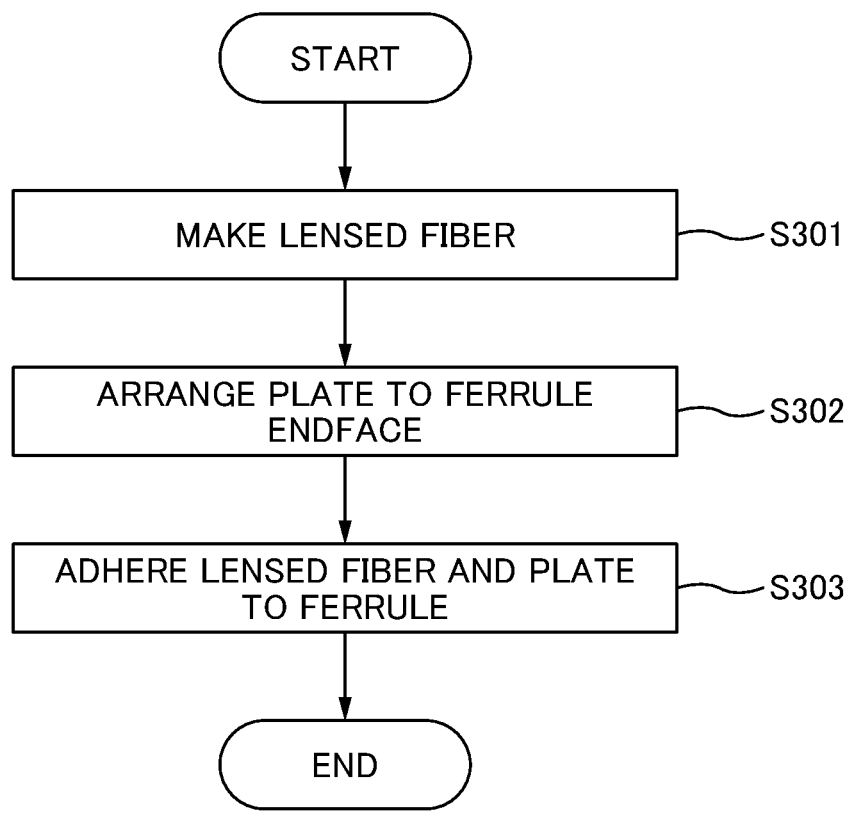
FIG. 16 is a flowchart of a manufacturing method of a ferrule 10 with an optical fiber.

FIG. 16 is a flowchart of a manufacturing method of a ferrule 10 with an optical fiber.

First, a lensed fiber 1 is made (S301). Specifically, first a grated index optical fiber is fusion spliced to a single-mode optical fiber 2, and the fusion spliced grated index optical fiber is cut into a predetermined length, and a GRIN lens 3 is formed to a tip of the single-mode optical fiber 2. An endface (a cut surface) of the GRIN lens 3 at this time is perpendicular to an optical axis of the lensed fiber 1. Note that, fusion splicing is performed so that an outer diameter of a section that has been fusion spliced can pass through the fiber holes 15 (fiber holes 15 with an inner diameter defined by the Standard). A plurality of such lensed fibers 1 is prepared.

Next, an operator prepares the above described ferrule 10, and arranges the plate 30 to the endface 11 of the ferrule 10 (S302). Because the front side endface 11 of the ferrule 10 is inclined, when the plate 30 is pressed against and contacted to the endface 11, the plate 30 is arranged inclined to a surface perpendicular to the axial direction of the fiber holes 15 of the ferrule 10.

Next, the operator causes the lensed fiber 1 and the plate 30 to adhere to the ferrule 10 (S303). When the lensed fiber 1 and the plate 30 are adhered to the ferrule 10, the endface of the lensed fiber 1 is in a stated contacted against the plate 30. The endface of the lensed fiber 1 is perpendicular to the optical axis, and the plate 30 is inclined to a surface perpendicular to the optical axis, thus there is a space between the endface of the lensed fiber 1 and the plate 30, but an adhesive that is the refractive index matching material is filled in this space. Because the space between the endface 11 of the ferrule 10 and the plate 30 is small, using capillary action, the adhesive is applied in the boundary between the endface 11 of the ferrule 10 and the plate 30, to make the adhesive (refractive index matching material) permeate inside. Here an ultraviolet cure adhesive is used as the refractive index matching material, and after the adhesive is permeated inside, when an ultraviolet ray is irradiated through the plate 30, the adhesive hardens, and the endface of the lensed fiber 1 is adhered to the plate 30. Further, since the ultraviolet cure adhesive has permeated between the endface 11 of the ferrule 10 and the plate 30, when the ultraviolet ray is irradiated through the plate 30, the plate 30 is adhered to the endface 11 of the ferrule 10. Instead of the ultraviolet cure adhesive, a thermosetting adhesive may be used. The operator fills the adhesive from the adhesive filling window 16 to inside the ferrule 10, to fix the lensed fiber 1 to the ferrule 10.

From the above operations, the ferrule 10 with an optical fiber is manufactured. Note that, when the ferrules 10 with an optical fiber manufactured as described above are arranged opposed as shown in FIG. 13 and optically connected, optical loss can be made to approximately 0.7 dB, and return loss can be made to approximately 60 dB.

With the optical connector system 20 of the fifth embodiment (refer to FIG. 15A), two ferrules 10 are arranged opposed, and the ferrules 10 contact the spacers 23, to make the plates 30 be arranged opposed to each other with a predetermined interval in between. In this way, as shown in FIG. 13, the plates 30 are positioned with respect to each other in the front-rear direction, and the lensed fibers 1 of the two ferrules 10 can be optically connected. These ferrules 10 include the lensed fiber 1 and the plate 30, and with the endfaces of the lensed fibers 1 inserted into the fiber holes 15 contacted against the plate 30, the plate 30 is arranged inclined with respect to a surface that is perpendicular to the optical axis of the lensed fiber 1. Because the plate 30 is inclined, and because the MFD (Mode Field Diameter) of optical signals is large with the GRIN lens 3, optical loss can be suppressed, and since a lens does not have to be formed in the ferrule 10, manufacturing of the ferrule 10 is easy. Further, the plate 30 merely has to be arranged inclined, and the process of obliquely polishing the endface of the ferrule 10 is not necessary.

Sixth Embodiment

In the fifth embodiment, an adhesive that is the refractive index matching material is applied in the boundary between the endface 11 of the ferrule 10 and the plate 30, and the adhesive is permeated inside with the capillary action. The filling method of the refractive index matching material is not limited to the above.

Figure 17A:
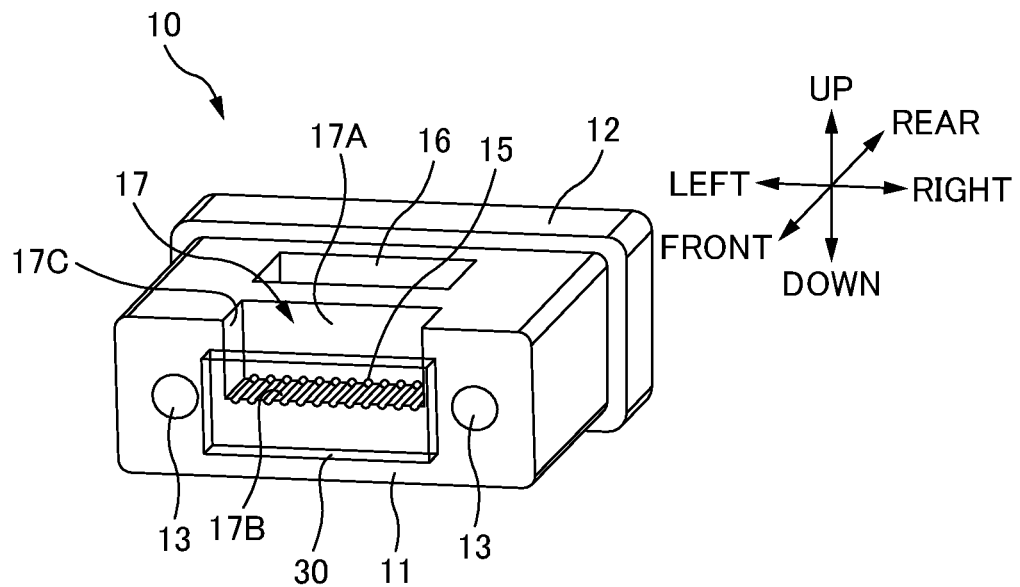
FIG. 17A is a perspective view of a ferrule 10 of a sixth embodiment.
Figure 17B:
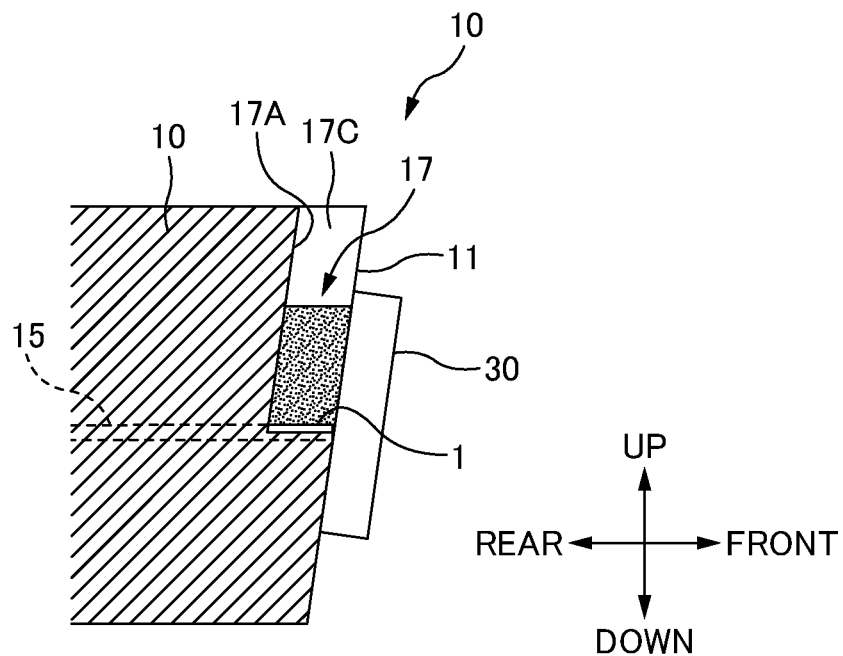
FIG. 17B is an explanatory view showing a state during filling adhesive (refractive index matching material) in a sixth embodiment.

FIG. 17A is a perspective view of a ferrule 10 of a sixth embodiment. FIG. 17B is an explanatory view showing a state during filling the adhesive (refractive index matching material) in the sixth embodiment.

A recess 17 is formed in the front side endface 11 of the ferrule 10 of the sixth embodiment. The recess 17 is a section depressed from the front side endface 11, and is a section that forms a space to be filled with the adhesive that is the refractive index matching material. The recess 17 is formed with a fiber hole opening surface 17A, a bottom surface 17B, and side surfaces 17C.

The fiber hole opening surface 17A is an inner wall to the rear side of the recess 17 and is positioned to the rear side than the endface 11 of the ferrule 10. The fiber hole opening surface 17A is a surface to oppose a surface to an inner side of the plate 30, and a plurality of fiber holes 15 is aligned open in the left-right direction in the fiber opening surface.

The bottom surface 17B is an inner wall configuring a bottom of the recess 17. Here, fiber grooves are formed in the bottom surface 17B, and the lensed fibers 1 inserted into the fiber holes 15 are supported with the bottom surface 17B on the fiber grooves (refer to FIG. 17B). In this way, the end parts of the lensed fibers 1 do not have to be bent in the recess 17.

In the sixth embodiment, the operator arranges the plate 30 to the endface 11 of the ferrule 10, as shown in FIG. 17A (refer to S302 in FIG. 16). Next, the operator causes the lensed fiber 1 and the plate 30 to adhere to the ferrule 10 (refer to S303). In also the sixth embodiment, when the lensed fiber 1 and the plate 30 are adhered to the ferrule 10, the endface of the lensed fiber 1 is contacted against the plate 30. In the sixth embodiment, however, the operator fills the adhesive to be the refractive index matching material in the space surrounded with the plate 30 and the recess 17. In other words, the adhesive that is to be the refractive index matching material is filled in the space surrounded with the plate 30, the fiber hole opening surface 17A, the bottom surface 17B, and the side surfaces 17C. With the sixth embodiment, the refractive index matching material (adhesive) is filled in the recess 17, thus compared to the case of permeating the adhesive using capillary action, the time to fill the refractive index matching material between the plate 30 and the endface of the lensed fiber 1 can be shortened.

Modified Example of the Sixth Embodiment

Figure 18:
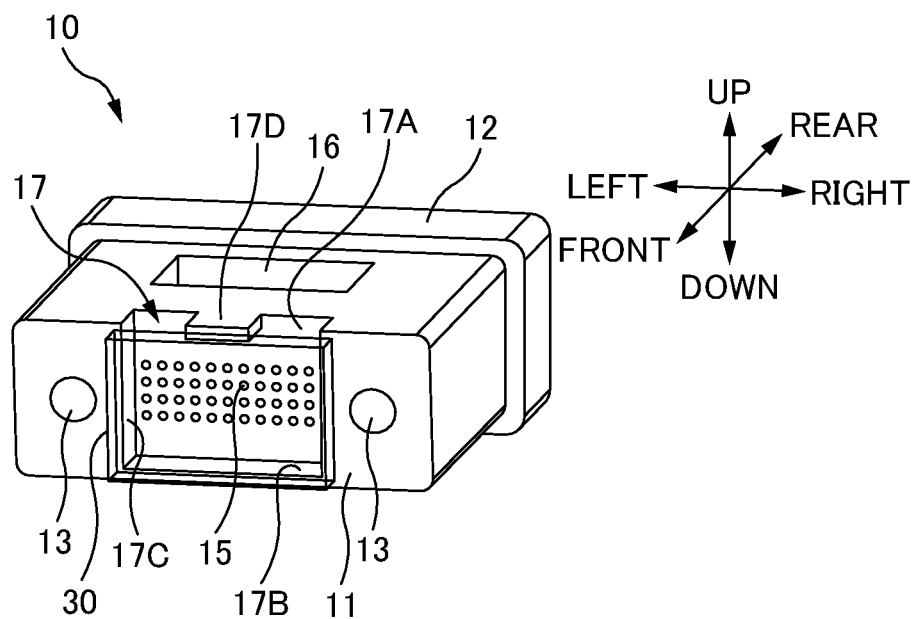
FIG. 18 is a perspective view of a ferrule 10 of a modified example of a sixth embodiment.

FIG. 18 is a perspective view of a ferrule 10 of a modified example of the sixth embodiment. FIG. 19 is an explanatory view of the ferrule 10 of the modified example of the sixth embodiment. In FIG. 19, for the sake of description, the ferrule 10 in a side view is shown partially in section, and lensed fibers 1 are shown inserted in fiber holes 15.

The ferrule 10 of the modified example includes two-dimensionally arranged fiber holes 15. Here, four rows of a row of twelve fiber holes 15 aligned in the left-right direction is arranged in the up-down direction. In the case where the plurality of the optical fiber holes 15 is arranged two-dimensionally, when the endface 11 of the ferrule 10 is seen from the front side, the central position (barycenteric position) of the plurality of the fiber holes 15 may be displaced to the lower side by an amount corresponding to G/2 in FIG. 13 from the positioning holes 13. In other words, the endface 11A is inclined toward the ferrule to the other side the closer to the upper side (the side to the adhesive filling window 16), and the central position of the plurality of the fiber holes 15 may be in a position displaced to the lower side from the positioning holes 13 (the opposite side to the side of the adhesive filling windows 16).

In the modified example, the recess 17 is formed in the front side endface 11 of the ferrule 10. The recess 17 is formed with the fiber hole opening surface 17A, the bottom surface 17B, and the side surfaces 17C, and a protruding part 17D is further formed in the modified example. The protruding part 17D is a section protruding to the front side (the plate 30 side) from an upper edge of the fiber hole opening surface 17A, and is a section that contacts an upper edge of the plate 30. The left and right edges and a lower edge of the plate 30 contact the endface 11 of the ferrule 10, and the upper edge of the plate 30 contacts the protruding part 17D. In this way, the deformation of the plate 30 due to shrinkage of the adhesive filling the recess 17 can be suppressed. In particular, the plurality of the fiber holes 15 is two-dimensionally arranged in the modified example, thus the recess 17 is deeply formed, and shrinkage of the adhesive has a lot of effect to the plate 30, thus the formation of the protruding part 17D to the ferrule 10 is particularly effective.

Seventh Embodiment

Figure 20A:
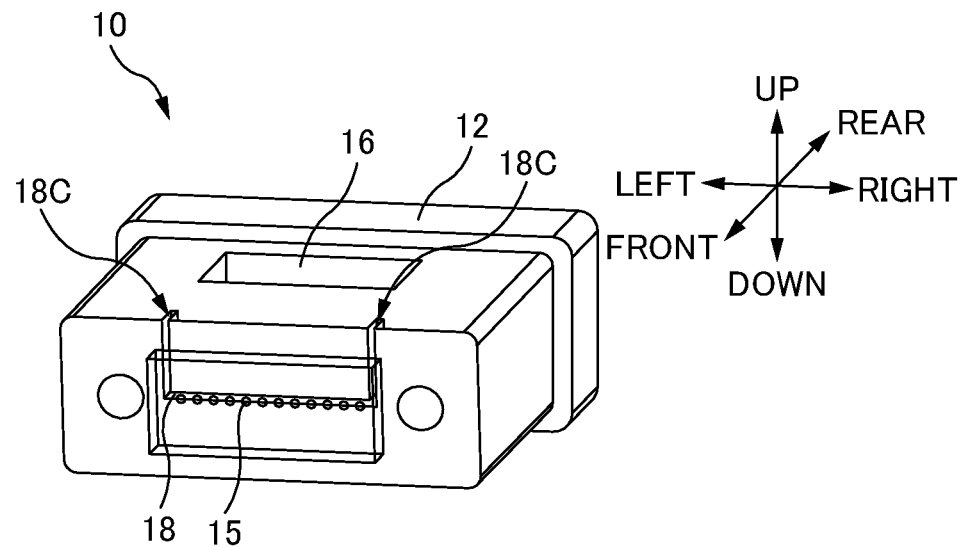
FIG. 20A is a perspective view of a ferrule 10 of a seventh embodiment.
Figure 20B:
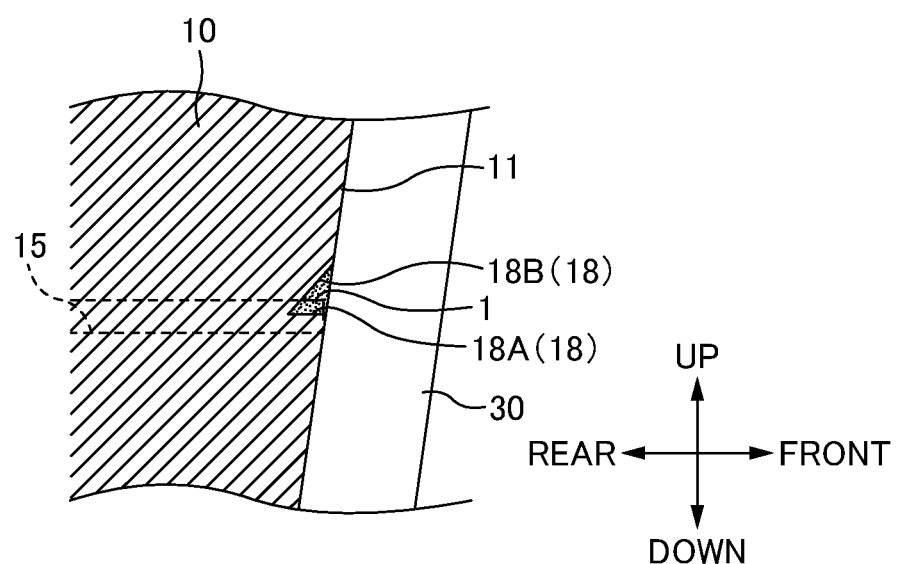
FIG. 20B is an explanatory view showing a state during filling adhesive (refractive index matching material) in a seventh embodiment.

FIG. 20A is a perspective view of a ferrule 10 of a seventh embodiment. FIG. 20B is an explanatory view showing a state during filling the adhesive (refractive index matching material) in the seventh embodiment.

A groove 18 is formed in an endface to a front side of the ferrule 10 of the seventh embodiment. The groove 18 is formed along the left-right direction to penetrate through upper parts of openings of a plurality of fiber holes 15. As shown in FIG. 20B, the groove 18 is formed in a sectionally V-shape and includes a lower surface 18A and an inclined surface 18B. The lower surface 18A is positioned near the center of the openings of the plurality of the fiber holes 15. The inclined surface 18B is an inner wall surface configuring the groove 18 and at least one part is positioned to the upper side than the fiber holes 15. A lower edge (rear edge) of the inclined surface 18B is positioned to a rear edge of the lower surface 18A, and an upper edge (front edge: an edge of an endface 11 of the ferrule 10) is positioned to the upper side than the fiber holes 15.

End parts of the groove 18 are exposed to the outer side than a plate 30. Here, the left and right ends of the groove 18 are formed extended to reach a topface of the ferrule 10, to expose the left and right ends of the groove 18 to the upper side than the plate 30. In this way, spaces 18C are formed with the groove 18 in boundaries between the endface 11 of the ferrule 10 and the plate 30, and an adhesive can be filled from these spaces 18C.

In the seventh embodiment, the operator arranges the plate 30 in the endface 11 of the ferrule 10, as shown in FIG. 20A (refer to S302 in FIG. 16). Next, the operator causes the lensed fiber 1 and the plate 30 to adhere to the ferrule 10 (refer to S303). Also in the seventh embodiment, when the lensed fiber 1 and the plate 30 are caused to adhere to the ferrule 10, the endface of the lensed fiber 1 is contacted against the plate 30. In the seventh embodiment, however, the operator fills the adhesive from one of the two spaces 18C of the groove 18 in the boundary between the endface 11 of the ferrule 10 and the plate 30. The adhesive flows inside along the groove 18 and is filled inside. At this time, even when bubbles are formed inside, the bubbles move to the upper side than the fiber holes 15, thus formation of bubbles in the endface of the lensed fiber 1 can be suppressed.

Modified Example of Seventh Embodiment

Figure 21:
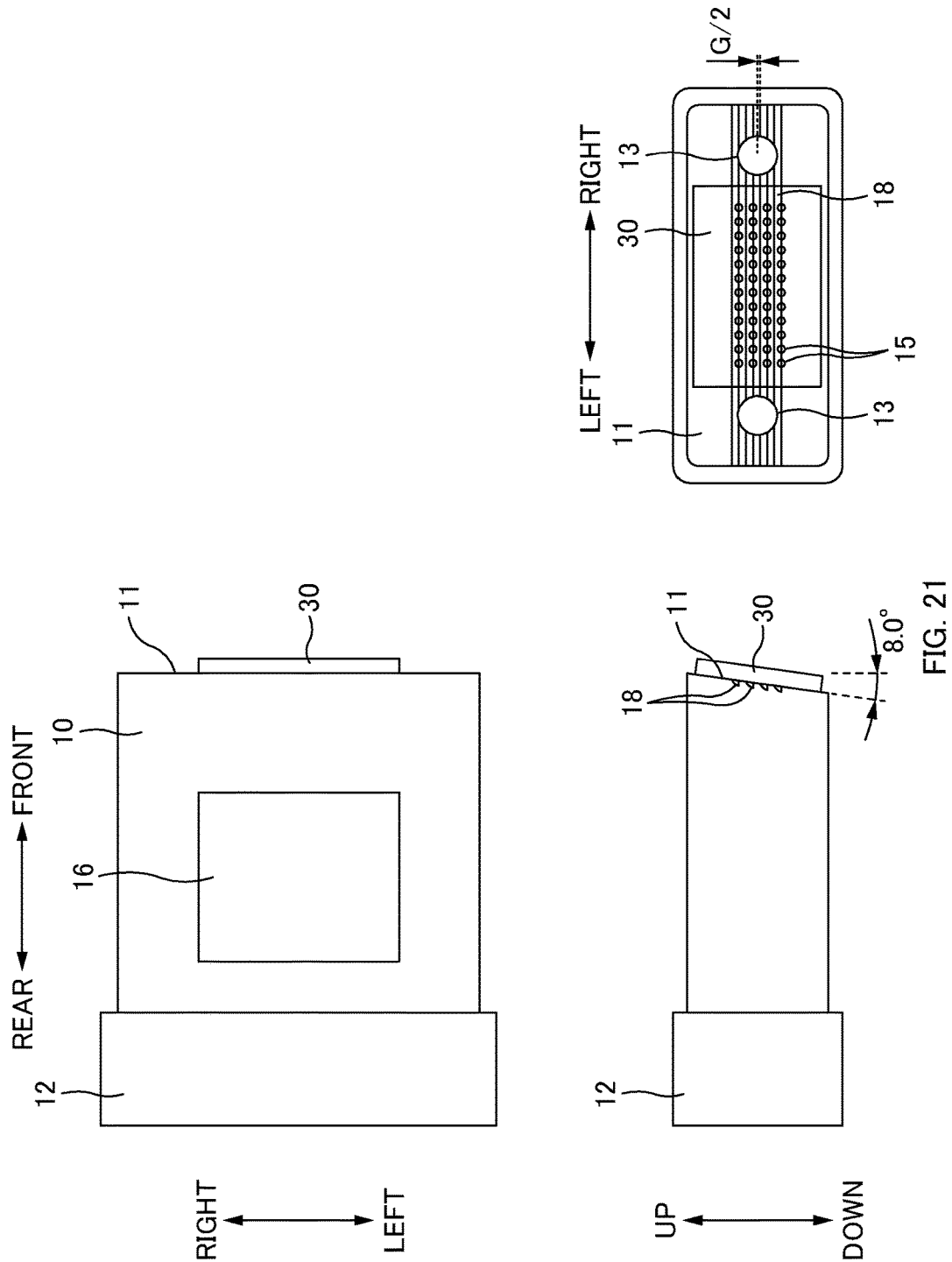
FIG. 21 is an explanatory view of a ferrule 10 of a modified example of a seventh embodiment.
Figure 22A:
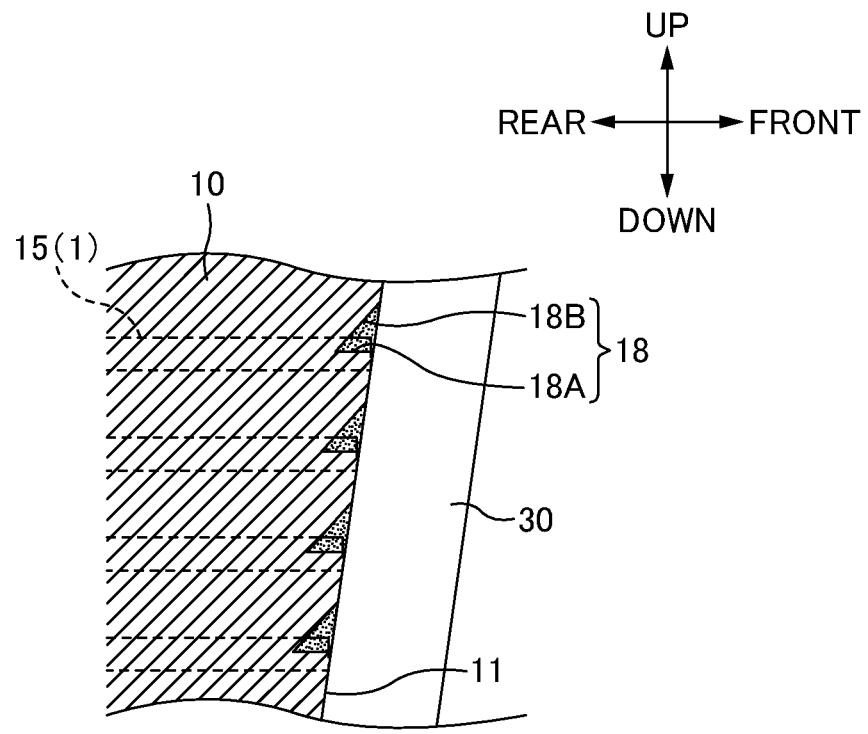
FIG. 22A is an explanatory view showing a state during filling adhesive (refractive index matching material) in a modified example of a seventh embodiment.

FIG. 21 is an explanatory view of a ferrule 10 of a modified example of the seventh embodiment. FIG. 22A is an explanatory view showing a state during filling an adhesive (refractive index matching material) in the modified example of the seventh embodiment.

The ferrule 10 in the modified example includes fiber holes 15 arranged two-dimensionally. Here, four rows of a row of twelve fiber holes 15 aligned in the left-right direction are arranged in the up-down direction. When the plurality of the optical fiber holes 15 is arranged two-dimensionally, viewing an endface 11 of the ferrule 10 from a front side, a central position (barycentric position) of the plurality of the fiber holes 15 may be displaced to a lower side by an amount corresponding to G/2 in FIG. 13 from positioning holes 13.

Also in the modified example, a groove 18 is formed along the left-right direction, to penetrate through upper parts of the openings of the plurality of the fiber holes 15 aligned in the left-right direction. In the modified example, four rows of the row aligned with the fiber holes 15 in the left-right direction are arranged in the up-down direction, thus four rows of the grooves 18 are also formed in the up-down direction. The left and the right ends of the groove 18 are formed extended to reach side surfaces of the ferrule 10. In this way, spaces 18C are formed with the groove 18 in the boundary between the endface 11 of the ferrule 10 and the plate 30, and an adhesive can be filled from these spaces 18C. The spaces 18C are formed in each of the four rows of grooves 18, thus the adhesive can continue to flow in each of the grooves 18. Note that, supposing that spaces 18C to the left and the right ends of the four rows of the grooves 18 are made as a common space (adhesive is branched from the common space 18C and made to flow into the four rows of grooves 18), a groove 18 in which the adhesive does not easily flow arises. Thus, a space 18C is preferably formed in each of the four rows of the grooves 18.

Figure 22B:
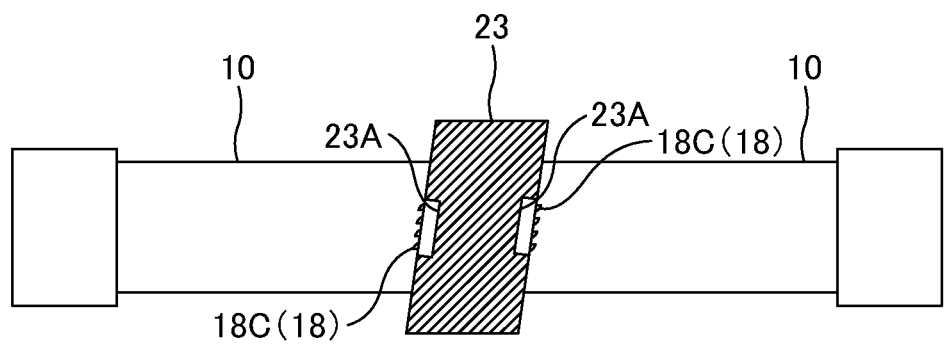
FIG. 22B is an explanatory view showing a state during optical connection in an optical connector system including ferrules 10 of a modified example of a seventh embodiment.

FIG. 22B is an explanatory view showing the state during optical connection of an optical connector system including the ferrules 10 in the modified example of the seventh embodiment. Also in the modified example, when the ferrules 10 contact a spacer 23, the endfaces 11 of the ferrules 10 are arranged opposed to each other with a predetermined interval L in between.

In the modified example, the left and right ends of the groove 18 are formed extended to reach the side surfaces of the ferrule 10. Thus, supposing that the spacer 23 contacts the endface 11 of the ferrule 10 in the section where the grooves 18 have been formed, the spacer 23 may rattle, and in this case there is a possibility that the positional relationship of the ferrules 10 with respect to each other in the front-rear direction and the positional relationship of the plates 30 with respect to each other in the front-rear direction may become displaced. In the modified example, the spacer 23 is formed with recess parts 23A, in order to not come in contact with the sections formed with the grooves 18. In this way, the positions of the ferrules 10 with respect to each other in the front-rear direction, and the positions of the plates 30 with respect to each other in the front-rear direction can be positioned accurately.

Eighth Embodiment

In the fifth embodiment to the seventh embodiment, a fluid-state refractive index matching material (adhesive) is filled in a space between the lensed fibers 1 and the plate 30. In this case, however, there is a possibility that bubbles may form in the endface of the lensed fiber 1. On the contrary, in an eighth embodiment, by arranging a soft solid-state refractive index matching material (solid refractive index matching material) to the plate 30, and contacting the lensed fiber 1 against the soft solid refractive index matching material, formation of bubbles in the endface of the lensed fiber 1 is suppressed.

Figure 23:
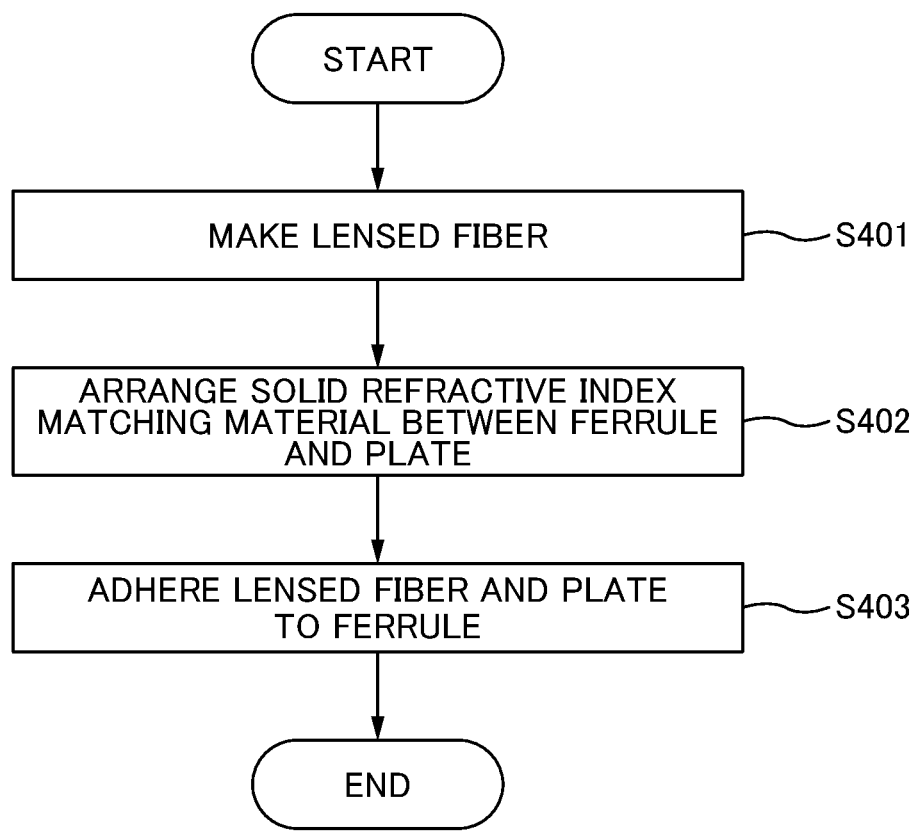
FIG. 23 is a flowchart of a manufacturing method of a ferrule 10 with an optical fiber of an eighth embodiment.

FIG. 23 is a flowchart of a manufacturing method of a ferrule 10 with an optical fiber in the eighth embodiment.

First, a lensed fiber is made (S401). The process of S401 is the same as the process of S301 in FIG. 16.

Next, an operator arranges the solid refractive index matching material between the ferrule 10 and the plate 30

(S402). The solid refractive index matching material is a light transmitting sheet member, and is a solid refractive index matching material. A refractive index of the solid refractive index matching material is approximately the same as the above-described adhesive (refractive index matching material). The material of the solid refractive index matching material can be, for example, such as acrylic, epoxy, vinyl, silicone, rubber, urethane, methacrylic, nylon, bisphenol, diol, polyimide, fluorinated epoxy, or fluorinated acrylic high-polymer material.

The solid refractive index matching material is arranged to a surface to the rear side of the plate 30. In other words, the solid refractive index matching material is arranged to the surface to which the lensed fibers 1 are contacted against. Thus the solid refractive index matching material opposes openings of the fiber holes 15. For example, a sheet-like (film) solid refractive index matching material is attached to a region opposing the fiber holes 15 of the surface to the recess 17 side of the plate 30 in FIG. 18. Note that, the sheet-like solid refractive index matching material does not have to be attached to the plate 30, but a liquid refractive index matching material may be applied to the plate 30 and then solidified, to arrange the solid refractive index matching material to the plate 30.

The solid refractive index matching material has a hardness of a degree that the surface deforms when the endfaces of the lensed fibers 1 are contacted against the solid refractive index matching material. In this way, formation of bubbles in the endfaces of the lensed fibers 1 can be suppressed.

As a relationship between a hardness and a thickness of a sheet of the solid refractive index matching material, the region RD (of the region where Shore A hardness is equal to or smaller than 70, and a thickness is equal to or greater than 30 μm, the region with a smaller thickness than the line, including the line connecting the point P1 and the point P2) is an appropriate region. In other words, a solid refractive index matching material in a range surrounded by four points of (HSA 0, thickness 30 μm), (HSA 70, thickness 30 μm), (HSA 70, thickness 50 μm), (HSA 0, thickness 150 μm), in the drawing is preferably used.

Both surfaces of the solid refractive index matching material preferably have adhesiveness. In this way, the solid refractive index matching material becomes difficult to come off from the plate 30, and after the endfaces of the lensed fibers 1 are contacted against the solid refractive index matching material, the solid refractive index matching material and the endfaces of the lensed fibers become difficult to part. As such a solid refractive index matching material, an adhesive made of high-polymer material that is made film-like can be used, and from the perspective of environmental resistance and adhesiveness, generally a silicone or an acrylic material can be used.

Next, the operator causes the lensed fiber 1 and the plate 30 to adhere to the ferrule 10 (S403). In the eighth embodiment, when the lensed fiber 1 and the plate 30 are adhered to the ferrule 10, the endface of the lensed fiber 1 is contacted against the plate 30 via the solid refractive index matching material. When the endface of the lensed fiber 1 is contacted against the solid refractive index matching material of the plate 30, the endface of the lensed fiber 1 is perpendicular to the optical axis, and the plate 30 is inclined to the surface perpendicular to the optical axis, and when the surface of the solid refractive index matching material deforms along the endface of the lensed fiber 1, the refractive index matching material is filled in the space between the endface of the lensed fiber 1 and the plate 30. The operator causes the lensed fiber 1 and the plate 30 to adhere to the ferrule 10 by filling the adhesive in the recess 17, for example. Further, by filling the adhesive in the adhesive filling window 16, the lensed fiber 1 is fixed to the ferrule 10. In this way, the ferrule 10 with the optical fiber is manufactured.

From the above eighth embodiment, by contacting the lensed fibers 1 against the soft solid refractive index matching material arranged to the plate 30, formation of bubbles in the endfaces of the lensed fibers 1 can be suppressed.

Ninth Embodiment

Figure 24A:
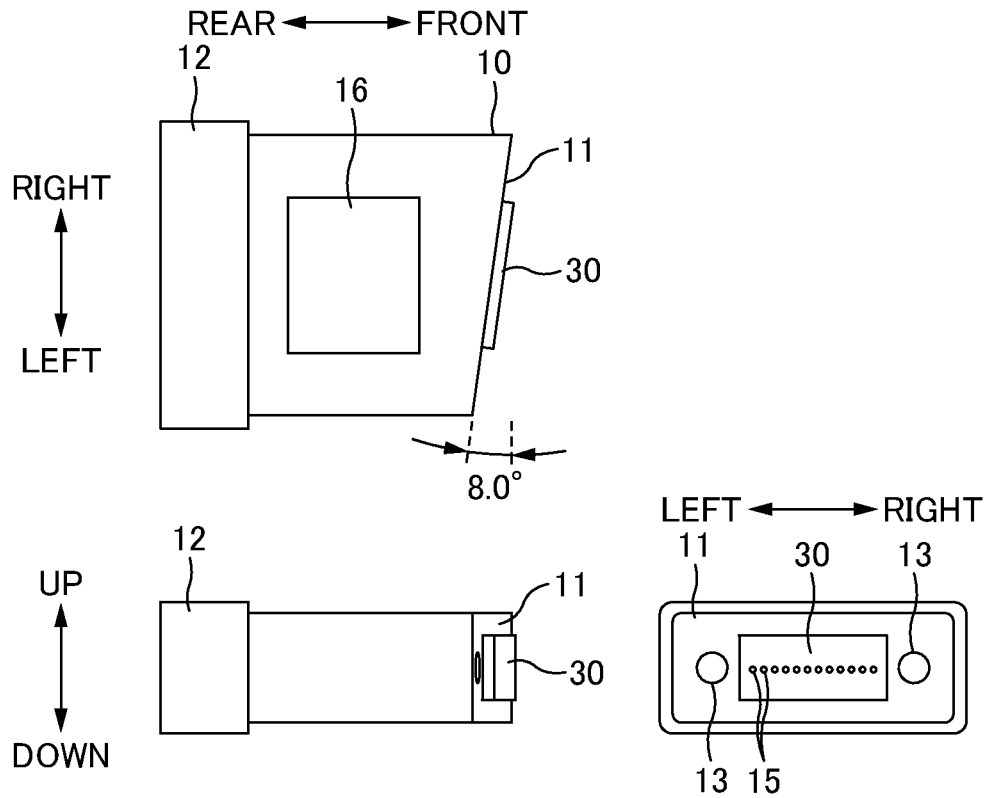
FIG. 24A is an explanatory view of a ferrule 10 of a ninth embodiment.

FIG. 24A is an explanatory view of a ferrule 10 of a ninth embodiment. In the ninth embodiment, similar to the above described embodiments, an endface 11 to a front side of the ferrule 10 is inclined with respect to a surface perpendicular to an optical axis of a lensed fiber 1 (a surface perpendicular to an axial direction of fiber holes 15). A plate 30 attached to the endface 11 is also arranged inclined with respect to a surface perpendicular to the optical axis of the lensed fiber 1.

In the ninth embodiment, the endface 11 to the front side of the ferrule 10 is inclined 8 degrees with respect to the left-right direction when seen from above (when seen from a direction perpendicular to (an up-down direction) a left-right direction in which two positioning holes 15 are aligned and a front-rear direction that is an axial direction of positioning holes 15). Thus, the plate 30 attached to the endface 11 is also inclined 8 degrees with respect to the left-right direction, when seen from above.

Figure 24B:
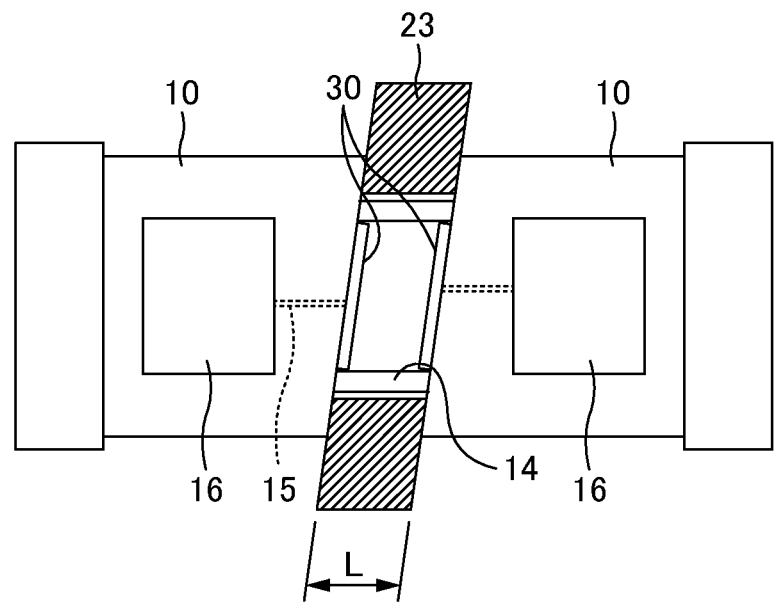
FIG. 24B is an explanatory view during optical connection of a ferrule 10 of a ninth embodiment.

FIG. 24B is an explanatory view showing the state during optical connection of the ferrules 10 in the ninth embodiment. Also in the ninth embodiment, the endfaces 11 of the ferrules 10 are arranged opposed to each other, and the plates 30 are arranged opposed to each other. When the positioning pins 14 are inserted into the positioning holes 13 of the ferrule 10, then the ferrules 10 are positioned in a direction perpendicular to the positioning pins 14 (in the left-right direction and the up-down direction) within the adapter that is not shown.

In the ninth embodiment, to make the inclined endfaces 11 of the ferrules 10 be parallel to each other, the ferrules 10 are opposed by making the up-down orientation of the ferrules 10 the same (adhesive filling window 16 is made to be the same orientation). Thus, in the ninth embodiment, the position of the fiber holes 15 in the up-down direction is the same as the position of the positioning holes 13 in the up-down direction (in the ninth embodiment, however, the plurality of the fiber holes 15 is displaced in the left-right direction by an amount corresponding to G/2 in FIG. 13 to the side of one of the positioning holes 13).

Also in the ninth embodiment, with the ferrules 10 contacting the spacers 23, the endfaces 11 of the ferrules 10 are arranged opposed to each other with a predetermined interval L in between, and also the plates 30 are arranged opposed to each other with a predetermined interval in between. In other words, with the ferrules 10 contacting the spacers 23, the ferrules 10 are positioned with respect to each other in the front-rear direction, and the plates 30 are positioned with respect to each other in the front-rear direction.

Tenth Embodiment

Figure 25A:
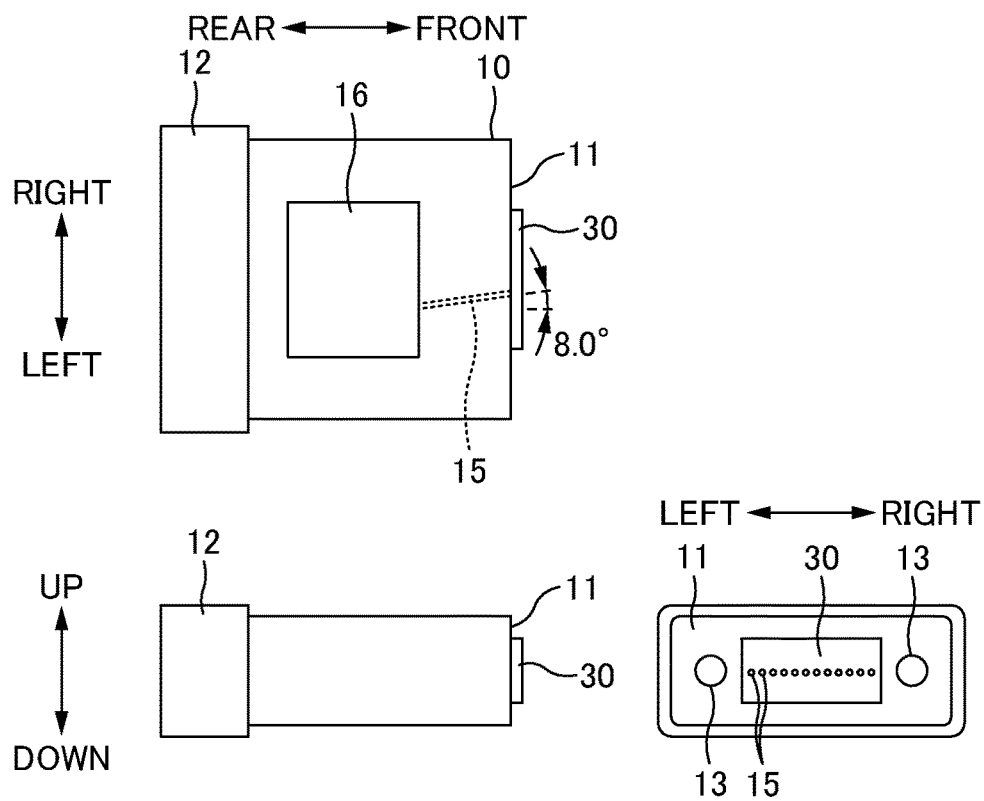
FIG. 25A is an explanatory view of a ferrule 10 of a tenth embodiment.

FIG. 25A is an explanatory view of a ferrule 10 of a tenth embodiment.

In the tenth embodiment, an endface 11 to a front side of the ferrule 10 is a surface that is perpendicular to an axial direction of positioning holes 13 (a front-rear direction), and the surface is not inclined. In the tenth embodiment, however, an axial direction of the fiber holes 15 is inclined 8 degrees with respect to an axial direction of the positioning holes 13. Thus, when lensed fibers 1 are inserted into the fiber holes 15, an endface 11 to a front side of the ferrule 10 inclines with respect to a surface perpendicular to optical axes of the lensed fibers 1. A plate 30 attached to the endface 11 is also arranged inclined with respect to a surface perpendicular to the optical axes of the lensed fibers 1.

Figure 25B:
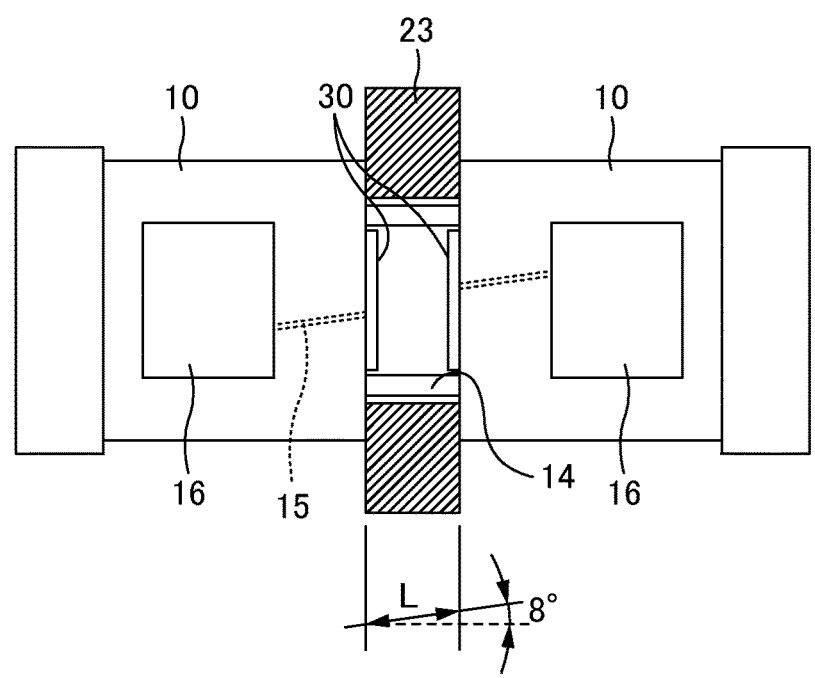
FIG. 25B is an explanatory view showing the state during optical connection of the ferrules 10 in the tenth embodiment.

FIG. 25B is an explanatory view showing the state during optical connection of the ferrules 10 in the tenth embodiment. Also in the tenth embodiment, the endfaces 11 of the ferrules 10 are arranged opposed to each other, and the plates 30 are arranged opposed to each other. When the positioning pins 14 are inserted into the positioning holes 13 of the ferrule 10, then the ferrules 10 are positioned in a direction perpendicular to the positioning pins 14 (in the left-right direction and the up-down direction) inside the adapter that is not shown. In the tenth embodiment, to make the fiber holes 15 of the opposing ferrules 10 parallel to each other, the ferrules 10 are opposed by making the up-down orientation of the ferrules 10 the same (an adhesive filling window 16 is made to be the same orientation).

Also in the tenth embodiment, with the ferrules 10 contacting the spacers 23, the endfaces 11 of the ferrules 10 are arranged opposed to each other with a predetermined interval L in between (not an interval in the front-rear direction, but an interval in the optical axes direction of the lensed fibers 1), and also the plates 30 are arranged opposed to each other with a predetermined interval in between. In other words, with the ferrules 10 contacting the spacers 23, the ferrules 10 are positioned with respect to each other in the front-rear direction, and the plates 30 are positioned with respect to each other in the front-rear direction. In the tenth embodiment, the thickness of the spacers 23 in the front-rear direction becomes slightly thinner than L.

Eleventh Embodiment

<Regarding Endfaces of Lensed Fiber 1 and Ferrule 10>

Figure 26:
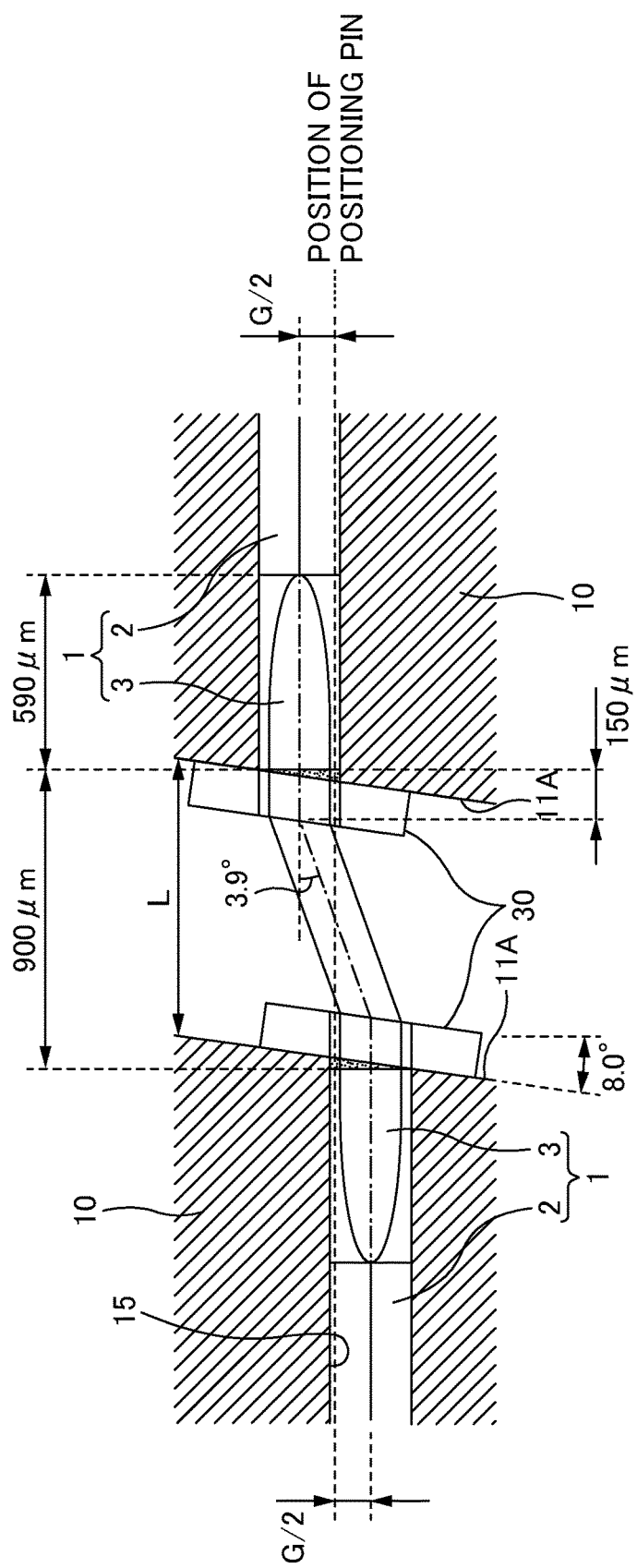
FIG. 26 is an explanatory view of endfaces (first endfaces 11A) of lensed fibers 1 and ferrules 10 of an eleventh embodiment.

FIG. 26 is an explanatory view of endfaces (first endfaces 11) of lensed fibers 1 and ferrules 10 of an eleventh embodiment. To make the description easy to understand, sizes and angles have been shown in an exaggerated manner.

The lensed fiber 1 includes a single-mode optical fiber 2 and a GRIN lens 3, and the lensed fiber 1 is an optical fiber with the GRIN lens 3 fusion spliced to a tip of the single-mode optical fiber 2. The configuration of the lensed fiber 1 is as already described above.

A plate 30 that can transmit optical signals is arranged to the tip of the GRIN lens. The plate 30, to which the endface of the lensed fiber 1 is contacted against, is arranged inclined with respect to a surface perpendicular to an optical axis of the lensed fiber 1. Here, the plate 30 is inclined 8 degrees with respect to the surface perpendicular to the optical axis. Since the endface 11 (the first endface 11A) of the ferrule 10 is inclined with respect to the surface that is perpendicular to the optical axis of the lensed fiber 1, when the plate 30 is arranged to the first endface 11A of the ferrule 10, the plate 30 is arranged inclined with respect to the surface that is perpendicular to the optical axis of the lensed fiber 1. By making the endface of the plate 30 incline, a return loss can be reduced. Note that, when the endface of the GRIN lens 3 is inclined, the length of the GRIN lens 3 changes, and thus the function as a collimator lens is impaired.

A refractive index matching material is filled between the plate 30 and the endface of the lensed fiber 1. This is because a space is formed between the endface of the lensed fiber 1 and the plate 30, since the endface of the lensed fiber 1 is perpendicular to the optical axis and the plate 30 is inclined with respect to the surface that is perpendicular to the optical axis.

Next, paths of optical signals that propagate through two lensed fibers 1 are described. Here, the optical signals are described to propagate from the left side lensed fiber 1 to the right side lensed fiber 1.

The optical signals that have propagated through the left side lensed fiber 1 are emitted from the inclined surface of the outer side of the plate 30 toward the right side, through the refractive index matching material and the plate 30. Since the exterior of the inclined surface of the plate 30 is air, the optical signals are refracted according to Snell law of refraction (the refractive index of the plate 30 is for example, 1.46). As a result, the optical signals that have emitted from the left side plate 30 are refracted upward (here, refracted upward by merely approximately 3.9 degrees) to an opposite side to the side that the inclined surface of the plate 30 is facing (lower side).

The optical signals (parallel light) that have propagated through the air inclined upward with respect to the optical axis enter an inclined surface of the right side plate 30. The inclined surface of the right side plate 30 is inclined 8 degrees with respect to a surface that is perpendicular to an optical axis of the lensed fiber 1, and is arranged parallel to the left side plate 30. As a result, the optical signals that have entered the inclined surface of the right side plate 30, after being refracted, propagate through the lensed fiber 1 via the plate 30 and the refractive index matching material.

To optically connect the left and right lensed fibers 1, in expectation that the refracted optical signals will propagating through air, the lensed fibers 1 need to be arranged with the optical axes of the lensed fibers 1 displaced. Specifically, when an interval between endfaces of the GRIN lenses 3 is 900 μm, a displaced amount G of the optical axes of the lensed fibers 1 is approximately 30 μm. A displaced amount between the positioning parts (the positioning holes 13 or the positioning pins 14) and the fiber holes 15 of the ferrule 10 (=G/2: offset amount) is approximately 15 μm. In the below description, an interval between the first endfaces 11A of the ferrules 10 to optically connect the left and the right lensed fibers 1 (an interval in an optical axis direction of the lensed fibers 1) is L.

In this embodiment, because a lens does not have to be formed in the ferrule 10, manufacturing of the ferrule 10 is easy. Further, since MFD (Mode Field Diameter) of the optical signals that propagate between the ferrules 10 is large, optical loss can be suppressed even when the optical axes of the lensed fibers 1 are slightly displaced, and optical loss due to dust attached on the endfaces of the lensed fibers 1 can also be suppressed. The first endfaces 11A of the ferrules 10 do not have to be contacted with each other, and the endfaces of the lensed fibers 1 also do not directly contact each other, thus compared to PC connection of normal MT ferrules to each other, there is an advantage that the first endfaces 11A of the ferrules 10 and the endfaces of the lensed fibers 1 are not easily damaged. Further, the inclined surfaces of the plates 30 do not directly contact each other, and thus there is also an advantage that coating of the inclined surfaces of the plates 30 that have been made antireflective are not easily damaged.

<Regarding Ferrule 10>

Figure 27:
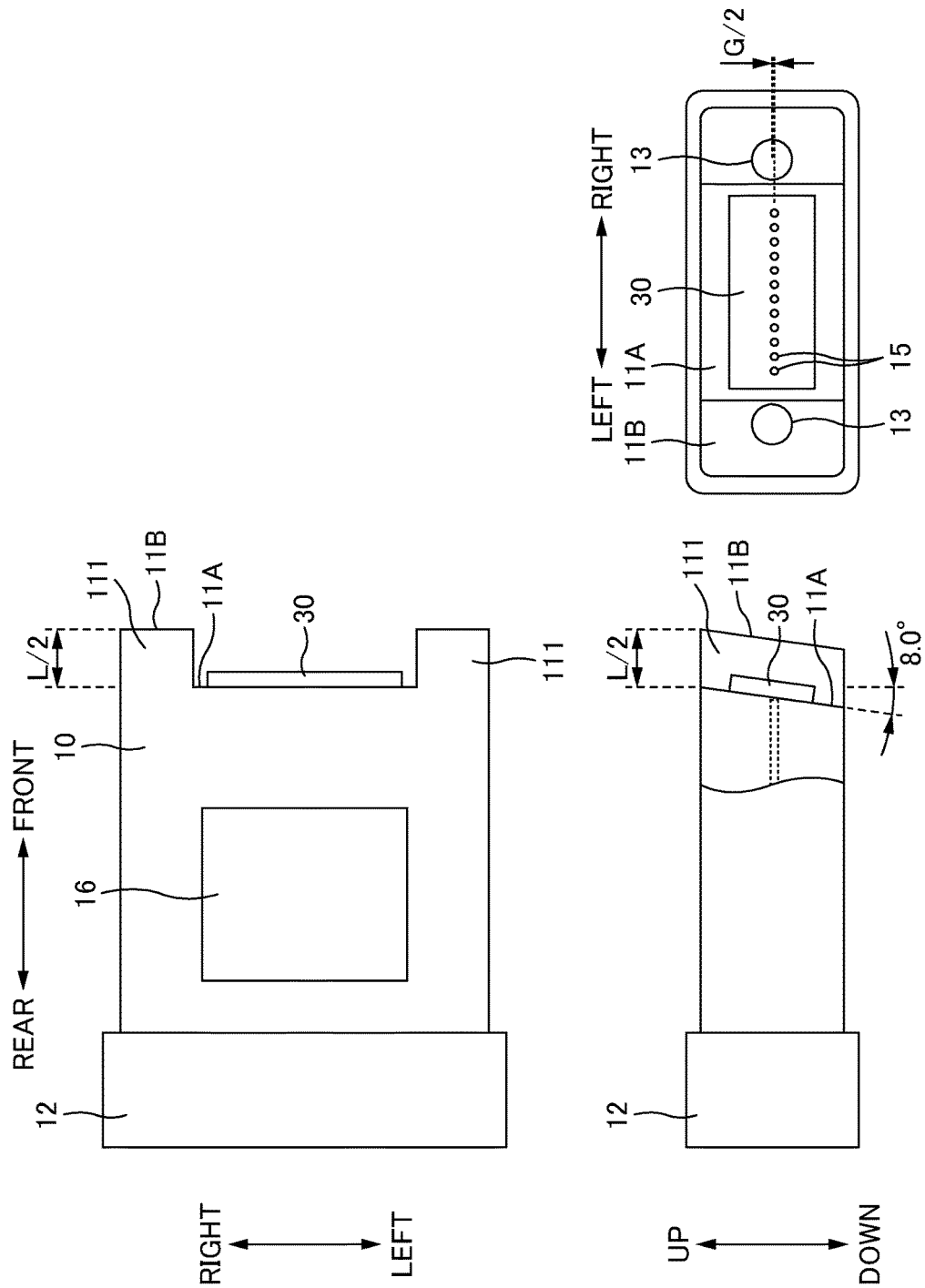
FIG. 27 is an explanatory view of a ferrule 10 of an eleventh embodiment.

FIG. 27 is an explanatory view of the ferrule 10 of the eleventh embodiment. For the sake of explanation, the ferrule 10 in the side view is shown as partially in section.

The ferrule 10 of this embodiment is configured to be approximately the same as a ferrule including an inclined endface as defined by JIS C 5982 (F13 type multicore optical fiber connector: MPO connector), and sizes and positional relationships of the positioning holes 13 and the fiber holes 15 and the like are as defined by the Standard. Note that, when viewing the first endface 11A of the ferrule 10 from the front side, the position of the fiber holes 15 are displaced to the lower side by an amount corresponding to G/2 in FIG. 26 from the positioning holes 13. Further, the ferrule 10 is formed with spacer parts 111 that will be described later.

The ferrule 10 includes two positioning holes 13, a plurality of fiber holes 15, and an adhesive filling window 16. The ferrule 10 includes a plate 30 attached to the first endface 11A. Further, the ferrule 10 includes second endfaces 11B (endfaces of the spacer parts 111) protruding to a front side than the first endface 11A and the plate 30 (the side to the ferrule to the other side).

As shown in FIG. 26, the lensed fiber 1 is inserted into the fiber hole 15. The fiber hole 15 penetrate through between the front side first endface 11A of the ferrule 10 and the adhesive filling window 16. The fiber holes 15 are formed in parallel in the front-rear direction, and the plurality of the fiber holes 15 is arranged aligned in the left-right direction. Here, twelve fiber holes 15 are arranged aligned in one line in the left-right direction. The fiber holes 15 are sections forming the optical paths inside the ferrule 10 and are holes parallel to the optical axes of the lensed fibers 1.

The plurality of the fiber holes 15 is open in the first endface 11A to the front side of the ferrule 10. The plate 30 is attached to the front side first endface 11A of the ferrule 10. The openings of the fiber holes 15 are closed with the plate 30.

The front side first endface 11A of the ferrule 10 is inclined with respect to a surface perpendicular to the axial direction of the fiber holes 15. Thus, the front side first endface 11A of the ferrule 10 is inclined with respect to the surface that is perpendicular to the optical axes of the lensed fibers 1 that have been inserted into the fiber holes 15. The endfaces of the lensed fibers 1 are perpendicular to the optical axes, and thus the front side first endface 11A of the ferrule 10 is inclined with respect to the endfaces of the lensed fibers 1 that have been inserted into the fiber holes 15.

The front side first endface 11A of the ferrule 10 is inclined with respect to the up-down direction when seen from the left-right direction. More specifically, the front side first endface 11A of the ferrule 10 is inclined 8 degrees with respect to the up-down direction, so that an upper side of the ferrule 10 (the side of the adhesive filling window 16) is more nearer to the front side. In other words, the front side first endface 11A of the ferrule 10 is inclined to face the lower side. By inclining the front side first endface 11A of the ferrule 10, the plate can be easily arranged inclined with respect to the surface perpendicular to the optical axes of the lensed fibers 1.

With the first endface 11A being more inclined toward the ferrule to the other side the nearer to the upper side (the side of the adhesive filling window 16), a central position of the plurality of the fiber holes 15 is in a position displaced to the lower side (an opposite side to the side of the adhesive filling window 16) from the positioning holes 13. In other words, the central position (barycentric position) of the plurality of the fiber holes 15 is displaced to the lower side by an amount corresponding to G/2 in FIG. 26 from the positioning holes 13, when viewing the first endface 11A of the ferrule 10 from the front side. Thus, even when the optical signals are refracted at the inclined surface as shown in FIG. 26, optical connection is possible.

The plate 30 is, for example, a glass plate that can transmit light propagating through the optical fiber 2. A surface to an inner side (rear side) of the plate 30 faces a side of the endface of the lensed fiber 1, and a surface to an outer side (front side) of the plate 30 opposes a plate 30 attached to a first endface 11A of the ferrule 10 to the other side.

The plate 30 is shaped as a plate-shape that is long in the left-right direction. The shape of the plate 30 is not limited to this shape, however, and may be, for example, other shapes such as a trapezoid, or a rhombus when seen from the front-rear direction. The size of the plate 30 in the left-right direction is a length in which the plate closes the openings of the plurality of the fiber holes 15 aligned in the left-right direction.

The surface to the outer side (front side) of the plate 30 is coated with an antireflection film. The antireflection film is as already been described above.

Spacer parts 111 are formed to the front side of the ferrule 10. The spacer parts 111 are sections that protrude to the front side (the side of the other ferrule) than the first endface 11A and the plate 30. The spacer parts 111 are sections that contact the ferrule 10 to the other side, to make the first endfaces 11A of the ferrules 10 be opposed with a predetermined interval L, and to make the plates 30 be opposed to each other with a predetermined interval.

A pair of the spacer parts 111 is formed protruding to the front side from the left and the right of the ferrule 10. The pair of the spacer parts 111 is arranged so as to sandwich the first endface 11A and the plate 30 from the left and the right.

The endfaces (second endfaces 11B) to the front side of the spacer part 111 are contact endfaces that contact the ferrule to the other side. The second endfaces 11B protrude to the front side than the first endface 11A and the plate 30 (the side of the ferrule to the other side). Thus, when the second endfaces 11B of the two ferrules 10 are made to contact and oppose each other, the plates 30 can be made non-contacting with each other.

Here, the second endfaces 11B are formed in parallel to the first endface 11A. In other words, the second endfaces 11B are inclined 8 degrees with respect to the up-down direction, when seen from the left-right direction. In this way, the first endface 11A and the second endface 11B can be easily formed to the ferrule 10. As described later, the second endface 11B can be in parallel to the up-down direction, as will be described later.

In the second endfaces 11B, the positioning holes 13 are open. Thus, the second endfaces 11B that are to be contact endfaces contacting the ferrule to the other side are to be provided near to the positioning parts (the positioning holes 13 and the positioning pins 14).

Figure 28A:
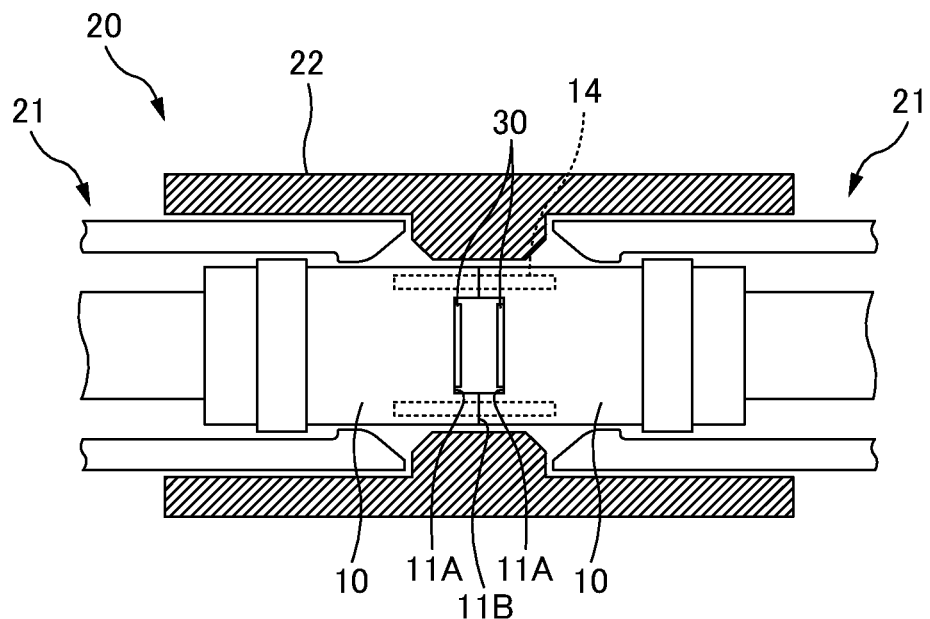
FIG. 28A and FIG. 28B are explanatory views showing a state during optical connection of an eleventh embodiment.
Figure 28B:
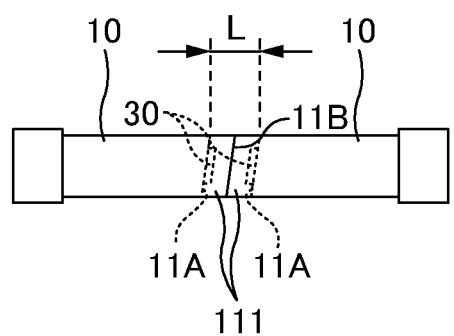

FIG. 28A to FIG. 28C are explanatory views showing a state during optical connection in the eleventh embodiment. FIG. 28A is an explanatory view of an optical connector system 20 in which an optical connector 21 including a ferrule 10 with an optical fiber is inserted from both sides of an adapter 22. FIG. 28B is an explanatory view of positional relationships of the ferrules 10 within the adapter 22. The optical connector system 20 has two optical connectors 21 each including a ferrule 10 with an optical fiber, and an adapter 22 that can be inserted from both sides with the two optical connectors 21.

As shown in FIG. 28A, when the optical connector 21 is each inserted from both sides of the adapter 22, the first endfaces 11 of the ferrules 10 of the optical connectors 21 are arranged opposed to each other, and the plates 30 attached to the first endfaces 11 are arranged opposed to each other. The positioning pins 14 protrude from the ferrule 10 of a male optical connector 21, and these positioning pins 14 are inserted into the positioning holes 13 of the ferrule 10 of the female optical connector 21, to position the ferrules 10 within the adapter 22 to a direction perpendicular to the positioning pins 14 (the left-right direction and the up-down direction). To make the plates 30 parallel to each other, the up-down orientation of the ferrule 10 is reversed (the adhesive filling window 16 is faced in an opposite direction), and the ferrules 10 are opposed.

As shown in FIG. 28B, when the second endfaces 11B of the ferrules 10 of the optical connector 21 contact the spacers 23, the first endfaces 11A of the ferrules 10 are arranged opposed to each other with a predetermined interval L in between, and the plates 30 attached to the first endfaces 11A are arranged opposed to each other with a predetermined interval in between. In other words, when the second endfaces 11B of the ferrules 10 contact each other in the adapter 22, the ferrules 10 are positioned in the front-rear direction, and the plates 30 are positioned in the front-rear direction with respect to each other. To perform positioning in the front-rear direction in this way, the second endface 11B is positioned to the front side, from the first endface 11A, by half an interval L between the first endfaces 11A of the above-described ferrule 10 (refer to FIG. 27).

<Manufacturing Method of Ferrule 10 with Optical Fiber>

Figure 29:
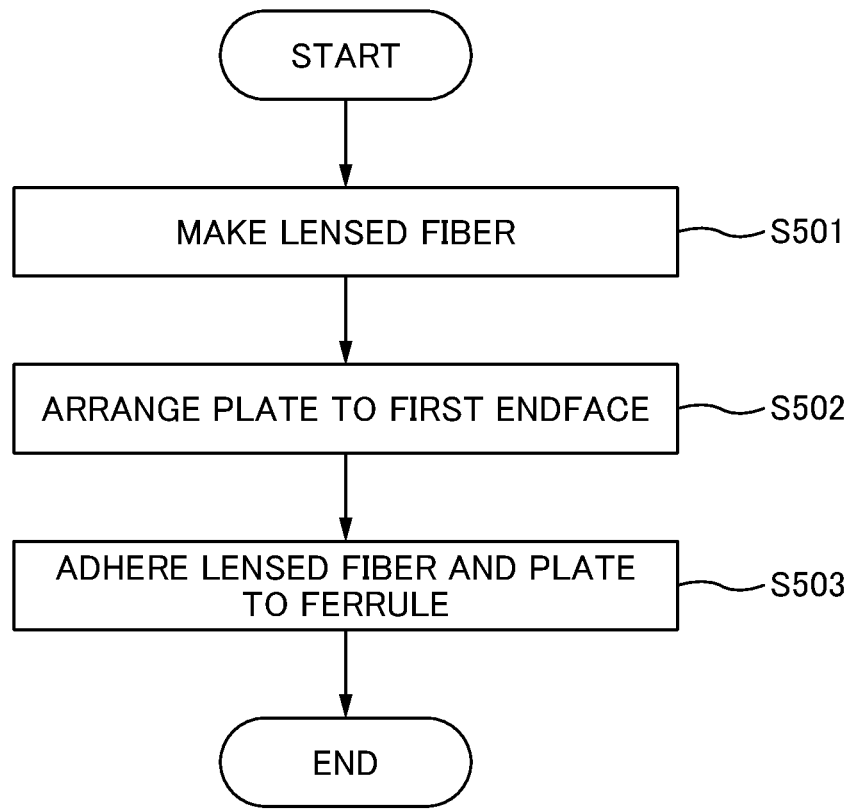
FIG. 29 is a flowchart of a manufacturing method of a ferrule 10 with an optical fiber.

FIG. 29 is a flowchart of a manufacturing method of a ferrule 10 with an optical fiber.

First, a lensed fiber 1 is made (S501). Specifically, first a grated index optical fiber is fusion spliced to a single-mode optical fiber 2, and the fusion spliced grated index optical fiber is cut into a predetermined length, and a GRIN lens 3 is formed to a tip of the single-mode optical fiber 2. An endface (a cut surface) of the GRIN lens 3 at this time is perpendicular to an optical axis of the lensed fiber 1. Note that, fusion splicing is performed so that an outer diameter of a section that has been fusion spliced can pass through the fiber holes 15 (fiber holes 15 with an inner diameter defined by the Standard). A plurality of such lensed fibers 1 is prepared.

Next, an operator prepares the above described ferrule 10, and arranges the plate 30 to the first endface 11A of the ferrule 10 (S502). Because the front side first endface 11A of the ferrule 10 is inclined, when the plate 30 is pressed against and contacted to the first endface 11A, the plate 30 is arranged inclined to a surface perpendicular to the axial direction of the fiber holes 15 of the ferrule 10.

Next, the operator causes the lensed fiber 1 and the plate 30 to adhere to the ferrule 10 (S503). When the lensed fiber 1 and the plate 30 are adhered to the ferrule 10, the endface of the lensed fiber 1 is in a stated contacted against the plate 30. The endface of the lensed fiber 1 is perpendicular to the optical axis, and the plate 30 is inclined to a surface perpendicular to the optical axis, thus there is a space between the endface of the lensed fiber 1 and the plate 30, but an adhesive that is the refractive index matching material is filled in this space. Because the space between the endface 11 of the ferrule 10 and the plate 30 is small, using capillary action, the adhesive is applied in the boundary between the endface 11 of the ferrule 10 and the plate 30, to make the adhesive (refractive index matching material) permeate inside. Here an ultraviolet cure adhesive is used as the refractive index matching material, and after the adhesive is permeated inside, when an ultraviolet ray is irradiated through the plate 30, the adhesive hardens, and the endface of the lensed fiber 1 is adhered to the plate 30. Further, since the ultraviolet cure adhesive has permeated between the endface 11 of the ferrule 10 and the plate 30, when the ultraviolet ray is irradiated through the plate 30, the plate 30 is adhered to the endface 11 of the ferrule 10. Instead of the ultraviolet cure adhesive, a thermosetting adhesive may be used. The operator fills the adhesive from the adhesive filling window 16 to inside the ferrule 10, to fix the lensed fiber 1 to the ferrule 10.

From the above operations, the ferrule 10 with an optical fiber is manufactured. Note that, when the ferrules 10 with an optical fiber manufactured as described above are arranged opposed as shown in FIG. 26 and optically connected, optical loss can be made to approximately 0.7 dB, and return loss can be made to approximately 60 dB.

With the optical connector system 20 of the eleventh embodiment (refer to FIG. 28A), two ferrules 10 are arranged opposed, and the second endfaces 11B of the ferrules 10 contact each other, to make the plates 30 be arranged opposed to each other with a predetermined interval in between. In this way, even when a separate member such as a spacer is not arranged between the ferrules, as shown in FIG. 26, the plates 30 are positioned with respect to each other in the front-rear direction, and the lensed fibers 1 of the two ferrules 10 can be optically connected. These ferrules 10 include the lensed fiber 1 and the plate 30, and with the endfaces of the lensed fibers 1 inserted into the fiber holes 15 contacted against the plate 30, the plate 30 is arranged inclined with respect to a surface that is perpendicular to the optical axis of the lensed fiber 1. Because the plate 30 is inclined, and because the MFD (Mode Field Diameter) of optical signals is large with the GRIN lens 3, optical loss can be suppressed, and since a lens does not have to be formed in the ferrule 10, manufacturing of the ferrule 10 is easy. Further, the plate 30 merely has to be arranged inclined, and the process of obliquely polishing the endface of the ferrule 10 is not necessary.

Modified Example of the Eleventh Embodiment

In the above embodiments, the second endface 11B is inclined with respect to the up-down direction. The second endface 11B, however, may be parallel to the up-down direction.

Figure 30:
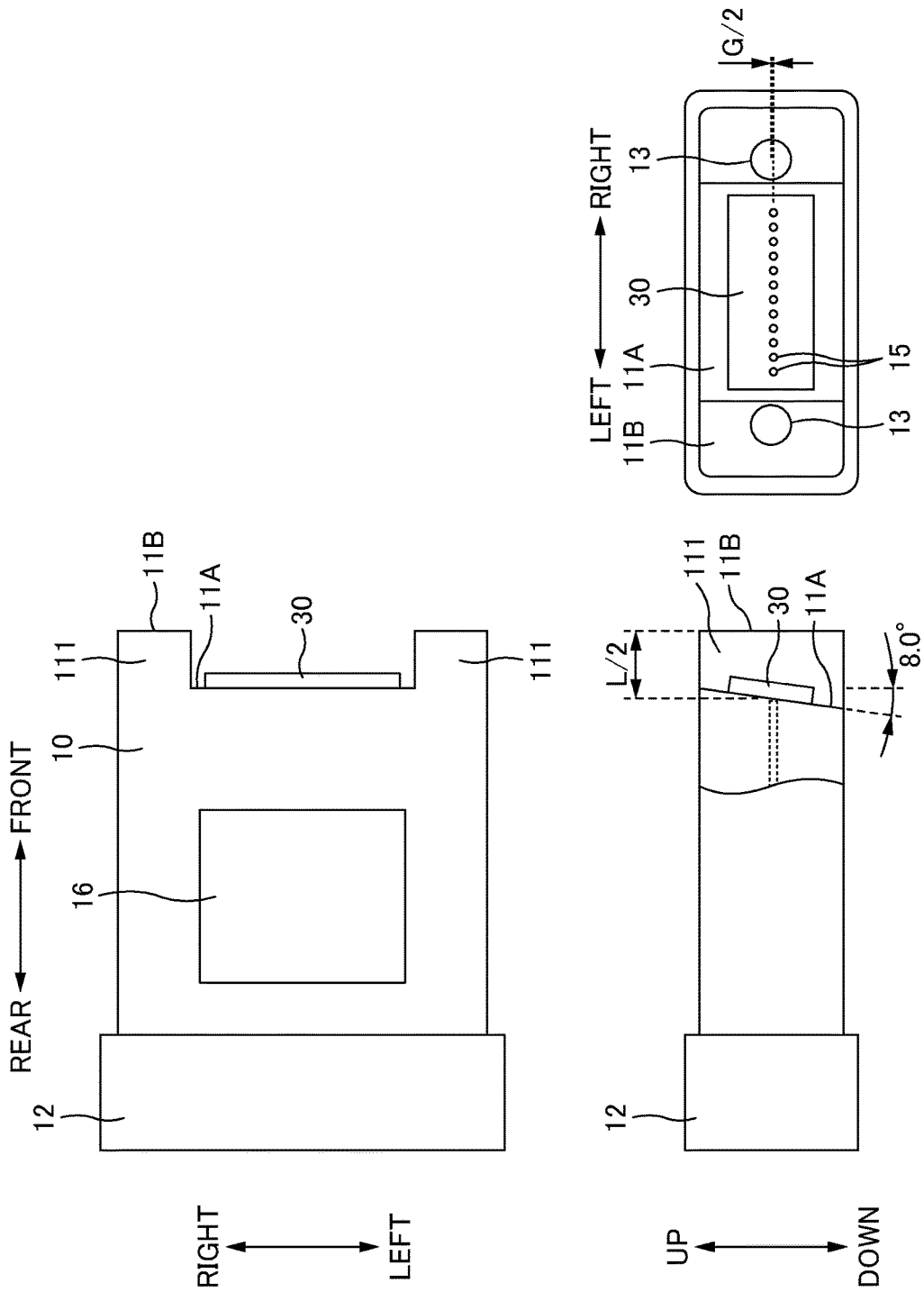
FIG. 30 is an explanatory view of a ferrule 10 of a modified example of an eleventh embodiment.

FIG. 30 is an explanatory view of a ferrule 10 of a modified example of an eleventh embodiment. For the sake of description, the ferrule 10 in a side view is shown partially in section.

The ferrule 10 in the modified example includes a second endface 11B parallel to the up-down direction. In other words, the second endface 11B in the modified example is a surface perpendicular to an axial direction of positioning holes 13 (front-rear direction). Thus, although the first endface 11A is inclined with respect to a surface perpendicular to an optical axis of a lensed fiber 1, the second endface 11B is parallel to the surface perpendicular to the optical axis of the lensed fiber 1.

FIG. 31A is an explanatory view showing a state during optical connection in the modified example of the eleventh embodiment. Also in the modified example, when the optical connector (not shown) is each inserted from both sides of the adapter (not shown), the endfaces 11 of the ferrules 10 are arranged opposed to each other, and the plates 30 attached to the endfaces 11 are arranged opposed to each other.

In the modified example, when the second endfaces 11B of the ferrules 10 contact each other, the first endfaces 11A of the ferrules 10 are arranged opposed to each other with a predetermined interval L, and the plates 30 attached to the first endfaces 11A are arranged opposed to each other with a predetermined interval. In order to perform positioning in the front-rear direction in this way, the second endface 11B in the modified example is positioned to the front side by half the interval L with respect to the first endface 11A, in the position (height) of the positioning holes 13 (refer to FIG. 30).

FIG. 31B is a sectional view showing parts near to openings of positioning holes 13 in the modified example of the eleventh embodiment. When the positioning pins 14 are inserted into the positioning holes 13 of the ferrule 10, then the ferrules 10 are positioned in a direction perpendicular to the positioning pins 14 (in the left-right direction and the up-down direction).

As shown in FIG. 31B, due to a size tolerance, an inner diameter of the positioning hole 13 is formed to be larger than an outer diameter of the positioning pin 14. Thus, a slight space (play) exists between the positioning hole 13 and the positioning pin 14. When contacting the second endfaces 11B of the ferrules 10 against each other (during optical connection), the ferrules 10 are pressed toward the ferrule to the other side, thus supposing that the second endface 11B is inclined with respect to a surface perpendicular to an axial direction of the positioning holes 13, then there is a possibility that the position of the positioning holes 13 of the ferrule 10 in the up-down direction will be slightly displaced, as shown in FIG. 31C. On the contrary, as shown in FIG. 31B, in the modified example of the eleventh embodiment, since the second endface 11B is a surface perpendicular to the axial direction of the positioning holes 13 (front-rear direction), even when the ferrule 10 is pressed against toward the ferrule to the other side, position displacement of the positioning holes 13 in the up-down direction does not easily occur.

Twelfth Embodiment

In the eleventh embodiment, an adhesive that is the refractive index matching material is applied in the boundary between the first endface 11A of the ferrule 10 and the plate 30, and the adhesive is permeated inside with the capillary action. The filling method of the refractive index matching material is not limited to the above.

Figure 32A:
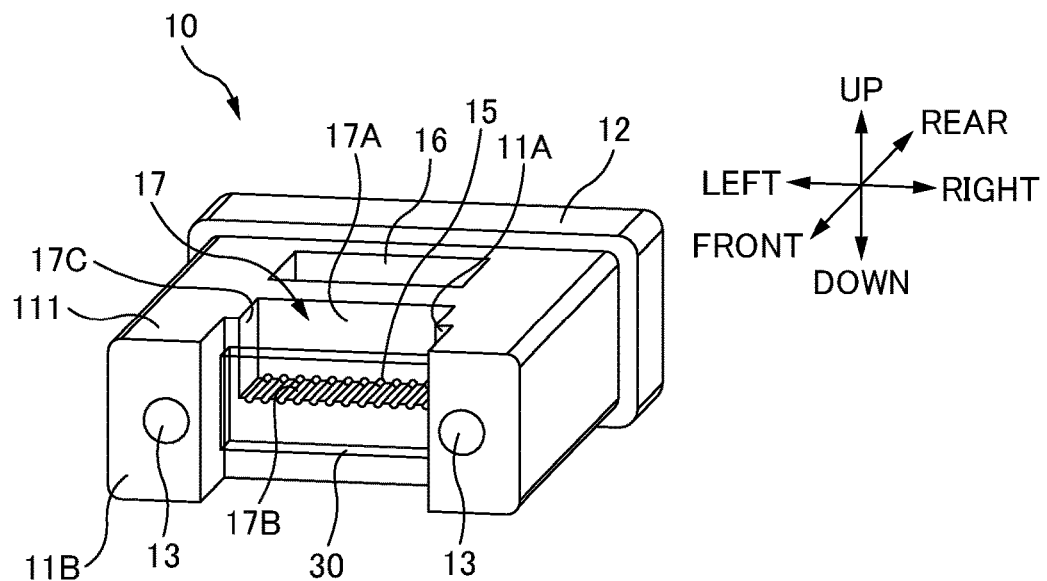
FIG. 32A is a perspective view of a ferrule 10 of a twelfth embodiment.
Figure 32B:
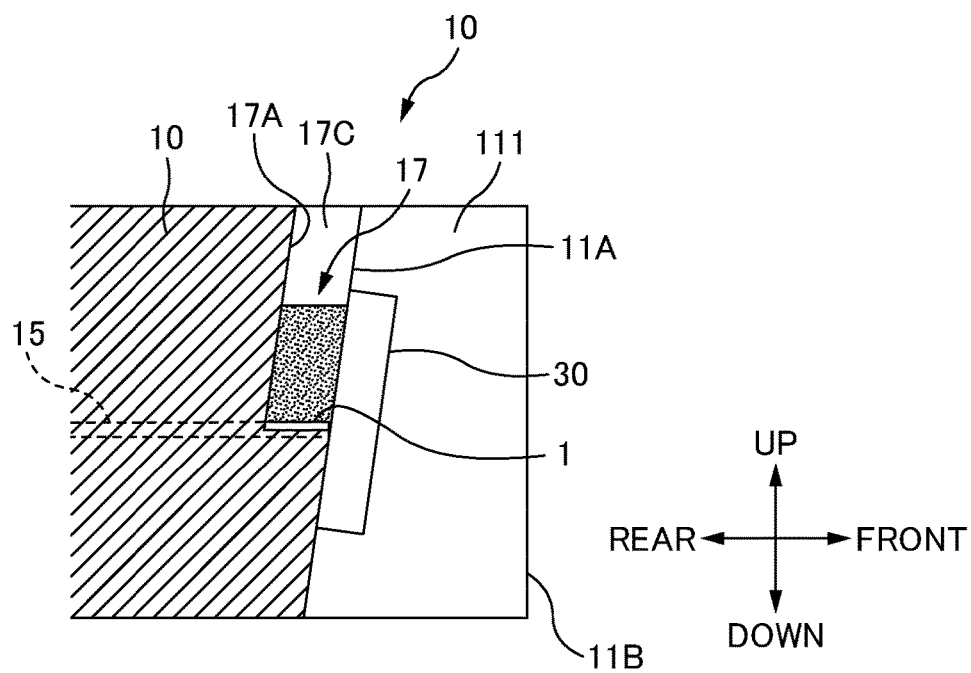
FIG. 32B is an explanatory view showing a state during filling adhesive (refractive index matching material) in a twelfth embodiment.

FIG. 32A is a perspective view of a ferrule 10 of a twelfth embodiment. FIG. 32B is an explanatory view showing a state during filling the adhesive (refractive index matching material) in the twelfth embodiment. Also in the twelfth embodiment, the ferrule 10 includes a second endface 11B (an endface of a spacer part 111) protruding to a front side (a side to a ferrule to the other side) than a first endface 11A and a plate 30. The second endface 11B in the drawing is a surface perpendicular to an axial direction of positioning holes 13 (front-rear direction), but may be inclined with respect to the surface perpendicular to the axial direction of the positioning holes 13 (front-rear direction).

A recess 17 is formed in the front side first endface 11A of the ferrule 10 of the twelfth embodiment. The recess 17 is a section depressed from the front side first endface 11A, and is a section that forms a space to be filled with the adhesive that is the refractive index matching material. The recess 17 is formed with a fiber hole opening surface 17A, a bottom surface 17B, and side surfaces 17C.

The fiber hole opening surface 17A is an inner wall to the rear side of the recess 17 and is positioned to the rear side than the first endface 11A of the ferrule 10. The fiber hole opening surface 17A is a surface to oppose a surface to an inner side of the plate 30, and a plurality of fiber holes 15 is aligned open in the left-right direction in the fiber opening surface.

The bottom surface 17B is an inner wall configuring a bottom of the recess 17. Here, fiber grooves are formed in the bottom surface 17B, and the lensed fibers 1 inserted into the fiber holes 15 are supported with the bottom surface 17B on the fiber grooves (refer to FIG. 32B). In this way, the end parts of the lensed fibers 1 do not have to be bent in the recess 17.

In the twelfth embodiment, the operator arranges the plate 30 to the first endface 11A of the ferrule 10, as shown in FIG. 32A (refer to S502 in FIG. 29). Next, the operator causes the lensed fiber 1 and the plate 30 to adhere to the ferrule 10 (refer to S503). In also the twelfth embodiment, when the lensed fiber 1 and the plate 30 are adhered to the ferrule 10, the endface of the lensed fiber 1 is contacted against the plate 30. In the twelfth embodiment, however, the operator fills the adhesive to be the refractive index matching material in the space surrounded by the plate 30 and the recess 17. In other words, the adhesive that is to be the refractive index matching material is filled in the space surrounded by the plate 30, the fiber hole opening surface 17A, the bottom surface 17B, and the side surfaces 17C. With the twelfth embodiment, the refractive index matching material (adhesive) is filled in the recess 17, so that compared to the case of permeating the adhesive using capillary action, the time to fill the refractive index matching material between the plate 30 and the endface of the lensed fiber 1 can be shortened.

Modified Example of the Twelfth Embodiment

Figure 33A:
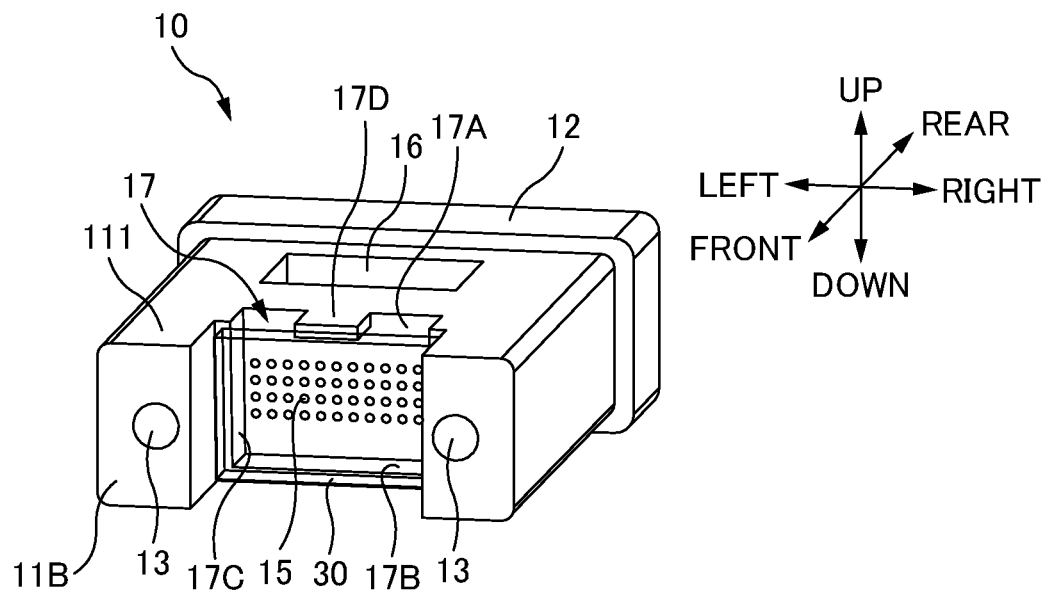
FIG. 33A and FIG. 33B are perspective views of a ferrule 10 of a modified example of a twelfth embodiment.
Figure 33B:
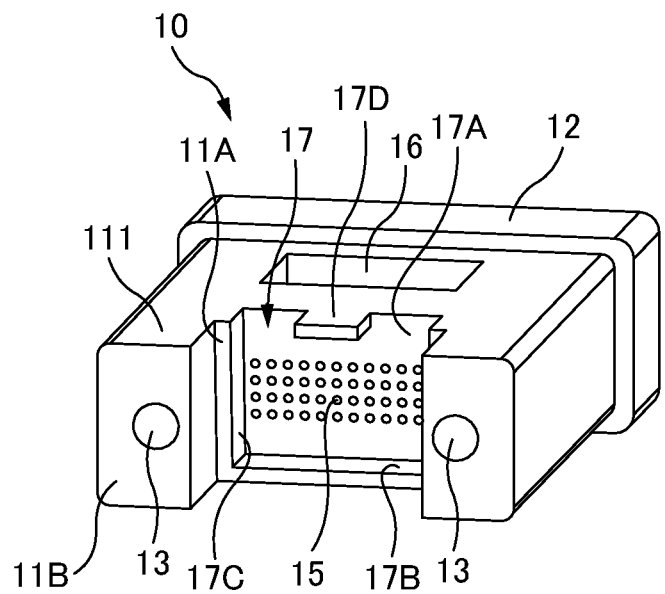
Figure 34:
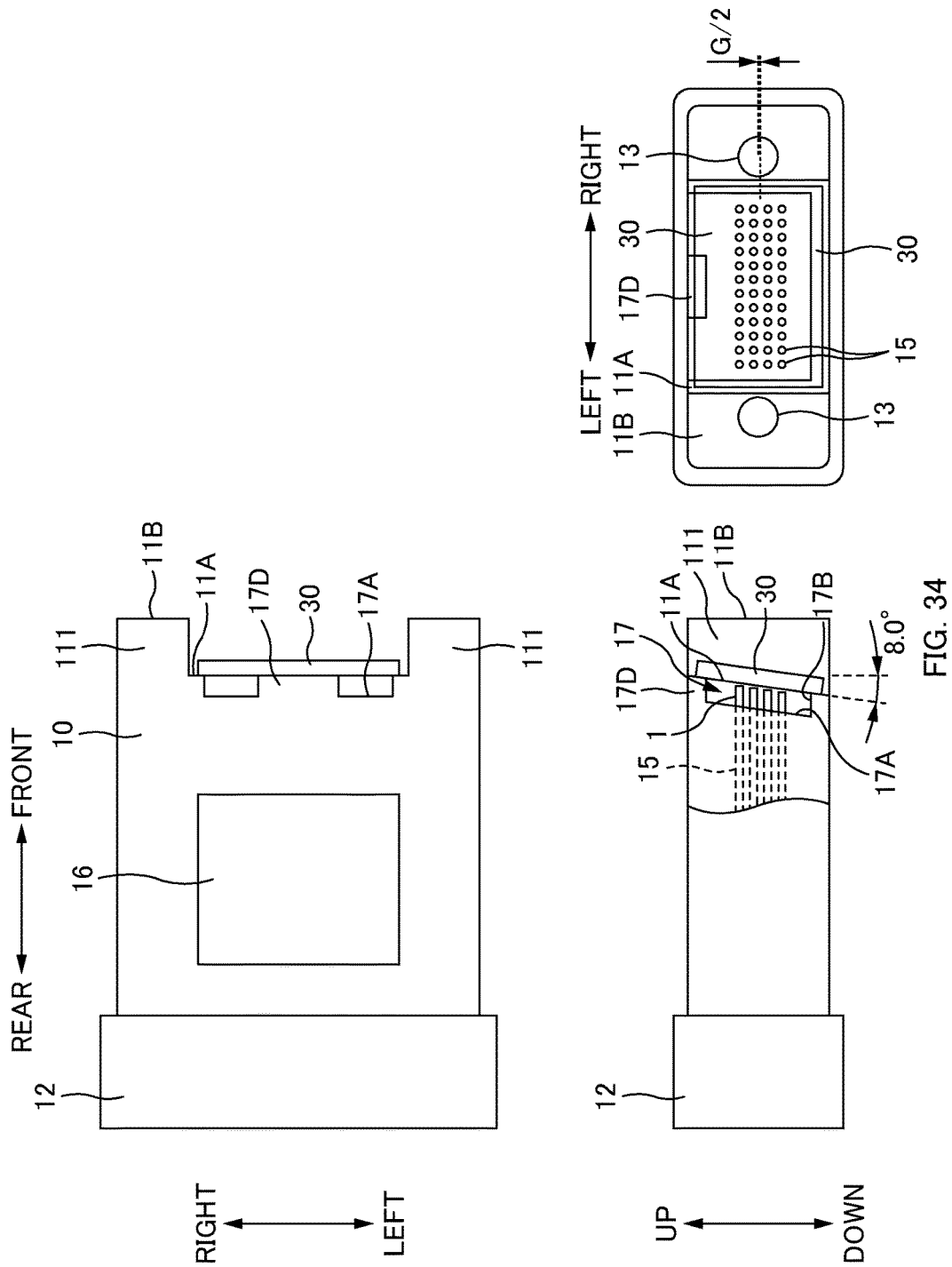
FIG. 34 is an explanatory view of a ferrule 10 of a modified example of a twelfth embodiment.

FIG. 33A and FIG. 33B are perspective views of a ferrule 10 of a modified example of the twelfth embodiment. FIG. 33B is a perspective view showing a state with the plate 30 in FIG. 33A removed. FIG. 34 is an explanatory view of the ferrule 10 of the modified example of the twelfth embodiment. In FIG. 34, for the sake of description, the ferrule 10 in a side view is shown partially in section, and lensed fibers 1 are shown inserted in fiber holes 15. Also in the modified example in the twelfth embodiment, the ferrule 10 includes a second endface 11B (an endface of a spacer part 111) protruding to a front side (a side to a ferrule to the other side) than a first endface 11A and a plate 30. The second endface 11B in the drawing is a surface perpendicular to an axial direction of positioning holes 13 (front-rear direction), but may be inclined with respect to the surface perpendicular to the axial direction of the positioning holes 13 (front-rear direction).

The ferrule 10 of the modified example includes two-dimensionally arranged fiber holes 15. Here, a row of twelve fiber holes 15 aligned in the left-right direction is arranged as four rows in the up-down direction. In the case where the plurality of the optical fiber holes 15 is arranged two-dimensionally, when the first endface 11A of the ferrule 10 is seen from the front side, the central position (barycenteric position) of the plurality of the fiber holes 15 is to be displaced to the lower side by an amount corresponding to G/2 in FIG. 26 from the positioning holes 13. In other words, the first endface 11A is inclined toward the ferrule to the other side the closer to the upper side (the side to the adhesive filling window 16), and the central position of the plurality of the fiber holes 15 is in a position displaced to the lower side from the positioning holes 13 (the opposite side to the side of the adhesive filling windows 16).

In the modified example, the recess 17 is formed in the front side first endface 11A of the ferrule 10. The recess 17 is formed with the fiber hole opening surface 17A, the bottom surface 17B, and the side surfaces 17C, and a protruding part 17D is further formed in the modified example. The protruding part 17D is a section protruding to the front side (the plate 30 side) from an upper edge of the fiber hole opening surface 17A and that contacts an upper edge of the plate 30. The left and right edges and a lower edge of the plate 30 contact the first endface 11A of the ferrule 10, and the upper edge of the plate 30 contacts the protruding part 17D. In this way, the deformation of the plate 30 due to shrinkage of the adhesive filling the recess 17 can be suppressed. In particular, the plurality of the fiber holes 15 is two-dimensionally arranged in the modified example, thus the recess 17 is deeply formed, and the effect of shrinkage of the adhesive to the plate 30 increases, thus the formation of the protruding part 17D to the ferrule 10 is particularly effective.

Thirteenth Embodiment

Figure 35A:
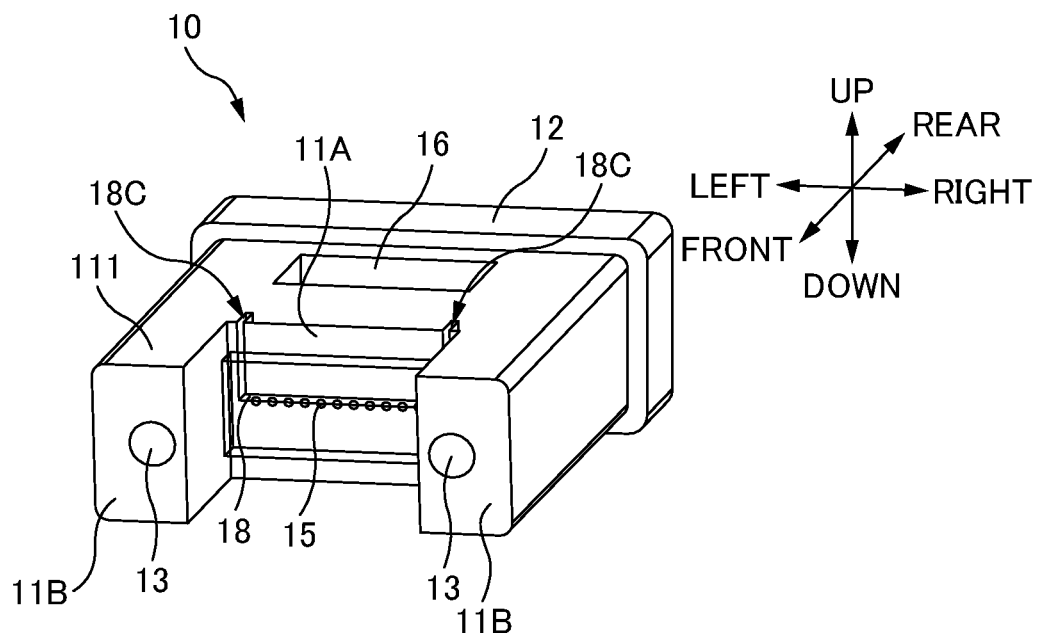
FIG. 35A is a perspective view of a ferrule 10 of a thirteenth embodiment.
Figure 35B:
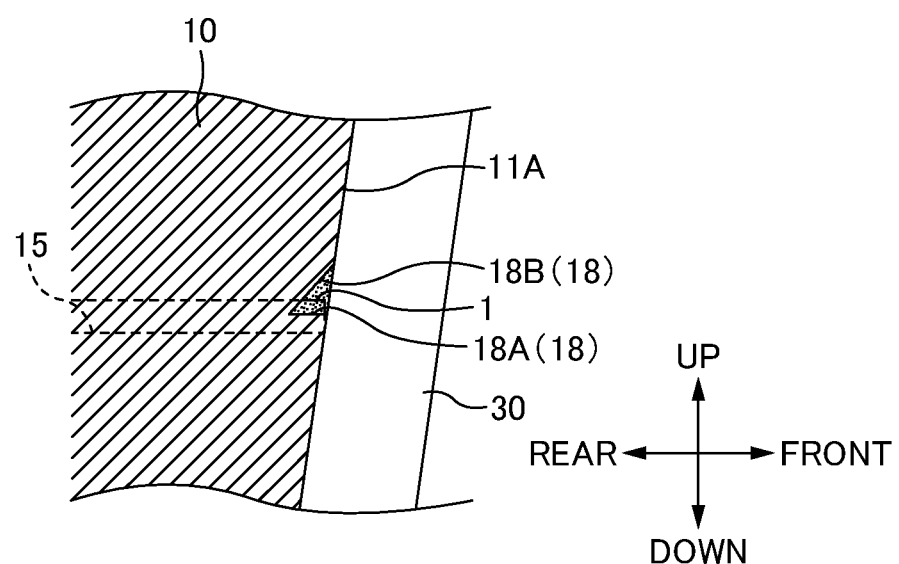
FIG. 35B is an explanatory view showing a state during filling adhesive (refractive index matching material) in a thirteenth embodiment.

FIG. 35A is a perspective view of a ferrule 10 of a thirteenth embodiment. FIG. 35B is an explanatory view showing a state during filling the adhesive (refractive index matching material) in the thirteenth embodiment. Also in the thirteenth embodiment, the ferrule 10 includes a second endface 11B (an endface of a spacer part 111) protruding to a front side (a side to a ferrule to the other side) than a first endface 11A and a plate 30. The second endface 11B in the drawing is a surface perpendicular to an axial direction of positioning holes 13 (front-rear direction), but may be inclined with respect to the surface perpendicular to the axial direction of the positioning holes 13 (front-rear direction).

A groove 18 is formed in an endface to a front side of the ferrule 10 of the thirteenth embodiment. The groove 18 is formed along the left-right direction to penetrate through upper parts of openings of a plurality of fiber holes 15. As shown in FIG. 35B, the groove 18 is formed in a sectionally V-shape and includes a lower surface 18A and an inclined surface 18B. The lower surface 18A is positioned near the center of the openings of the plurality of the fiber holes 15. The inclined surface 18B is an inner wall surface configuring the groove 18 and at least one part is positioned to the upper side than the fiber holes 15. A lower edge (rear edge) of the inclined surface 18B is positioned to a rear edge of the lower surface 18A, and an upper edge (front edge: an edge of a first endface 11A of the ferrule 10) is positioned to the upper side than the fiber holes 15.

End parts of the groove 18 are exposed to the outer side than a plate 30. Here, the left and right ends of the groove 18 are formed extended to reach a topface of the ferrule 10, to expose the left and right ends of the groove 18 to the upper side than the plate 30. In this way, spaces 18C are formed with the groove 18 in boundaries between the first endface 11A of the ferrule 10 and the plate 30, and an adhesive can be filled from these spaces 18C.

In the thirteenth embodiment, the operator arranges the plate 30 in the first endface 11A of the ferrule 10, as shown in FIG. 35A (refer to S502 in FIG. 29). Next, the operator causes the lensed fiber 1 and the plate 30 to adhere to the ferrule 10 (refer to S503). Also in the thirteenth embodiment, when the lensed fiber 1 and the plate 30 are caused to adhere to the ferrule 10, the endface of the lensed fiber 1 is contacted against the plate 30. In the thirteenth embodiment, however, the operator fills the adhesive from one of the two spaces 18C of the groove 18 in the boundary between the endface 11 of the ferrule 10 and the plate 30. The adhesive flows inside along the groove 18 and is filled inside. At this time, even when bubbles are formed inside, the bubbles move to the upper side than the fiber holes 15, thus formation of bubbles in the endface of the lensed fiber 1 can be suppressed.

Modified Example of Thirteenth Embodiment

Figure 36:
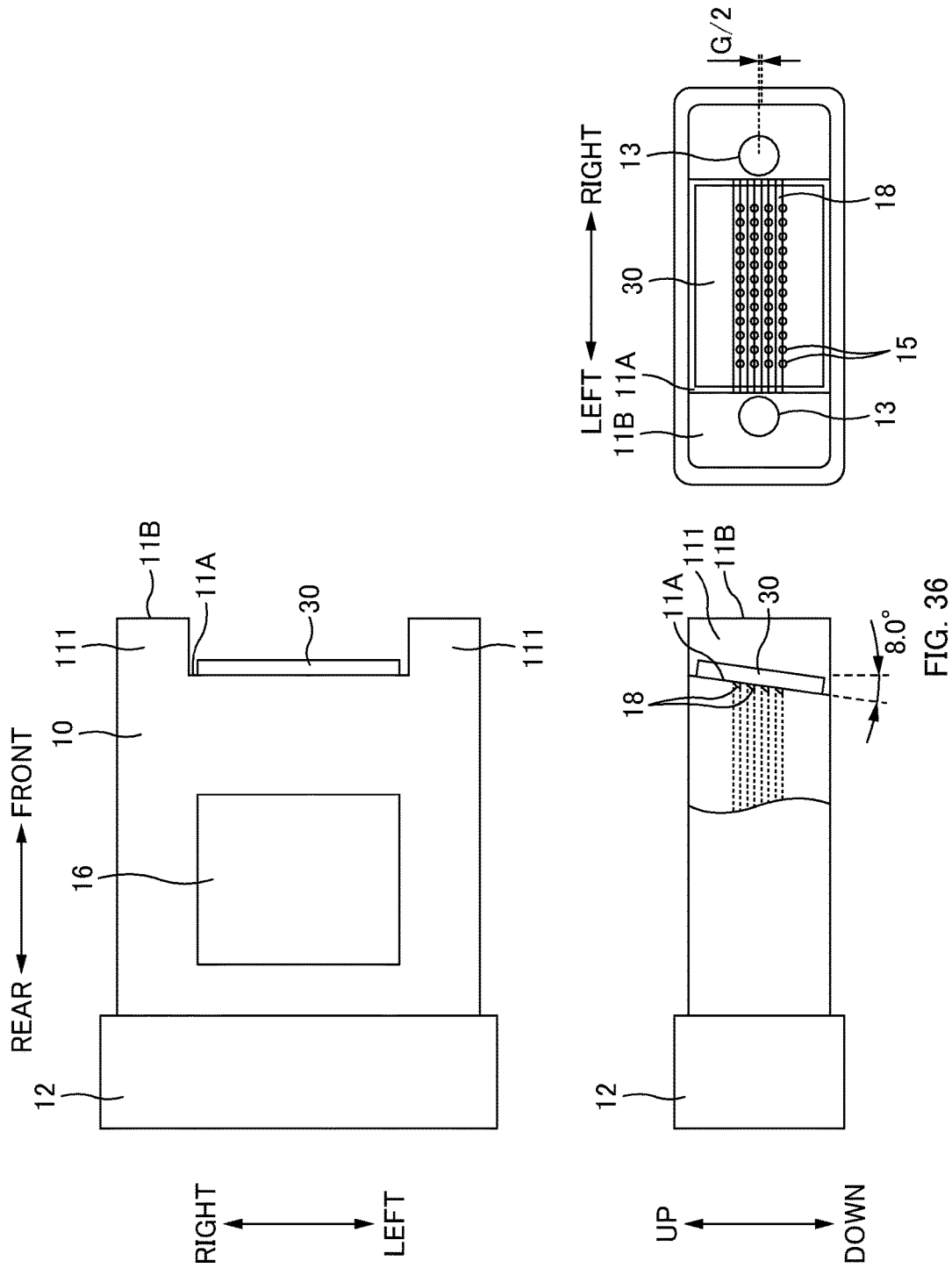
FIG. 36 is an explanatory view of a ferrule 10 of a modified example of a thirteenth embodiment.
Figure 37:
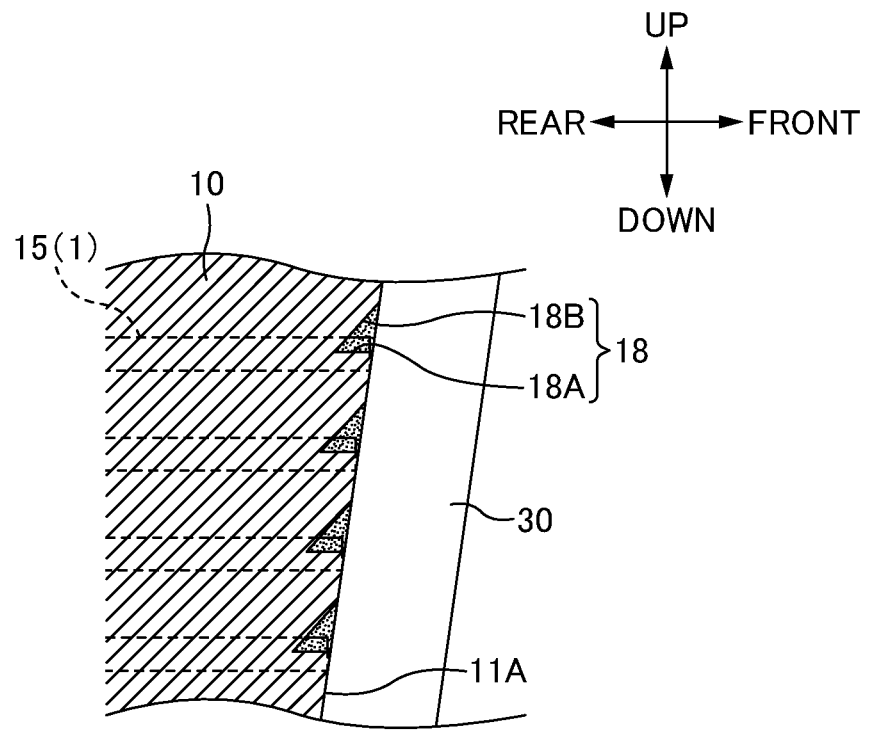
FIG. 37 is an explanatory view showing a state during filling adhesive (refractive index matching material) of a modified example in a thirteenth embodiment.

FIG. 36 is an explanatory view of a ferrule 10 of a modified example of the thirteenth embodiment. FIG. 37 is an explanatory view showing a state during filling an adhesive (refractive index matching material) in the modified example of the thirteenth embodiment. Also in the modified example in the thirteenth embodiment, the ferrule 10 includes a second endface 11B (an endface of a spacer part 111) protruding to a front side (a side to a ferrule to the other side) than a first endface 11A and a plate 30. The second endface 11B in the drawing is a surface perpendicular to an axial direction of positioning holes 13 (front-rear direction), but may be inclined with respect to the surface perpendicular to the axial direction of the positioning holes 13 (front-rear direction).

The ferrule 10 in the modified example includes fiber holes 15 arranged two-dimensionally. Here, four of a row of twelve fiber holes 15 aligned in the left-right direction are arranged in the up-down direction. When the plurality of the optical fiber holes 15 is arranged two-dimensionally, viewing a first endface 11A of the ferrule 10 from a front side, a central position (barycentric position) of the plurality of the fiber holes 15 is displaced to a lower side by an amount corresponding to G/2 in FIG. 26 from positioning holes 13.

Also in the modified example, a groove 18 is formed along the left-right direction, to penetrate through upper parts of the openings of the plurality of the fiber holes 15 aligned in the left-right direction. In the modified example, four of the row aligned with the fiber holes 15 in the left-right direction are arranged in the up-down direction, thus four rows of the grooves 18 are also formed in the up-down direction. The left and the right ends of the groove 18 are formed extended to reach left and right ends of the first side surfaces 11A (inner walls of spacer parts 111) of the ferrule 10. In this way, spaces 18C are formed with the groove 18 in the boundary between the first endface 11A of the ferrule 10 and the plate 30, and an adhesive can be filled from these spaces 18C. The spaces 18C are formed in each of the four rows of grooves 18, thus the adhesive can continue to flow in each of the grooves 18. Note that, supposing that spaces 18C to the left and the right ends of the four rows of the grooves 18 are made as a common space (adhesive is branched from the common space 18C and made to flow into the four rows of grooves 18), a groove 18 in which the adhesive does not easily flow arises. Thus, spaces 18C are preferably formed in each of the four rows of the grooves 18.

Fourteenth Embodiment

In the eleventh embodiment to the thirteenth embodiment, a fluid-state refractive index matching material (adhesive) is filled in a space between the lensed fibers 1 and the plate 30.

In this case, however, there is a possibility that bubbles may form in the endface of the lensed fiber 1. On the contrary, in a fourteenth embodiment, by arranging a soft solid-state refractive index matching material (solid refractive index matching material) to the plate 30, and contacting the lensed fiber 1 against the soft solid refractive index matching material, formation of bubbles in the endface of the lensed fiber 1 is suppressed.

Figure 38:
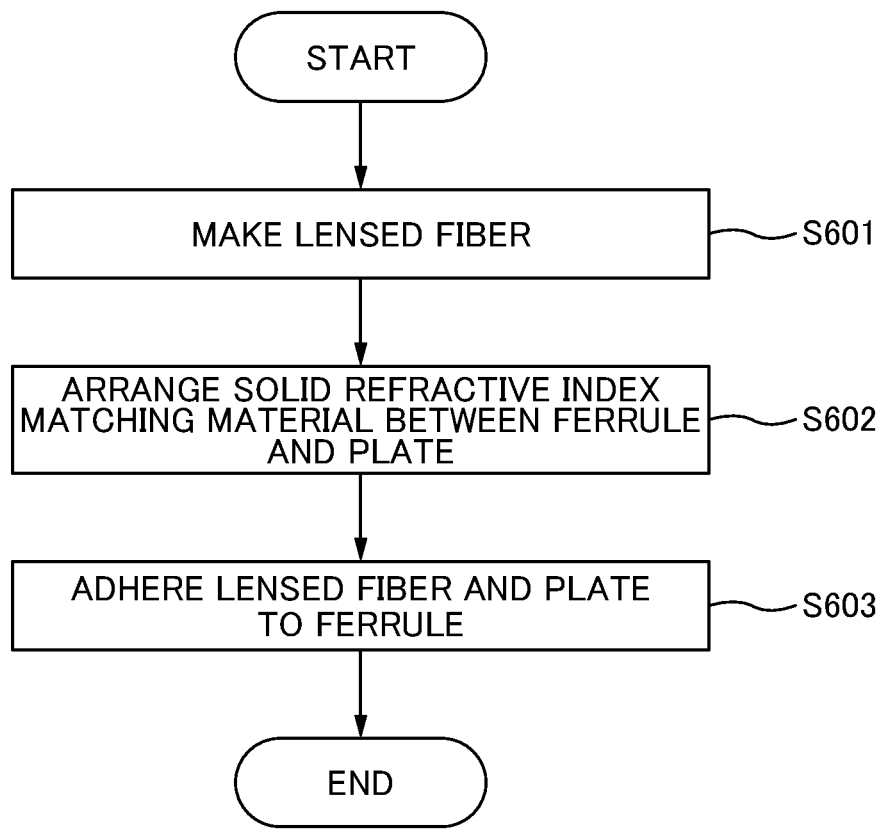
FIG. 38 is a flowchart of a manufacturing method of a ferrule 10 with an optical fiber of a fourteenth embodiment.

FIG. 38 is a flowchart of a manufacturing method of a ferrule 10 with an optical fiber in the fourteenth embodiment.

First, a lensed fiber is made (S601). The process of S601 is the same as the process of S501 in FIG. 29.

Next, an operator arranges the solid refractive index matching material between the ferrule 10 and the plate 30 (S602). The solid refractive index matching material is a light transmitting sheet member, and is a solid refractive index matching material. A refractive index of the solid refractive index matching material is approximately the same as the above-described adhesive (refractive index matching material). The material of the solid refractive index matching material can be, for example, such as acrylic, epoxy, vinyl, silicone, rubber, urethane, methacrylic, nylon, bisphenol, diol, polyimide, fluorinated epoxy, or fluorinated acrylic high-polymer material.

The solid refractive index matching material is arranged to a surface to the rear side of the plate 30. In other words, the solid refractive index matching material is arranged to the surface to which the lensed fibers 1 are contacted against. Thus the solid refractive index matching material opposes openings of the fiber holes 15. For example, a sheet-like (film) solid refractive index matching material is attached to a region opposing the fiber holes 15 of the surface to the recess 17 side of the plate 30 in FIG. 33A. Note that, the sheet-like solid refractive index matching material does not have to be attached to the plate 30, but a liquid refractive index matching material may be applied to the plate 30 and then solidified, to arrange the solid refractive index matching material to the plate 30.

The solid refractive index matching material has a hardness of a degree that the surface deforms when the endfaces of the lensed fibers 1 are contacted against the solid refractive index matching material. In this way, formation of bubbles in the endfaces of the lensed fibers 1 can be suppressed.

As a relationship between a sheet hardness and a thickness of the solid refractive index matching material, the region RD (of the region where Shore A hardness is equal to or smaller than 70, and a thickness is equal to or greater than 30 μm, the region with a smaller thickness than the line, including the line connecting the point P1 and the point P2) is an appropriate region. In other words, a solid refractive index matching material in a range surrounded by four points of (HAS 0, thickness 30 μm), (HAS 70, thickness 30 μm), (HAS 70, thickness 50 μm), (HAS 0, thickness 150 μm), in the drawing is preferably used.

Both surfaces of the solid refractive index matching material preferably have adhesiveness. In this way, the solid refractive index matching material becomes difficult to come off from the plate 30, and after the endfaces of the lensed fibers 1 are contacted against the solid refractive index matching material, the solid refractive index matching material and the endfaces of the lensed fibers become difficult to part. As such a solid refractive index matching material, an adhesive made of high-polymer material made film-like can be used, and from the perspective of environmental resistance and adhesiveness, generally a silicone or an acrylic material can be used.

Next, the operator causes the lensed fiber 1 and the plate 30 to adhere to the ferrule 10 (S603). In the fourteenth embodiment, when the lensed fiber 1 and the plate 30 are adhered to the ferrule 10, the endface of the lensed fiber 1 is contacted against the plate 30 via the solid refractive index matching material. When the endface of the lensed fiber 1 is contacted against the solid refractive index matching material of the plate 30, the endface of the lensed fiber 1 is perpendicular to the optical axis, and the plate 30 is inclined to the surface perpendicular to the optical axis, and when the surface of the solid refractive index matching material deforms along the endface of the lensed fiber 1, the refractive index matching material is filled in the space between the endface of the lensed fiber 1 and the plate 30. The operator causes the lensed fiber 1 and the plate 30 to adhere to the ferrule 10 by filling the adhesive in the recess 17, for example. Further, by filling the adhesive in the adhesive filling window 16, the lensed fiber 1 is fixed to the ferrule 10. In this way, the ferrule 10 with the optical fiber is manufactured.

From the above fourteenth embodiment, by contacting the lensed fibers 1 against the soft solid refractive index matching material arranged to the plate 30, formation of bubbles in the endfaces of the lensed fibers 1 can be suppressed.

Fifteenth Embodiment

Figure 39A:
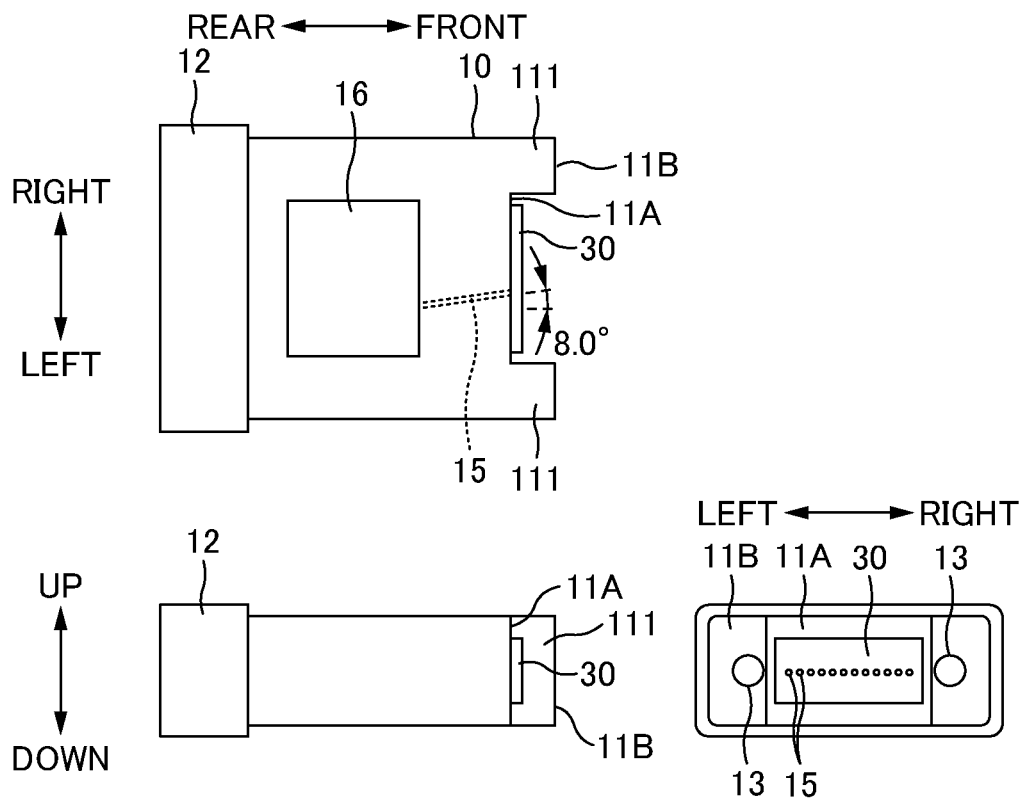
FIG. 39A is an explanatory view of a ferrule 10 of a fifteenth embodiment.

FIG. 39A is an explanatory view of a ferrule 10 of a fifteenth embodiment.

In the fifteenth embodiment, a front side first endface 11A of the ferrule 10 is a surface perpendicular to an axial direction (front-rear direction) of positioning holes 13, and the surface is not inclined. In the fifteenth embodiment, however, an axial direction of fiber holes 15 is inclined 8 degrees with respect to the axial direction of the positioning holes 13. Thus, when lensed fibers 1 are inserted into the fiber holes 15, a first endface 11A to a front side of the ferrule 10 is inclined with respect to a surface perpendicular to an optical axis of the lensed fibers 1 (a surface perpendicular to an axial direction of fiber holes 15). A plate 30 attached to the first endface 11A is also arranged inclined with respect to a surface perpendicular to the optical axis of the lensed fiber 1. In also the fifteenth embodiment, the ferrule 10 includes second endfaces 11B (endfaces of spacer parts 111) protruding to the front side (the side of the ferrule to the other side) than the first endface 11A and the plate 30. In the fifteenth embodiment, the first endface 11A is a surface perpendicular to the axial direction (front-rear direction) of the positioning holes 13, and the second endfaces 11B are also surfaces perpendicular to the axial direction (front-rear direction) of the positioning holes 13.

Figure 39B:
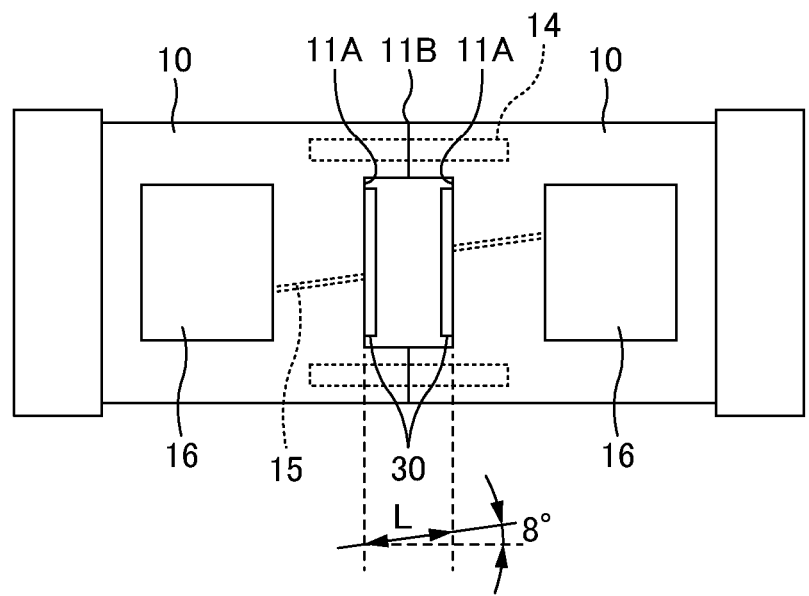
FIG. 39B is an explanatory view showing a state during optical connection of a ferrule 10 of a fifteenth embodiment.

FIG. 39B is an explanatory view showing the state during optical connection of the ferrules 10 in the fifteenth embodiment. Also in the fifteenth embodiment, the first endfaces 11A of the ferrules 10 are arranged opposed to each other, and the plates 30 are arranged opposed to each other. When the positioning pins 14 are inserted into the positioning holes 13 of the ferrule 10, then the ferrules 10 are positioned in a direction perpendicular to the positioning pins 14 (in the left-right direction and the up-down direction) within the adapter that is not shown. In the fifteenth embodiment, to make the fiber holes 15 of the opposing ferrules 10 be parallel to each other, the ferrules 10 are opposed by making the up-down orientation of the ferrules 10 the same (adhesive filling window 16 is made to be the same orientation).

Also in the fifteenth embodiment, as shown in FIG. 39B, with the second endfaces 11B of the ferrules 10 of the optical connector 21 contacting each other, the first endfaces 11A of the ferrules 10 are arranged opposed to each other with a predetermined interval L in between, and also the plates 30 attached to the first endfaces 11A are arranged opposed to each other with a predetermined interval in between. In other words, with the second endfaces 11B of the ferrules 10 contacting each other, the ferrules 10 are positioned with respect to each other in the front-rear direction, and the plates 30 are positioned with respect to each other in the front-rear direction. In the fifteenth embodiment, the length of the spacer parts 111 in the front-rear direction becomes slightly shorter than L/2.

Sixteenth Embodiment

<Regarding Endfaces 11 of Lensed Fiber 1 and Ferrule 10>

Figure 40:
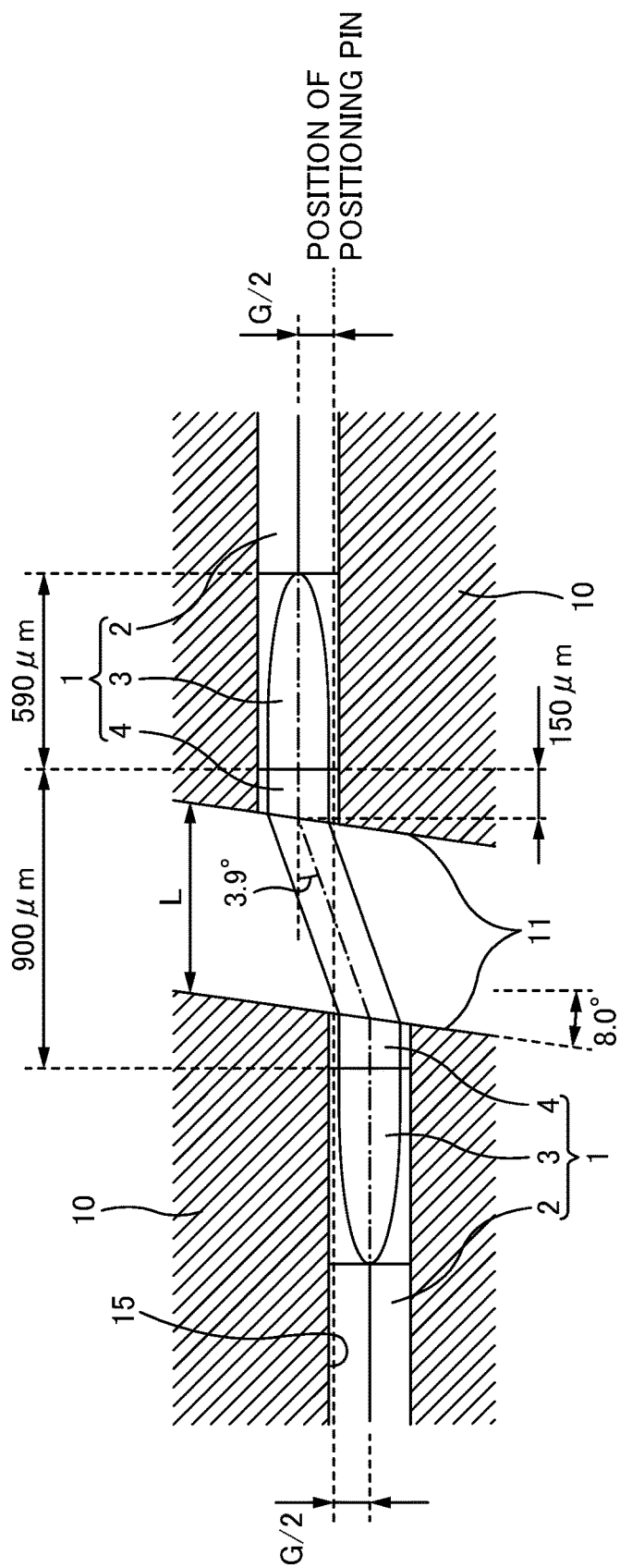
FIG. 40 is an explanatory view of endfaces 11 of lensed fibers 1 and ferrules 10.

FIG. 40 is an explanatory view of endfaces 11 of lensed fibers 1 and ferrules 10. Note that, to easily understand the description, sizes and angles are shown in an exaggerated manner.

The lensed fiber 1 is an optical fiber that includes a single-mode optical fiber 2, a GRIN lens 3, and a coreless fiber 4, and the GRIN lens 3 is fusion spliced to the tip of the single-mode optical fiber 2, and the coreless fiber 4 is fusion spliced to the tip of the GRIN lens 3.

The GRIN lens 3 is a gradient index lens in which a refractive index gradually becomes smaller from a central axis to a periphery. The configuration of the GRIN lens 3 is as already described.

The coreless fiber 4 is provided to the tip of the GRIN lens 3. Parallel light that has entered the coreless fiber 4 from the GRIN lens 3, propagates as parallel light within the coreless fiber 4, and is emitted outside from an endface of the coreless fiber 4. On the contrary, parallel light that enters the coreless fiber 4 from the outside propagates through the coreless fiber 4, and enters the GRIN lens 3.

The endface of the coreless fiber 4 is inclined with respect to the optical axis. Here, the endface of the coreless fiber 4 is inclined 8 degrees with respect to a surface perpendicular to the optical axis. By making the endface of the lensed fiber 1 (the endface of the coreless fiber 4) incline, a return loss can be reduced. Note that, when the endface of the GRIN lens 3 is inclined without providing the coreless fiber 4, the length of the GRIN lens 3 changes, and thus the function as a collimator lens is impaired. For this reason, the coreless fiber 4 is provided to a tip of the GRIN lens 3, and the endface of this coreless fiber 4 is inclined with respect to an optical axis. The inclination of the endface of the coreless fiber 4 is formed by obliquely polishing the endface 11 of the ferrule 10 (to be described later). Here, the length of the coreless fiber 4 along the optical axis is 150 μm, but the length may vary slightly according to the polishing amount.

Next, paths of optical signals that propagate through two lensed fibers 1 are described. Here, the optical signals are described to propagate from the left side lensed fiber 1 to the right side lensed fiber 1.

The optical signals that have propagated through the left side lensed fiber 1 are emitted from the inclined endface of the coreless fiber 4 toward the right side. Since the exterior of the inclined endface is air, the optical signals are refracted according to Snell law of refraction (the refractive index of the coreless fiber 4 is for example, 1.46). As a result, the optical signals that have emitted from the left side lensed fiber 1 are refracted upward (here, refracted upward by merely approximately 3.9 degrees) to an opposite side to the side that the endface is facing (lower side).

The optical signals (parallel light) that have propagated through the air inclined upward with respect to the optical axis enter an inclined endface of the right side lensed fiber 1. The endface of the right side lensed fiber 1 (the endface of the coreless fiber 4) is inclined 8 degrees with respect to a surface that is perpendicular to an optical axis of the lensed fiber 1, and is arranged parallel to the endface of the left side lensed fiber 1. As a result, the optical signals that have entered the inclined endface of the right side lensed fiber 1 propagate through the lensed fiber 1.

To optically connect the left and right lensed fibers 1, in expectation that the refracted optical signals will propagating through air, the lensed fibers 1 need to be arranged with the optical axes of the lensed fibers 1 displaced. Specifically, when an interval between endfaces of the GRIN lenses 3 is 900 μm, a displaced amount G of the optical axes of the lensed fibers 1 is approximately 30 μm. A displaced amount between the positioning parts (the positioning holes 13 or the positioning pins 14) and the fiber holes 15 of the ferrule 10 (=G/2: offset amount) is approximately 15 μm. In the below description, an interval between the endfaces 11 of the ferrules 10 to optically connect the left and the right lensed fibers 1 (the interval in an optical axis direction of the lensed fibers 1) is L.

In this embodiment, because a lens does not have to be formed in the ferrule 10, manufacturing of the ferrule 10 is easy. Further, since the MFD (Mode Field Diameter) of the optical signals propagating between the ferrules 10 is large, optical loss can be suppressed even when the optical axes of the lensed fibers 1 are slightly displaced, and optical loss due to dust attached to the endfaces of the lensed fibers 1 can also be suppressed. The endfaces 11 of the ferrules 10 do not have to be contacted with each other, and the endfaces of the lensed fibers 1 also do not directly contact each other, thus compared to PC connection of normal MT ferrules to each other, there is an advantage that the endfaces 11 of the ferrules 10 and the endfaces of the lensed fibers 1 are not easily damaged. When coating has been applied to the endfaces of the lensed fibers 1 (the endfaces of the coreless fibers 4), it is particularly advantageous for the endfaces 11 of the ferrules 10 to be non-contacting with each other.

<Regarding Ferrule 10>

FIG. 41 is an explanatory view of the ferrule 10.

The ferrule 10 of this embodiment is configured to be approximately the same as a ferrule including an inclined endface as defined by JIS C 5982 (F13 type multicore optical fiber connector: MPO connector), and sizes and positional relationships of the positioning holes 13 and the fiber holes 15 and the like are as defined by the Standard. Note that, when viewing the endface 11 of the ferrule 10 from the front side, the position of the fiber holes 15 are displaced to the lower side by an amount corresponding to G/2 in FIG. 40 from the positioning holes 13.

The ferrule 10 includes two positioning holes 13, a plurality of fiber holes 15, and an adhesive filling window 16.

As shown in FIG. 40, the lensed fiber 1 is inserted into the fiber hole 15. The fiber hole 15 penetrates through between the front side endface 11 of the ferrule 10 and the adhesive filling window 16. The fiber holes 15 are formed in parallel in the front-rear direction, and the plurality of the fiber holes 15 is arranged aligned in the left-right direction. Here, twelve fiber holes 15 are arranged aligned in one line in the left-right direction. The fiber holes 15 are to be sections forming optical paths inside the ferrule 10 and are holes parallel to the optical axes of the lensed fibers 1.

The endface 11 to the front side of the ferrule 10 is to be arranged opposed to a front side endface of the ferrule to the other side. The positioning holes 13 as well as the plurality of the fiber holes 15 are open in the endface 11 to the front side of the ferrule 10.

The front side endface 11 of the ferrule 10 is inclined with respect to a surface perpendicular to the axial direction of the fiber holes 15. Thus, when the lensed fibers 1 are inserted into the fiber holes 15, the front side endface 11 of the ferrule 10 is inclined with respect to the surface that is perpendicular to the optical axes of the lensed fibers 1.

In the sixteenth embodiment, the front side endface 11 of the ferrule 10 is inclined with respect to the up-down direction when seen from the left-right direction. More specifically, the front side endface 11 of the ferrule 10 is inclined 8 degrees with respect to the up-down direction, so that an upper side of the ferrule 10 (the side of the adhesive filling window 16) is more nearer to the front side. In other words, the front side endface 11 of the ferrule 10 is inclined to face the lower side. By inclining the front side endface 11 of the ferrule 10, the process of obliquely polishing the endfaces of the lensed fibers 1 becomes easy.

With the endface 11 being more inclined toward the ferrule to the other side the nearer to the upper side (the side of the adhesive filling window 16), a central position of the plurality of the fiber holes 15 is in a position displaced to the lower side (an opposite side to the side of the adhesive filling window 16) from the positioning holes 13. In other words, the central position (barycentric position) of the plurality of the fiber holes 15 is displaced to the lower side by an amount corresponding to G/2 in FIG. 40 from the positioning holes 13, when viewing the endface 11 of the ferrule 10 from the front side. Thus, even when the optical signals are refracted at the inclined surface as shown in FIG. 40, optical connection is possible.

Figure 42A:
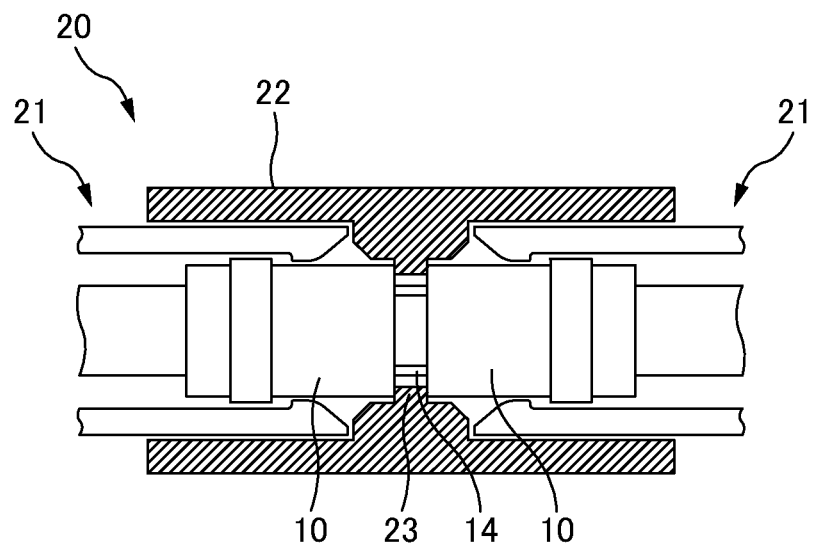
FIG. 42A to FIG. 42C are explanatory views showing a state during optical connection.
Figure 42B:
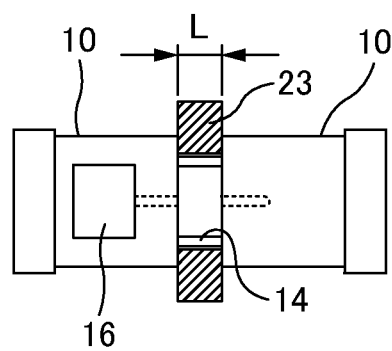
Figure 42C:
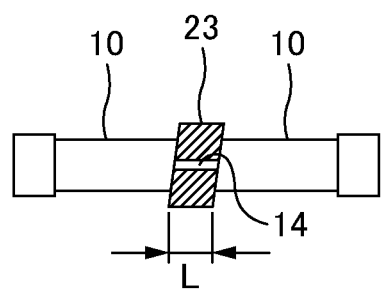

FIG. 42A to FIG. 42C are explanatory views showing a state during optical connection. FIG. 42A is an explanatory view of an optical connector system 20 in which an optical connector 21 including a ferrule 10 with an optical fiber is inserted from both sides of an adapter 22. FIG. 42B and FIG. 42C are explanatory views of positional relationships of the ferrule 10 within the adapter 22. The optical connector system 20 has two optical connectors 21 each including a ferrule 10 with an optical fiber, and an adapter 22 that can be inserted from both sides with two optical connectors 21.

As shown in FIG. 42A, when the optical connector 21 is each inserted from both sides of the adapter 22, the endfaces 11 of the ferrules 10 of the optical connectors 21 are arranged opposed to each other. The positioning pins 14 protrude from the ferrule 10 of a male optical connector 21, and these positioning pins 14 are inserted into the positioning holes 13 of the ferrule 10 of the female optical connector 21, to position the ferrules 10 within the adapter 22 to a direction perpendicular to the positioning pins 14 (the left-right direction and the up-down direction). To make the inclined endfaces 11 of the ferrules 10 parallel to each other, the up-down orientation of the ferrule 10 is reversed (the adhesive filling window 16 is faced in an opposite direction), and the ferrules 10 are opposed.

Spacers 23 protruding to the inner side are formed inside the adapter 22. The size of the spacer 23 in the front-rear direction corresponds to an interval L between the endfaces 11 of the above described ferrules 10. As shown in FIG. 42B and FIG. 42C, when the ferrules 10 contact the spacers 23, the endfaces 11 of the ferrules 10 are arranged opposed to each other with a predetermined interval L in between. In other words, when the ferrules 10 contact the spacers 23 in the adapter 22, the ferrules 10 are positioned in the front-rear direction. Here the endfaces 11 (inclined endfaces) to the front side of the ferrules 10 are contacting the spacers 23, but the brim parts 12 of the ferrules 10 may contact the spacers 23, to oppose the endfaces 11 of the ferrules 10 with a predetermined interval L in between.

<Manufacturing Method of Ferrule 10 with Optical Fiber>

Figure 43:
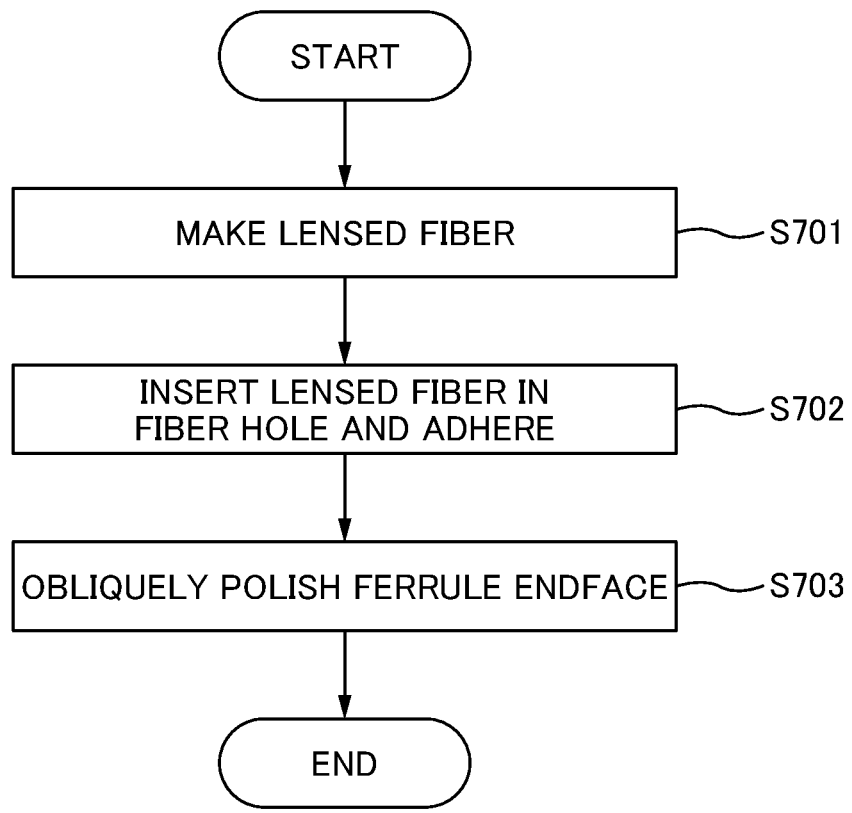
FIG. 43 is a flowchart of a manufacturing method of a ferrule 10 with an optical fiber.

FIG. 43 is a flowchart of a manufacturing method of a ferrule 10 with an optical fiber.

First, a lensed fiber 1 is made (S701). Specifically, first a grated index optical fiber is fusion spliced to a single-mode optical fiber 2, and the fusion spliced grated index optical fiber is cut into a predetermined length, and a GRIN lens 3 is formed to a tip of the single-mode optical fiber 2. Next, a coreless fiber 4 is fusion spliced to a tip end of the GRIN lens 3, and the coreless fiber 4 that has been fusion spliced is cut into a predetermined length. An endface (a cut surface) of the coreless fiber 4 at this time is perpendicular to an optical axis of the lensed fiber 1, and has not yet been made to incline. Fusion splicing is performed so that an outer diameter of a section that has been fusion spliced can pass through the fiber holes 15 (fiber holes 15 with an inner diameter defined by the Standard). A plurality of such lensed fibers 1 is prepared.

Next, the operator inserts the lensed fiber 1 into the fiber hole 5 and the lensed fiber 1 is adhered (S702). At this time, the operator inserts the lensed fiber 1 into the fiber hole 5 such that an end part of the lensed fiber 1 (coreless fiber 4) protrudes slightly from the endface 11 of the ferrule 10, in order to be able to obliquely polish the endface of the coreless fiber 4 later. After the lensed fiber 1 has been inserted, the operator fills the adhesive from the adhesive filling window 16 to inside the ferrule 10, to adhere the lensed fiber 1 to the ferrule 10.

After adhering the lensed fiber 1, the operator polishes obliquely (oblique polishing) the endface 11 of the ferrule (S703). Since the endface 11 of the ferrule 10 has already been inclined, by polishing along the endface 11 of this inclined ferrule 10, the endface of the lensed fiber 1 (endface of the coreless fiber 4) will also be polished obliquely. In this way, the ferrule 10 with an optical fiber is manufactured. Note that, when the ferrules 10 with an optical fiber manufactured as described above are arranged opposed as shown in FIG. 40 and optically connected, optical loss can be made to approximately 0.7 dB, and return loss can be made to approximately 60 dB.

A coating (AR coat) may be applied to the endface of the lensed fiber 1 after the oblique polishing. By applying an AR coat to the endface of the lensed fiber 1, transmittance loss of optical signals can be suppressed. With the ferrule 10 with an optical fiber of this embodiment, since the endfaces 11 of the ferrules 10 during optical connection are non-contacting, the coating is not easily damaged.

In the above sixteenth embodiment, in the endface 11 of the ferrule 10, the endface of the coreless fiber 4 of the lensed fiber 1 inserted into the fiber hole 15 is inclined with respect to a surface that is perpendicular to the optical axis of the lensed fiber 1. Because the fiber endface is inclined, and because the MFD (Mode Field Diameter) of optical signals is large with the GRIN lens 3, optical loss can be suppressed, and since a lens does not have to be formed in the ferrule, manufacturing of the ferrule 10 is easy.

In the sixteenth embodiment, the endface 11 of the ferrule 10 is inclined when viewed from the left-right direction (a direction in which two positioning holes 15 are aligned). By inclining the endface 11 to the front side of the ferrule 10 in this way, the process of polishing obliquely the endface of the lensed fiber 1 becomes easy.

Modified Example of the Sixteenth Embodiment

The above-described ferrule 10 is arranged aligned with twelve fiber holes 15 in one line in the left-right direction. The number and arrangement of the fiber holes 15, however, is not limited to the above.

Figure 44:
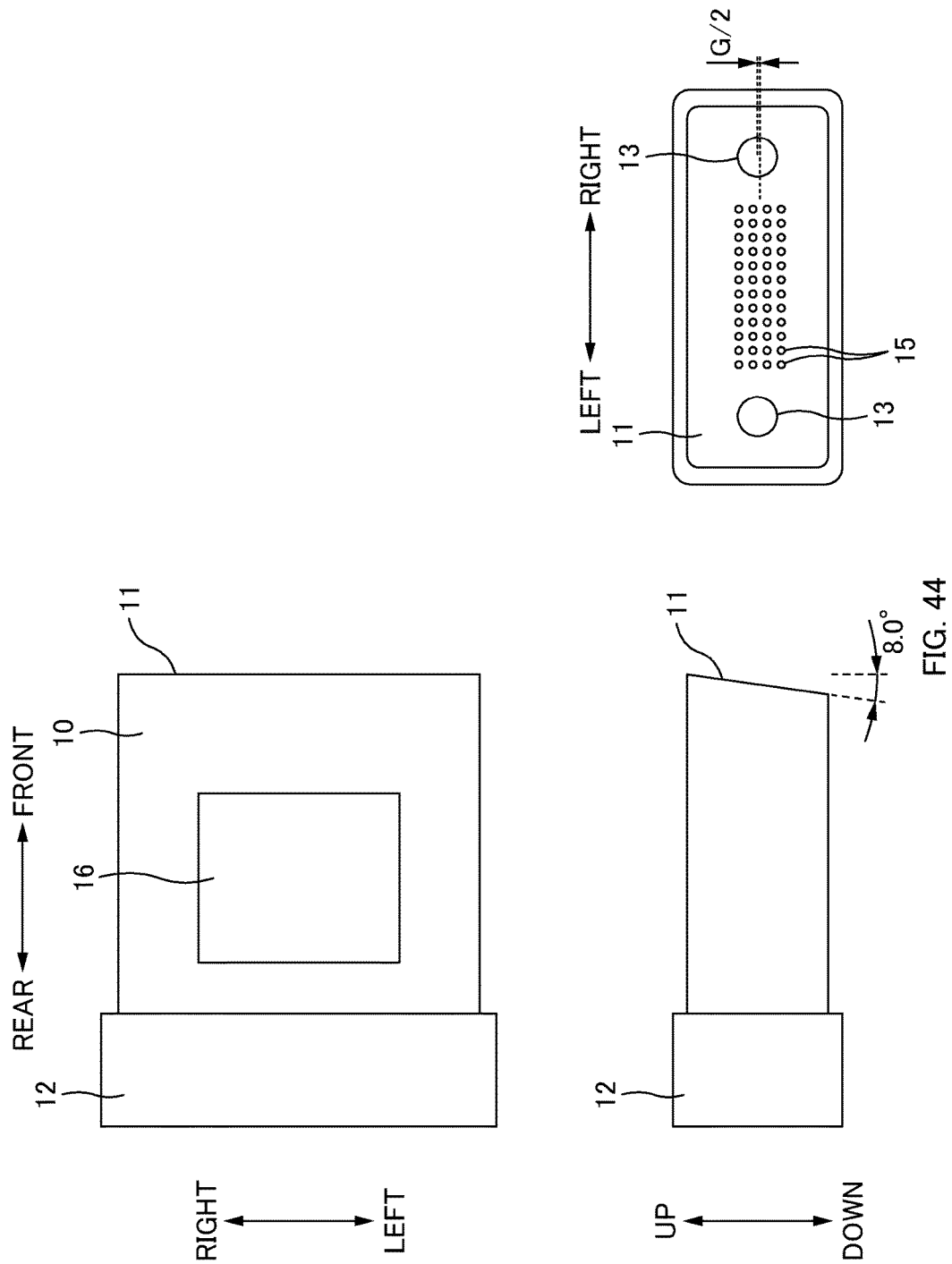
FIG. 44 is an explanatory view of a ferrule 10 of a modified example of a sixteenth embodiment.

FIG. 44 is an explanatory view of a ferrule 10 of a modified example of the sixteenth embodiment. The ferrule 10 of the modified example includes two-dimensionally arranged fiber holes 15. Here, a row of twelve fiber holes 15 aligned in the left-right direction is arranged as four rows in the up-down direction. In the case where the plurality of the optical fiber holes 15 is arranged two-dimensionally, when the endface 11 of the ferrule 10 is seen from the front side, the central position (barycenteric position) of the plurality of the fiber holes 15 is to be displaced to the lower side by an amount corresponding to G/2 in FIG. 40 from the positioning holes 13. In other words, the endface 11 is inclined toward the ferrule to the other side the closer to the upper side (the side to the adhesive filling window 16), and the central position of the plurality of the fiber holes 15 is in a position displaced to the lower side from the positioning holes 13 (the opposite side to the side of the adhesive filling windows 16).

Seventeenth Embodiment

Figure 45A:
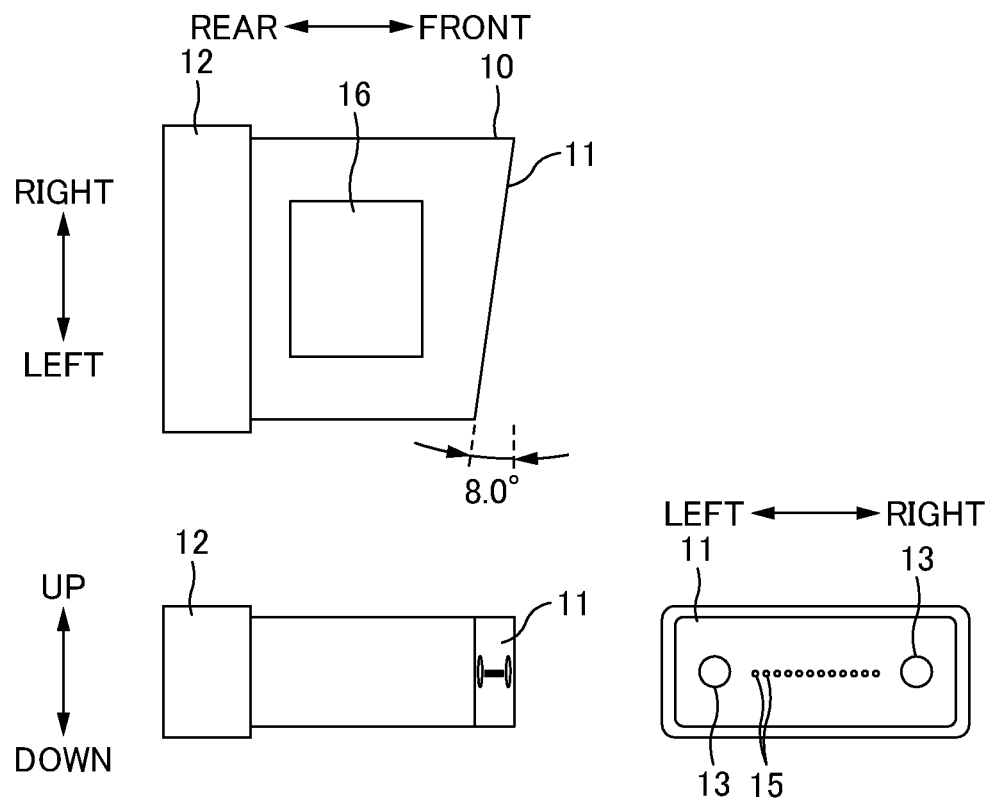
FIG. 45A is an explanatory view of a ferrule 10 of a seventeenth embodiment.

FIG. 45A is an explanatory view of a ferrule 10 of a seventeenth embodiment. In the seventeenth embodiment, similar to the sixteenth embodiment, an endface 11 to a front side of the ferrule 10 is inclined with respect to a surface perpendicular to an axial direction of the fiber holes 15. Thus, when the lensed fiber 1 is inserted into the fiber hole 15, the endface 11 to the front side of the ferrule 10 is inclined with respect to a surface perpendicular to an optical axis of the lensed fiber 1.

In the seventeenth embodiment, the endface 11 to the front side of the ferrule 10 is inclined 8 degrees with respect to the left-right direction when seen from above (when seen from a direction perpendicular to (an up-down direction) a left-right direction in which two positioning holes 15 are aligned and a front-rear direction that is an axial direction of positioning holes 15). By inclining the endface 11 to the front side of the ferrule 10, the process of polishing obliquely the endface of the lensed fiber 1 becomes easy.

Figure 45B:
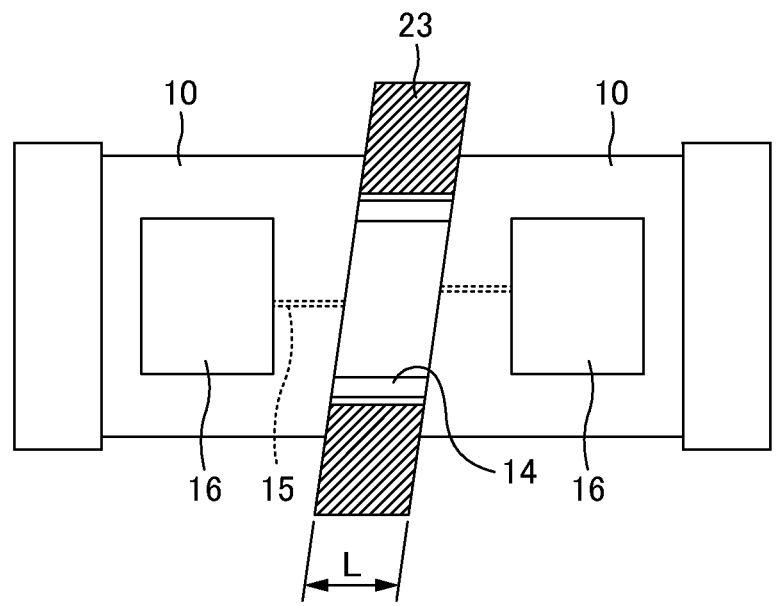
FIG. 45B is an explanatory view showing a state during optical connection of a ferrule 10 of a seventeenth embodiment.

FIG. 45B is an explanatory view showing the state during optical connection of the ferrules 10 in the seventeenth embodiment. Also in the seventeenth embodiment, the endfaces 11 of the ferrules 10 are arranged opposed to each other. When the positioning pins 14 are inserted into the positioning holes 13 of the ferrule 10, then the ferrules 10 are positioned in a direction perpendicular to the positioning pins 14 (in the left-right direction and the up-down direction) within the adapter that is not shown.

In the seventeenth embodiment, to make the inclined endfaces 11 of the ferrules 10 be parallel to each other, the ferrules 10 are opposed by making the up-down orientation of the ferrules 10 the same (adhesive filling window 16 is made to be the same orientation). Thus, in the seventeenth embodiment, the position of the fiber holes 15 in the up-down direction is the same as the position of the positioning holes 13 in the up-down direction (in the seventeenth embodiment, however, the plurality of the fiber holes 15 is displaced in the left-right direction by an amount corresponding to G/2 in FIG. 40 to the side of one of the positioning holes 13).

Also in the seventeenth embodiment, with the ferrules 10 contacting the spacers 23, the endfaces 11 of the ferrules 10 are arranged opposed to each other with a predetermined interval L in between. In other words, with the ferrules 10 contacting the spacers 23, the ferrules 10 are positioned with respect to each other in the front-rear direction.

Eighteenth Embodiment

Figure 46A:
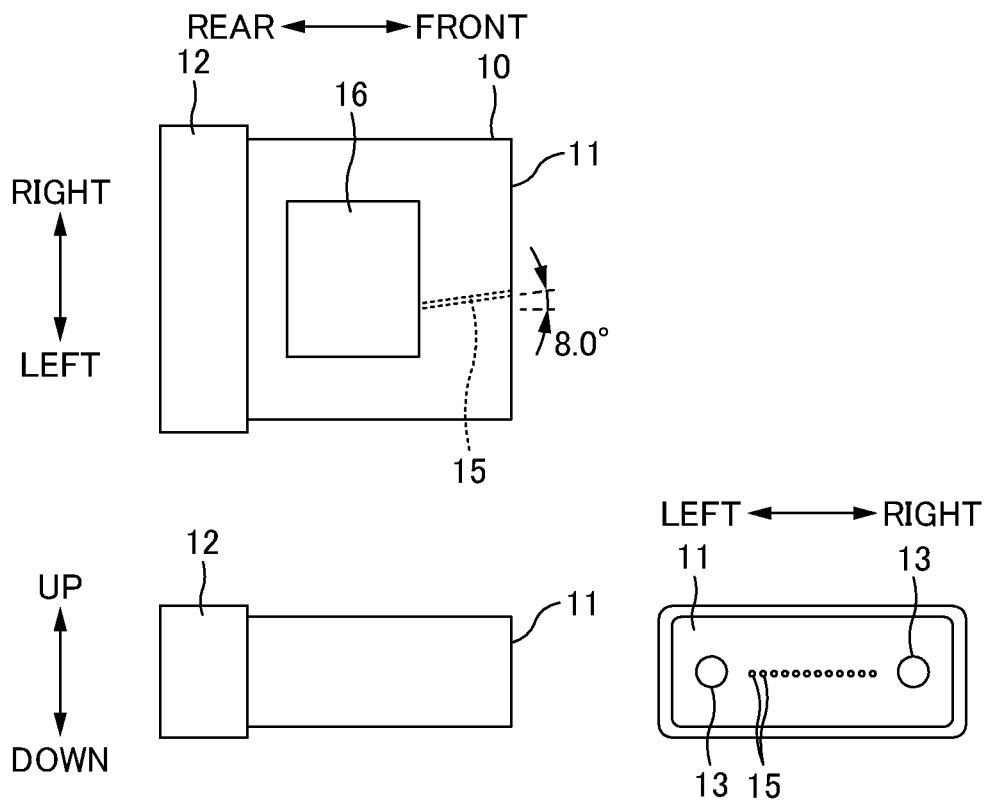
FIG. 46A is an explanatory view of a ferrule 10 of an eighteenth embodiment.

FIG. 46A is an explanatory view of a ferrule 10 of an eighteenth embodiment.

In the eighteenth embodiment, an endface 11 to a front side of the ferrule 10 is a surface that is perpendicular to an axial direction of positioning holes 13 (a front-rear direction), and is not inclined. In the eighteenth embodiment, however, an axial direction of the fiber holes 15 is inclined 8 degrees with respect to an axial direction of the positioning holes 13. Thus, when lensed fibers 1 are inserted into the fiber holes 15, an endface 11 to a front side of the ferrule 10 inclines with respect to a surface perpendicular to an optical axis of lensed fibers 1.

In the eighteenth embodiment, the endface 11 to the front side of the ferrule 10 is a surface perpendicular to the axial direction (front-rear direction) of the positioning holes 13, and the surface is not inclined. In the eighteenth embodiment, however, the axial direction of the fiber holes 15 is inclined with respect to the endface 11 to the front side of the ferrule 10. Thus, when polishing along the endface 11 of the ferrule 10 is performed after the lensed fiber 1 is inserted into the fiber hole 15, the endface of the lensed fiber 1 can be polished obliquely.

Figure 46B:
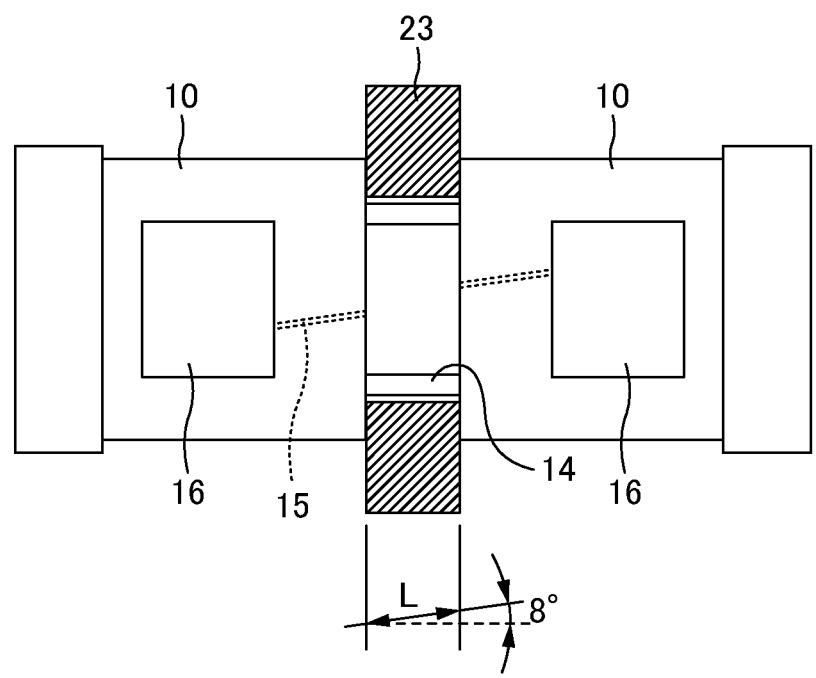
FIG. 46B is an explanatory view showing a state during optical connection of a ferrule 10 of an eighteenth embodiment.

FIG. 46B is an explanatory view showing the state during optical connection of the ferrules 10 in the eighteenth embodiment. Also in the eighteenth embodiment, the endfaces 11 of the ferrules 10 are arranged opposed to each other. When the positioning pins 14 are inserted into the positioning holes 13 of the ferrule 10, then the ferrules 10 are positioned in a direction perpendicular to the positioning pins 14 (in the left-right direction and the up-down direction) within the adapter that is not shown. In the eighteenth embodiment, to make the fiber holes 15 of the opposing ferrules 10 be parallel to each other, the ferrules 10 are opposed by making the up-down orientation of the ferrules 10 the same (adhesive filling window 16 is made to be the same orientation).

Also in the eighteenth embodiment, with the ferrules 10 contacting the spacers 23, the endfaces 11 of the ferrules 10 are arranged opposed to each other with a predetermined interval L in between (not an interval in the front-rear direction, but an interval in the optical axis direction of the lensed fibers 1). In other words, with the ferrules 10 contacting the spacers 23, the ferrules 10 are positioned with respect to each other in the front-rear direction. In the eighteenth embodiment, the thickness of the spacers 23 in the front-rear direction becomes slightly thinner than in the sixteenth embodiment and the seventeenth embodiment (thickness L).

Other Points

The above embodiments are to facilitate understanding of this invention, and are not for limiting understanding of this invention. The invention may be altered and modified without departing from the gist thereof, and it is needless to say that this invention includes equivalents of the invention.

REFERENCE SIGNS LIST 1 lensed fiber
2 single-mode optical fiber
3 GRIN lens
4 coreless fiber
10 ferrule
11 endface
11A first endface
11B second endface
111 spacer part
12 brim part
13 positioning hole
14 positioning pin
15 fiber hole
16 adhesive filling window
17 recess
17A fiber hole opening surface
17B bottom surface
17C side surface
17D protruding part
18 groove
18A lower surface
18B inclined surface
18C space
20 optical connector system
21 optical connector
22 adapter
23 spacer
23A recess part
30 plate

The invention claimed is:
1. A ferrule with a fiber comprising:
a ferrule including a positioning hole, a plurality of fiber holes, and an endface perpendicular to an axial direction of the fiber holes;
a lensed fiber with a GRIN lens that has been fusion spliced to a tip of an optical fiber; and
a plate that can transmit light propagating through the optical fiber, the plate being attached to the endface of the ferrule, the plate being contacted against with an endface of the lensed fiber that has been inserted into each of the fiber holes,
wherein the ferrule is formed with a recess that is depressed from the endface of the ferrule,
a refractive index matching material is filled in a space surrounded with the plate and the recess.
2. A ferrule with a fiber according to claim 1,
wherein an antireflection film is formed to a surface of an outer side of the plate.
3. A ferrule with a fiber according to claim 1,
wherein the ferrule includes a contact endface configured to contact another ferrule, the contact endface protruding more toward the another ferrule than said plate and said ferrule's endface to which said plate is attached.
4. A ferrule with a fiber according to claim 1,
wherein the recess is formed with a fiber hole opening surface in which the plurality of the fiber holes is open, the fiber hole opening surface being opposed to a surface to an inner side of the plate,
a protruding part that protrudes from the fiber hole opening surface to a side of the plate and that contacts an edge of the plate is formed.

5. A ferrule with a fiber according to claim 1,
wherein a solid refractive index matching material is arranged on an inner surface of the plate, and the solid refractive index matching material has a surface that deforms when the endface of the lensed fiber contacts the solid refractive index matching material.
6. A ferrule with a fiber according to claim 5,
wherein both surfaces of the solid refractive index matching material have adhesiveness.
7. A ferrule with a fiber according to claim 5,
wherein on a coordinate system in which the horizontal axis indicates a thickness of the solid refractive index matching material and the vertical axis indicates Shore A hardness, the relationship between the Shore A hardness and the thickness of the solid refractive index matching material is in a range surrounded by the following four points on said coordinate system:
a point where the Shore A hardness is 0, the thickness is 30 μm,
a point where the Shore A hardness is 70, the thickness is 30 μm,
a point where the Shore A hardness is 70, the thickness is 50 μm, and
a point where the Shore A hardness is 0, the thickness is 150 μm.
8. A ferrule with a fiber according to claim 1,
wherein a fiber groove to support the lensed fiber is formed in a bottom surface of the recess.
9. A ferrule with a fiber according to claim 1,
wherein a groove formed to penetrate through upper parts of openings of the plurality of the fiber holes is formed in the endface of the ferrule, and
at least a part of an inner wall surface configuring the groove is positioned to an upper side than the fiber holes.
10. A ferrule with a fiber according to claim 1,
wherein the ferrule includes
a first endface inclined with respect to a surface perpendicular to an axial direction of the fiber holes, the first endface being attached with the plate and
a second endface that contacts a ferrule to another side, the second endface protruding to a side to the ferrule to the other side than the first endface and the plate.
11. A ferrule with a fiber according to claim 10,
wherein the second endface is parallel to the first endface.
12. A ferrule with a fiber according to claim 10,
wherein the ferrule includes a positioning hole to which a positioning pin is to be inserted,
the second endface is a surface perpendicular to an axial direction of the positioning hole.
13. A ferrule with a fiber according to claim 10,
wherein the first endface is inclined toward the other side ferrule the nearer to a side of an adhesive filling window,
a center position of the plurality of the fiber holes is in a position displaced to an opposite side to the side to the adhesive filling window, with respect to a positioning hole in which a positioning pin is to be inserted.
14. A ferrule with a fiber according to claim 10, wherein
a coreless fiber has been fusion spliced to a tip of the GRIN lens, and
the plate is attached to the endface after an end part of the lensed fiber protruding from each of the fiber holes has been polished.
15. A ferrule with a fiber comprising:
a ferrule including a positioning hole, a plurality of fiber holes, and an endface inclined with respect to axial direction of the fiber holes;

a lensed fiber with a GRIN lens that has been fusion spliced to a tip of an optical fiber; and a plate that can transmit light propagating through the optical fiber, the plate being attached to the endface of the ferrule, the plate being contacted against with an endface of the lensed fiber that has been inserted into each of the fiber holes, wherein the ferrule is formed with a recess that is depressed from the endface of the ferrule, a refractive index matching material is filled in a space surrounded with the plate and the recess, the endface of the ferrule and the plate are inclined with respect to a plane perpendicular to an optical axis of the lensed fiber that has been inserted into each of the fiber holes, and said refractive index matching material is filled in a space between the endface of the lensed fiber and the plate.

16. An optical connector system that optically connects two optical connectors, wherein each optical connector includes a ferrule including a positioning hole, a plurality of fiber holes, and an endface perpendicular to an axial direction of the fiber holes, a lensed fiber with a GRIN lens that has been fusion spliced to a tip of an optical fiber, and a plate that can transmit light propagating through the optical fiber, the plate being attached to the endface of the ferrule, the plate being contacted against with an endface of the lensed fiber that has been inserted into each of the fiber holes, the ferrule is formed with a recess depressed from the endface of the ferrule, a refractive index matching material is filled in a space surrounded with the plate and the recess, and the plates of the optical connectors are arranged opposed to each other with a predetermined interval in between.

17. An optical connector system according to claim 16, wherein the ferrule includes a contact endface that contacts a ferrule to another side, the contact endface protruding to a side of the ferrule to the other side than the endface that has been attached with the plate and the plate, and the plates are arranged opposed to each other with a predetermined interval in between, by the contact endface of the ferrule contacting the contact endface of the ferrule to the other side.

18. An optical connector system according to claim 16, wherein the ferrule contacts a spacer, to arrange the plates to be opposed with a predetermined interval in between.

19. A ferrule with a fiber comprising:

a ferrule including a positioning hole, a plurality of fiber holes, and an endface perpendicular to an axial direction of the fiber holes, a lensed fiber with a GRIN lens that has been fusion spliced to a tip of an optical fiber; and a plate that can transmit light propagating through the optical fiber, the plate being formed with an antireflection film to a surface to an outer side, the plate being attached to the endface of the ferrule such that a surface to an inner side opposes an endface of the lensed fiber that has been inserted into each of the fiber holes.

* * * * *